US012711962B2

(12) United States Patent
Jones et al.

(10) Patent No.: US 12,711,962 B2
(45) **Date of Patent: *Aug. 18, 2026**

(54) SYSTEMS AND METHODS FOR POWER-EFFICIENT KEYWORD DETECTION

(71) Applicant: Sonos, Inc., Goleta, CA (US)

(72) Inventors: Aaron Jones, San Diego, CA (US); Saeed Bagheri Sereshki, Goleta, CA (US); Daniele Giacobello, Los Angeles, CA (US)

(73) Assignee: Sonos, Inc., Goleta, CA (US)

( * ) Notice: Subject to any disclaimer, the term of this patent is extended or adjusted under 35 U.S.C. 154(b) by 169 days.

This patent is subject to a terminal disclaimer.

(21) Appl. No.: 18/461,457

(22) Filed: Sep. 5, 2023

(65) Prior Publication Data

US 2023/0419972 A1 Dec. 28, 2023

Related U.S. Application Data

(63) Continuation of application No. 18/060,176, filed on Nov. 30, 2022, now Pat. No. 11,769,511, which is a (Continued)

(51) Int. Cl.
*G10L 15/22* (2006.01)
*G10L 15/02* (2006.01)
(Continued)

(52) U.S. Cl.
CPC .............. *G10L 17/22* (2013.01); *G10L 15/02* (2013.01); *G10L 15/05* (2013.01); *G10L 15/22* (2013.01);
(Continued)

(58) Field of Classification Search
CPC .......... G10L 15/22; G10L 15/28; G10L 25/78
See application file for complete search history.

(56) References Cited

U.S. PATENT DOCUMENTS 999,715 A 8/1911 Gundersen
4,741,038 A 4/1988 Elko et al.
(Continued)

FOREIGN PATENT DOCUMENTS

AU 2017100486 A4 6/2017
AU 2017100581 A4 6/2017
(Continued)

OTHER PUBLICATIONS

US 9,299,346 B1, 03/2016, Hart et al. (withdrawn)
(Continued)

*Primary Examiner* — Daniel Abebe
(74) *Attorney, Agent, or Firm* — Fortem IP LLP

(57) ABSTRACT

Systems and methods for audio processing include capturing first sound data via at least one microphone of a network microphone device (NMD) and determining, via a voice activity detection process, that the first sound data does not include voice activity. The first sound data is stored in a buffer, and the NMD forgoes spatial processing of the first sound data. The NMD can capture second sound data and determine, via the voice activity process, that the second sound data includes voice activity. The NMD spatially processes the second sound data to produce filtered sound data. The NMD detects a wake word based on data in the buffer. After detecting the wake word, the NMD may determine an action to be performed based on the data in the buffer.

20 Claims, 9 Drawing Sheets

Related U.S. Application Data continuation of application No. 17/248,427, filed on Jan. 25, 2021, now Pat. No. 11,551,700.

(51) Int. Cl.
*G10L 15/05* (2013.01)
*G10L 17/02* (2013.01)
*G10L 17/22* (2013.01)

(52) U.S. Cl.
CPC ........ *G10L 17/02* (2013.01); *G10L 2015/223* (2013.01)

(56) References Cited

U.S. PATENT DOCUMENTS 4,941,187 A 7/1990 Slater
4,974,213 A 11/1990 Siwecki
5,036,538 A 7/1991 Oken et al.
5,440,644 A 8/1995 Farinelli et al.
5,588,065 A 12/1996 Tanaka et al.
5,717,768 A 2/1998 Laroche
5,740,260 A 4/1998 Odom
5,761,320 A 6/1998 Farinelli et al.
5,857,172 A 1/1999 Rozak
5,923,902 A 7/1999 Inagaki
5,949,414 A 9/1999 Namikata et al.
6,032,202 A 2/2000 Lea et al.
6,070,140 A 5/2000 Tran
6,088,459 A 7/2000 Hobelsberger
6,219,645 B1 4/2001 Byers
6,256,554 B1 7/2001 DiLorenzo
6,301,603 B1 10/2001 Maher et al.
6,311,157 B1 10/2001 Strong
6,366,886 B1 4/2002 Dragosh et al.
6,404,811 B1 6/2002 Cvetko et al.
6,408,078 B1 6/2002 Hobelsberger
6,469,633 B1 10/2002 Wachter
6,522,886 B1 2/2003 Youngs et al.
6,594,347 B1 7/2003 Calder et al.
6,594,630 B1 7/2003 Zlokarnik et al.
6,611,537 B1 8/2003 Edens et al.
6,611,604 B1 8/2003 Irby et al.
6,631,410 B1 10/2003 Kowalski et al.
6,757,517 B2 6/2004 Chang
6,778,869 B2 8/2004 Champion
6,937,977 B2 8/2005 Gerson
7,099,821 B2 8/2006 Visser et al.
7,103,542 B2 9/2006 Doyle
7,130,608 B2 10/2006 Hollstrom et al.
7,130,616 B2 10/2006 Janik
7,143,939 B2 12/2006 Henzerling
7,174,299 B2 2/2007 Fujii et al.
7,228,275 B1 6/2007 Endo et al.
7,236,773 B2 6/2007 Thomas
7,295,548 B2 11/2007 Blank et al.
7,356,471 B2 4/2008 Ito et al.
7,383,297 B1 6/2008 Atsmon et al.
7,391,791 B2 6/2008 Balassanian et al.
7,483,538 B2 1/2009 McCarty et al.
7,516,068 B1 4/2009 Clark
7,571,014 B1 8/2009 Lambourne et al.
7,577,757 B2 8/2009 Carter et al.
7,630,501 B2 12/2009 Blank et al.
7,643,894 B2 1/2010 Braithwaite et al.
7,657,910 B1 2/2010 McAulay et al.
7,661,107 B1 2/2010 Van Dyke et al.
7,702,508 B2 4/2010 Bennett
7,705,565 B2 4/2010 Patino et al.
7,792,311 B1 9/2010 Holmgren et al.
7,853,341 B2 12/2010 McCarty et al.
7,961,892 B2 6/2011 Fedigan
7,987,294 B2 7/2011 Bryce et al.
8,014,423 B2 9/2011 Thaler et al.
8,019,076 B1 9/2011 Lambert
8,032,383 B1 10/2011 Bhardwaj et al.
8,041,565 B1 10/2011 Bhardwaj et al.
8,045,952 B2 10/2011 Qureshey et al.
8,073,125 B2 12/2011 Zhang et al.
8,073,681 B2 12/2011 Baldwin et al.
8,085,947 B2 12/2011 Haulick et al.
8,103,009 B2 1/2012 McCarty et al.
8,136,040 B2 3/2012 Fleming
8,165,867 B1 4/2012 Fish
8,233,632 B1 7/2012 Macdonald et al.
8,234,395 B2 7/2012 Millington
8,239,206 B1 8/2012 LeBeau et al.
8,255,224 B2 8/2012 Singleton et al.
8,284,982 B2 10/2012 Bailey
8,290,603 B1 10/2012 Lambourne
8,325,909 B2 12/2012 Tashev et al.
8,340,975 B1 12/2012 Rosenberger
8,364,481 B2 1/2013 Strope et al.
8,385,557 B2 2/2013 Tashev et al.
8,386,261 B2 2/2013 Mellott et al.
8,386,523 B2 2/2013 Mody et al.
8,423,893 B2 4/2013 Ramsay et al.
8,428,758 B2 4/2013 Naik et al.
8,453,058 B1 5/2013 Coccaro et al.
8,473,618 B2 6/2013 Spear et al.
8,483,853 B1 7/2013 Lambourne
8,484,025 B1 7/2013 Moreno et al.
8,489,398 B1 7/2013 Gruenstein
8,566,722 B2 10/2013 Gordon et al.
8,588,849 B2 11/2013 Patterson et al.
8,594,320 B2 11/2013 Faller
8,600,443 B2 12/2013 Kawaguchi et al.
8,620,232 B2 12/2013 Helsloot
8,639,214 B1 1/2014 Fujisaki
8,676,273 B1 3/2014 Fujisaki
8,710,970 B2 4/2014 Oelrich et al.
8,719,039 B1 5/2014 Sharifi
8,738,925 B1 5/2014 Park et al.
8,762,156 B2 6/2014 Chen
8,768,712 B1 7/2014 Sharifi
8,775,191 B1 7/2014 Sharifi et al.
8,798,995 B1 8/2014 Edara
8,831,761 B2 9/2014 Kemp et al.
8,831,957 B2 9/2014 Taubman et al.
8,848,879 B1 9/2014 Coughlan et al.
8,861,756 B2 10/2014 Zhu et al.
8,874,448 B1 10/2014 Kauffmann et al.
8,898,063 B1 11/2014 Sykes et al.
8,938,394 B1 1/2015 Faaborg et al.
8,942,252 B2 1/2015 Balassanian et al.
8,983,383 B1 3/2015 Haskin
8,983,844 B1 3/2015 Thomas et al.
9,002,024 B2 4/2015 Nakadai et al.
9,015,049 B2 4/2015 Baldwin et al.
9,042,556 B2 5/2015 Kallai et al.
9,047,857 B1 6/2015 Barton
9,060,224 B1 6/2015 List
9,070,367 B1 6/2015 Hoffmeister et al.
9,088,336 B2 7/2015 Mani et al.
9,094,539 B1 7/2015 Noble
9,098,467 B1 8/2015 Blanksteen et al.
9,124,650 B2 9/2015 Maharajh et al.
9,124,711 B2 9/2015 Park et al.
9,147,397 B2 * 9/2015 Thomsen ............ G10L 19/0204
9,148,742 B1 9/2015 Koulomzin et al.
9,183,845 B1 11/2015 Gopalakrishnan et al.
9,190,043 B2 11/2015 Krisch et al.
9,208,785 B2 12/2015 Ben-David et al.
9,215,545 B2 12/2015 Dublin et al.
9,226,069 B2 * 12/2015 Rabii .................... G01S 15/876
9,226,088 B2 12/2015 Pandey et al.
9,245,527 B2 1/2016 Lindahl
9,251,793 B2 2/2016 Lebeau et al.
9,253,572 B2 2/2016 Beddingfield, Sr. et al.
9,262,612 B2 2/2016 Cheyer
9,263,042 B1 2/2016 Sharifi
9,275,637 B1 3/2016 Salvador et al.
9,288,597 B2 3/2016 Carlsson et al.
9,300,266 B2 3/2016 Grokop
9,304,736 B1 4/2016 Whiteley et al.

(56) References Cited

U.S. PATENT DOCUMENTS 9,307,321 B1 4/2016 Unruh
9,313,317 B1 4/2016 Lebeau et al.
9,318,107 B1 4/2016 Sharifi
9,319,816 B1 4/2016 Narayanan
9,324,322 B1 4/2016 Torok et al.
9,335,819 B1 5/2016 Jaeger et al.
9,354,687 B2 5/2016 Bansal et al.
9,361,878 B2 6/2016 Boukadakis
9,361,885 B2 6/2016 Ganong, III et al.
9,368,105 B1 6/2016 Freed et al.
9,373,329 B2 6/2016 Strope et al.
9,374,634 B2 6/2016 Macours
9,386,154 B2 7/2016 Baciu et al.
9,390,708 B1 7/2016 Hoffmeister
9,401,058 B2 7/2016 De La Fuente et al.
9,412,392 B2 8/2016 Lindahl et al.
9,426,567 B2 8/2016 Lee et al.
9,431,021 B1 8/2016 Scalise et al.
9,443,516 B2 9/2016 Katuri et al.
9,443,527 B1 9/2016 Watanabe et al.
9,472,201 B1 10/2016 Sleator
9,472,203 B1 10/2016 Ayrapetian et al.
9,484,030 B1 11/2016 Meaney et al.
9,489,948 B1 11/2016 Chu et al.
9,491,033 B1 11/2016 Soyannwo et al.
9,494,683 B1 11/2016 Sadek
9,509,269 B1 11/2016 Rosenberg
9,510,101 B1 11/2016 Polleros
9,514,476 B2 12/2016 Kay et al.
9,514,747 B1 12/2016 Bisani et al.
9,514,752 B2 12/2016 Sharifi
9,516,081 B2 12/2016 Tebbs et al.
9,532,139 B1 12/2016 Lu et al.
9,536,541 B2 1/2017 Chen et al.
9,542,941 B1 1/2017 Weksler et al.
9,548,053 B1 1/2017 Basye et al.
9,548,066 B2 1/2017 Jain et al.
9,549,273 B2 * 1/2017 Elkhatib ............... G06F 1/3215
9,552,816 B2 1/2017 Vanlund et al.
9,554,210 B1 1/2017 Ayrapetian et al.
9,558,755 B1 1/2017 Laroche et al.
9,560,441 B1 1/2017 McDonough, Jr. et al.
9,576,591 B2 2/2017 Kim et al.
9,601,116 B2 3/2017 Casado et al.
9,615,170 B2 4/2017 Kirsch et al.
9,615,171 B1 4/2017 O'Neill et al.
9,626,695 B2 4/2017 Balasubramanian et al.
9,632,748 B2 4/2017 Faaborg et al.
9,633,186 B2 4/2017 Ingrassia, Jr. et al.
9,633,368 B2 4/2017 Greenzeiger et al.
9,633,660 B2 4/2017 Haughay et al.
9,633,661 B1 4/2017 Typrin et al.
9,633,671 B2 4/2017 Giacobello et al.
9,633,674 B2 4/2017 Sinha et al.
9,640,179 B1 5/2017 Hart et al.
9,640,183 B2 5/2017 Jung et al.
9,640,194 B1 5/2017 Nemala et al.
9,641,919 B1 5/2017 Poole et al.
9,646,614 B2 5/2017 Bellegarda et al.
9,648,564 B1 5/2017 Cui et al.
9,653,060 B1 5/2017 Hilmes et al.
9,653,075 B1 5/2017 Chen et al.
9,659,555 B1 5/2017 Hilmes et al.
9,672,812 B1 6/2017 Watanabe et al.
9,672,821 B2 6/2017 Krishnaswamy et al.
9,674,587 B2 6/2017 Triplett et al.
9,685,171 B1 6/2017 Yang
9,691,378 B1 6/2017 Meyers et al.
9,691,379 B1 6/2017 Mathias et al.
9,691,384 B1 6/2017 Wang et al.
9,697,826 B2 7/2017 Sainath et al.
9,697,828 B1 7/2017 Prasad et al.
9,697,831 B2 * 7/2017 Lesso ....................... G10L 15/28
9,698,999 B2 7/2017 Mutagi et al.
9,704,478 B1 7/2017 Vitaladevuni et al.
9,706,320 B2 7/2017 Starobin et al.
9,721,566 B2 8/2017 Newendorp et al.
9,721,568 B1 8/2017 Polansky et al.
9,721,570 B1 8/2017 Beal et al.
9,728,188 B1 8/2017 Rosen et al.
9,734,822 B1 8/2017 Sundaram et al.
9,736,578 B2 8/2017 Iyengar et al.
9,743,204 B1 8/2017 Welch et al.
9,743,207 B1 8/2017 Hartung
9,747,011 B2 8/2017 Lewis et al.
9,747,899 B2 8/2017 Pogue et al.
9,747,920 B2 8/2017 Ayrapetian et al.
9,747,926 B2 8/2017 Sharifi et al.
9,749,738 B1 8/2017 Adsumilli et al.
9,749,760 B2 8/2017 Lambourne
9,754,605 B1 9/2017 Chhetri
9,756,422 B2 9/2017 Paquier et al.
9,762,967 B2 9/2017 Clarke et al.
9,767,786 B2 9/2017 Starobin et al.
9,769,420 B1 9/2017 Moses
9,779,725 B2 10/2017 Sun et al.
9,779,732 B2 10/2017 Lee et al.
9,779,734 B2 10/2017 Lee
9,779,735 B2 10/2017 Civelli et al.
9,781,532 B2 10/2017 Sheen
9,799,330 B2 10/2017 Nemala et al.
9,805,733 B2 10/2017 Park
9,811,314 B2 11/2017 Plagge et al.
9,812,128 B2 11/2017 Mixter et al.
9,813,810 B1 11/2017 Nongpiur
9,813,812 B2 11/2017 Berthelsen et al.
9,818,407 B1 11/2017 Secker-Walker et al.
9,820,036 B1 11/2017 Tritschler et al.
9,820,039 B2 11/2017 Lang
9,826,306 B2 11/2017 Lang
9,865,259 B1 1/2018 Typrin et al.
9,865,264 B2 1/2018 Gelfenbeyn et al.
9,875,740 B1 1/2018 Kumar et al.
9,881,616 B2 1/2018 Beckley et al.
9,898,250 B1 2/2018 Williams et al.
9,899,021 B1 2/2018 Vitaladevuni et al.
9,900,723 B1 2/2018 Choisel et al.
9,916,839 B1 3/2018 Scalise et al.
9,940,930 B1 4/2018 Campbell et al.
9,947,316 B2 4/2018 Millington et al.
9,947,333 B1 4/2018 David
9,972,318 B1 5/2018 Kelly et al.
9,972,343 B1 5/2018 Thorson et al.
9,973,849 B1 5/2018 Zhang et al.
9,979,560 B2 5/2018 Kim et al.
9,992,642 B1 6/2018 Rapp et al.
9,997,151 B1 6/2018 Ayrapetian et al.
10,013,381 B2 7/2018 Mayman et al.
10,013,995 B1 7/2018 Lashkari et al.
10,025,447 B1 7/2018 Dixit et al.
10,026,401 B1 7/2018 Mutagi et al.
10,028,069 B1 7/2018 Lang
10,038,419 B1 7/2018 Elliot et al.
10,048,930 B1 8/2018 Vega et al.
10,049,675 B2 8/2018 Haughay
10,051,366 B1 8/2018 Buoni et al.
10,051,600 B1 8/2018 Zhong et al.
10,057,698 B2 8/2018 Drinkwater et al.
RE47,049 E 9/2018 Zhu et al.
10,068,573 B1 9/2018 Aykac et al.
10,074,369 B2 9/2018 Devaraj et al.
10,074,371 B1 9/2018 Wang et al.
10,079,015 B1 9/2018 Lockhart et al.
10,089,981 B1 10/2018 Elangovan et al.
10,108,393 B2 10/2018 Millington et al.
10,115,400 B2 10/2018 Wilberding
10,116,748 B2 10/2018 Farmer et al.
10,127,908 B1 11/2018 Deller et al.
10,127,911 B2 11/2018 Kim et al.
10,134,388 B1 11/2018 Lilly
10,134,398 B2 11/2018 Sharifi
10,134,399 B2 11/2018 Lang et al.
10,136,204 B1 11/2018 Poole et al.
10,152,969 B2 12/2018 Reilly et al.

(56) References Cited

U.S. PATENT DOCUMENTS

| | | | |
|---|---|---|---|
| 10,157,042 | B1 | 12/2018 | Jayakumar et al. |
| 10,181,323 | B2 | 1/2019 | Beckhardt et al. |
| 10,186,265 | B1 | 1/2019 | Lockhart et al. |
| 10,186,266 | B1 | 1/2019 | Devaraj et al. |
| 10,186,276 | B2 | 1/2019 | Dewasurendra et al. |
| 10,192,546 | B1 | 1/2019 | Piersol et al. |
| 10,204,624 | B1 | 2/2019 | Knudson et al. |
| 10,224,056 | B1 | 3/2019 | Torok et al. |
| 10,225,651 | B2 | 3/2019 | Lang |
| 10,229,680 | B1 | 3/2019 | Gillespie et al. |
| 10,241,754 | B1 | 3/2019 | Kadarundalagi Raghuram Doss et al. |
| 10,248,376 | B2 | 4/2019 | Keyser-Allen et al. |
| 10,249,205 | B2 | 4/2019 | Hammersley et al. |
| 10,276,161 | B2 | 4/2019 | Hughes et al. |
| 10,297,256 | B2 | 5/2019 | Reilly et al. |
| 10,304,440 | B1 | 5/2019 | Panchapagesan et al. |
| 10,304,475 | B1 | 5/2019 | Wang et al. |
| 10,318,236 | B1 | 6/2019 | Pal et al. |
| 10,332,508 | B1 | 6/2019 | Hoffmeister |
| 10,339,917 | B2 | 7/2019 | Aleksic et al. |
| 10,339,957 | B1 | 7/2019 | Chenier et al. |
| 10,346,122 | B1 | 7/2019 | Morgan |
| 10,354,650 | B2 | 7/2019 | Gruenstein et al. |
| 10,354,658 | B2 | 7/2019 | Wilberding |
| 10,365,887 | B1 | 7/2019 | Mulherkar |
| 10,365,889 | B2 | 7/2019 | Plagge et al. |
| 10,366,688 | B2 | 7/2019 | Gunn et al. |
| 10,366,699 | B1 | 7/2019 | Dharia et al. |
| 10,374,816 | B1 | 8/2019 | Leblang et al. |
| 10,381,001 | B2 | 8/2019 | Gunn et al. |
| 10,381,002 | B2 | 8/2019 | Gunn et al. |
| 10,381,003 | B2 | 8/2019 | Wakisaka et al. |
| 10,388,272 | B1 | 8/2019 | Thomson et al. |
| 10,403,279 | B2 * | 9/2019 | Zhao ........................ G10L 25/84 |
| 10,424,296 | B2 | 9/2019 | Penilla et al. |
| 10,433,058 | B1 | 10/2019 | Torgerson et al. |
| 10,445,057 | B2 | 10/2019 | Vega et al. |
| 10,445,365 | B2 | 10/2019 | Luke et al. |
| 10,469,966 | B2 | 11/2019 | Lambourne |
| 10,482,899 | B2 | 11/2019 | Ramprashad et al. |
| 10,499,146 | B2 | 12/2019 | Lang et al. |
| 10,510,340 | B1 | 12/2019 | Fu et al. |
| 10,510,362 | B2 | 12/2019 | Hicks et al. |
| 10,511,904 | B2 | 12/2019 | Buoni et al. |
| 10,515,625 | B1 | 12/2019 | Metallinou et al. |
| 10,522,146 | B1 | 12/2019 | Tushinskiy |
| 10,546,583 | B2 | 1/2020 | White et al. |
| 10,565,998 | B2 | 2/2020 | Wilberding |
| 10,565,999 | B2 | 2/2020 | Wilberding |
| 10,567,515 | B1 | 2/2020 | Bao |
| 10,573,312 | B1 | 2/2020 | Thomson et al. |
| 10,573,321 | B1 | 2/2020 | Smith et al. |
| 10,580,405 | B1 | 3/2020 | Wang et al. |
| 10,586,534 | B1 | 3/2020 | Argyropoulos et al. |
| 10,586,540 | B1 | 3/2020 | Smith et al. |
| 10,593,328 | B1 | 3/2020 | Wang et al. |
| 10,593,330 | B2 | 3/2020 | Sharifi |
| 10,599,287 | B2 | 3/2020 | Kumar et al. |
| 10,600,406 | B1 | 3/2020 | Shapiro et al. |
| 10,602,268 | B1 | 3/2020 | Soto |
| 10,614,807 | B2 | 4/2020 | Beckhardt et al. |
| 10,621,981 | B2 | 4/2020 | Sereshki |
| 10,622,009 | B1 | 4/2020 | Zhang et al. |
| 10,623,811 | B1 | 4/2020 | Cwik |
| 10,624,612 | B2 | 4/2020 | Sumi et al. |
| 10,643,609 | B1 | 5/2020 | Pogue et al. |
| 10,645,130 | B2 | 5/2020 | Corbin et al. |
| 10,672,383 | B1 | 6/2020 | Thomson et al. |
| 10,679,625 | B1 | 6/2020 | Lockhart et al. |
| 10,681,460 | B2 | 6/2020 | Woo et al. |
| 10,685,669 | B1 | 6/2020 | Lan et al. |
| 10,694,608 | B2 | 6/2020 | Baker et al. |
| 10,699,711 | B2 | 6/2020 | Reilly |
| 10,706,843 | B1 | 7/2020 | Elangovan et al. |
| 10,712,997 | B2 | 7/2020 | Wilberding et al. |
| 10,720,173 | B2 | 7/2020 | Freeman et al. |
| 10,728,196 | B2 | 7/2020 | Wang |
| 10,735,870 | B2 | 8/2020 | Ballande et al. |
| 10,740,065 | B2 | 8/2020 | Jarvis et al. |
| 10,746,840 | B1 | 8/2020 | Barton et al. |
| 10,748,531 | B2 | 8/2020 | Kim |
| 10,762,896 | B1 | 9/2020 | Yavagal et al. |
| 10,777,189 | B1 | 9/2020 | Fu et al. |
| 10,777,203 | B1 | 9/2020 | Pasko |
| 10,789,041 | B2 | 9/2020 | Kim et al. |
| 10,797,667 | B2 | 10/2020 | Fish et al. |
| 10,824,682 | B2 | 11/2020 | Alvares et al. |
| 10,825,471 | B2 | 11/2020 | Walley et al. |
| 10,837,667 | B2 | 11/2020 | Nelson et al. |
| 10,847,137 | B1 | 11/2020 | Mandal et al. |
| 10,847,143 | B2 | 11/2020 | Millington et al. |
| 10,847,149 | B1 | 11/2020 | Mok et al. |
| 10,847,164 | B2 | 11/2020 | Wilberding |
| 10,848,885 | B2 | 11/2020 | Lambourne |
| RE48,371 | E | 12/2020 | Zhu et al. |
| 10,867,596 | B2 | 12/2020 | Yoneda et al. |
| 10,867,604 | B2 | 12/2020 | Smith et al. |
| 10,871,943 | B1 | 12/2020 | D'Amato |
| 10,878,811 | B2 | 12/2020 | Smith et al. |
| 10,878,826 | B2 | 12/2020 | Li et al. |
| 10,885,091 | B1 | 1/2021 | Meng et al. |
| 10,897,679 | B2 | 1/2021 | Lambourne |
| 10,911,596 | B1 | 2/2021 | Do et al. |
| 10,943,598 | B2 | 3/2021 | Singh et al. |
| 10,964,314 | B2 | 3/2021 | Jazi et al. |
| 10,971,158 | B1 | 4/2021 | Patangay et al. |
| 11,024,311 | B2 | 6/2021 | Mixter et al. |
| 11,025,569 | B2 | 6/2021 | Lind et al. |
| 11,050,615 | B2 | 6/2021 | Mathews et al. |
| 11,062,705 | B2 | 7/2021 | Watanabe et al. |
| 11,095,978 | B2 | 8/2021 | Gigandet et al. |
| 11,100,923 | B2 | 8/2021 | Fainberg et al. |
| 11,127,405 | B1 | 9/2021 | Antos et al. |
| 11,137,979 | B2 | 10/2021 | Plagge |
| 11,138,969 | B2 | 10/2021 | D'Amato |
| 11,140,494 | B2 | 10/2021 | Pedersen et al. |
| 11,159,878 | B1 | 10/2021 | Chatlani et al. |
| 11,172,328 | B2 | 11/2021 | Soto et al. |
| 11,172,329 | B2 | 11/2021 | Soto et al. |
| 11,175,880 | B2 | 11/2021 | Liu et al. |
| 11,184,704 | B2 | 11/2021 | Jarvis et al. |
| 11,184,969 | B2 | 11/2021 | Lang |
| 11,189,284 | B2 | 11/2021 | Maeng |
| 11,206,052 | B1 | 12/2021 | Park et al. |
| 11,212,612 | B2 | 12/2021 | Lang et al. |
| 11,264,019 | B2 | 3/2022 | Bhattacharya et al. |
| 11,277,512 | B1 | 3/2022 | Leeds et al. |
| 11,302,326 | B2 | 4/2022 | Sereshki |
| 11,315,556 | B2 | 4/2022 | Smith et al. |
| 11,354,092 | B2 | 6/2022 | D'Amato |
| 11,361,763 | B1 | 6/2022 | Maas et al. |
| 11,373,645 | B1 | 6/2022 | Mathew et al. |
| 11,388,532 | B2 | 7/2022 | Lambourne |
| 11,411,763 | B2 | 8/2022 | Mackay et al. |
| 11,445,301 | B2 | 9/2022 | Park et al. |
| 11,475,899 | B2 | 10/2022 | Lesso |
| 11,514,898 | B2 | 11/2022 | Millington |
| 11,531,520 | B2 | 12/2022 | Wilberding |
| 11,532,306 | B2 | 12/2022 | Kim et al. |
| 11,580,969 | B2 | 2/2023 | Han et al. |
| 11,646,023 | B2 | 5/2023 | Smith |
| 11,664,023 | B2 | 5/2023 | Reilly |
| 11,688,419 | B2 | 6/2023 | Sereshki |
| 11,694,689 | B2 | 7/2023 | Smith |
| 11,709,653 | B1 | 7/2023 | Shin |
| 11,714,600 | B2 | 8/2023 | D'Amato |
| 11,727,936 | B2 | 8/2023 | Smith |
| 11,769,505 | B2 | 9/2023 | Sereshki |
| 11,790,937 | B2 | 10/2023 | Smith et al. |
| 11,817,076 | B2 | 11/2023 | Sereshki et al. |
| 12,142,266 | B2 * | 11/2024 | Elkhatib ................. H03M 1/12 |
| 2001/0003173 | A1 | 6/2001 | Lim |
| 2001/0042107 | A1 | 11/2001 | Palm |

(56) References Cited

U.S. PATENT DOCUMENTS

2002/0022453 A1 2/2002 Balog et al.
2002/0026442 A1 2/2002 Lipscomb et al.
2002/0034280 A1 3/2002 Infosino
2002/0046023 A1 4/2002 Fujii et al.
2002/0054685 A1 5/2002 Avendano et al.
2002/0055950 A1 5/2002 Witteman
2002/0072816 A1 6/2002 Shdema et al.
2002/0116196 A1 8/2002 Tran
2002/0124097 A1 9/2002 Isely et al.
2002/0143532 A1 10/2002 McLean et al.
2003/0015354 A1 1/2003 Edwards et al.
2003/0038848 A1 2/2003 Lee et al.
2003/0040908 A1 2/2003 Yang et al.
2003/0070182 A1 4/2003 Pierre et al.
2003/0070869 A1 4/2003 Hlibowicki
2003/0072462 A1 4/2003 Hlibowicki
2003/0095672 A1 5/2003 Hobelsberger
2003/0097482 A1 5/2003 DeHart et al.
2003/0130850 A1 7/2003 Badt et al.
2003/0157951 A1 8/2003 Hasty, Jr.
2003/0235244 A1 12/2003 Pessoa et al.
2004/0024478 A1 2/2004 Hans et al.
2004/0093219 A1 5/2004 Shin et al.
2004/0105566 A1 6/2004 Matsunaga et al.
2004/0127241 A1 7/2004 Shostak
2004/0128135 A1 7/2004 Anastasakos et al.
2004/0153321 A1 8/2004 Chung et al.
2004/0161082 A1 8/2004 Brown et al.
2004/0234088 A1 11/2004 McCarty et al.
2005/0031131 A1 2/2005 Browning et al.
2005/0031132 A1 2/2005 Browning et al.
2005/0031133 A1 2/2005 Browning et al.
2005/0031134 A1 2/2005 Leske
2005/0031137 A1 2/2005 Browning et al.
2005/0031138 A1 2/2005 Browning et al.
2005/0031139 A1 2/2005 Browning et al.
2005/0031140 A1 2/2005 Browning
2005/0033582 A1 2/2005 Gadd et al.
2005/0047606 A1 3/2005 Lee et al.
2005/0077843 A1 4/2005 Benditt
2005/0164664 A1 7/2005 DiFonzo et al.
2005/0195988 A1 9/2005 Tashev et al.
2005/0201254 A1 9/2005 Looney et al.
2005/0207584 A1 9/2005 Bright
2005/0235334 A1 10/2005 Togashi et al.
2005/0254662 A1 11/2005 Blank et al.
2005/0268234 A1 12/2005 Rossi et al.
2005/0283330 A1 12/2005 Laraia et al.
2005/0283475 A1 12/2005 Beranek et al.
2006/0004834 A1 1/2006 Pyhalammi et al.
2006/0023945 A1 2/2006 King et al.
2006/0041431 A1 2/2006 Maes
2006/0093128 A1 5/2006 Oxford
2006/0104451 A1 5/2006 Browning et al.
2006/0104454 A1 5/2006 Guitarte Perez et al.
2006/0147058 A1 7/2006 Wang
2006/0190269 A1 8/2006 Tessel et al.
2006/0190968 A1 8/2006 Jung et al.
2006/0247913 A1 11/2006 Huerta et al.
2006/0262943 A1 11/2006 Oxford
2007/0018844 A1 1/2007 Sutardja
2007/0019815 A1 1/2007 Asada et al.
2007/0033043 A1 2/2007 Hyakumoto
2007/0038461 A1 2/2007 Abbott et al.
2007/0038999 A1 2/2007 Millington
2007/0060054 A1 3/2007 Romesburg
2007/0071206 A1 3/2007 Gainsboro et al.
2007/0071255 A1 3/2007 Schobben
2007/0076131 A1 4/2007 Li et al.
2007/0076906 A1 4/2007 Takagi et al.
2007/0140058 A1 6/2007 McIntosh et al.
2007/0140521 A1 6/2007 Mitobe et al.
2007/0142944 A1 6/2007 Goldberg et al.
2007/0147651 A1 6/2007 Mitobe et al.
2007/0201639 A1 8/2007 Park et al.
2007/0254604 A1 11/2007 Kim
2007/0286426 A1 12/2007 Xiang et al.
2008/0008333 A1 1/2008 Nishikawa et al.
2008/0031466 A1 2/2008 Buck et al.
2008/0037814 A1 2/2008 Shau
2008/0090537 A1 4/2008 Sutardja
2008/0090617 A1 4/2008 Sutardja
2008/0144858 A1 6/2008 Khawand et al.
2008/0146289 A1 6/2008 Korneluk et al.
2008/0160977 A1 7/2008 Ahmaniemi et al.
2008/0182518 A1 7/2008 Lo
2008/0192946 A1 8/2008 Faller
2008/0207115 A1 8/2008 Lee et al.
2008/0208594 A1 8/2008 Cross et al.
2008/0221897 A1 9/2008 Cerra et al.
2008/0247530 A1 10/2008 Barton et al.
2008/0248797 A1 10/2008 Freeman et al.
2008/0291896 A1 11/2008 Tuubel et al.
2008/0291916 A1 11/2008 Xiong et al.
2008/0301729 A1 12/2008 Broos et al.
2009/0003620 A1 1/2009 McKillop et al.
2009/0005893 A1 1/2009 Sugii et al.
2009/0010445 A1 1/2009 Matsuo
2009/0013255 A1 1/2009 Yuschik et al.
2009/0018828 A1 1/2009 Nakadai et al.
2009/0043206 A1 2/2009 Towfiq et al.
2009/0046866 A1 2/2009 Feng et al.
2009/0052688 A1 2/2009 Ishibashi et al.
2009/0076821 A1 3/2009 Brenner et al.
2009/0113053 A1 4/2009 Van Wie et al.
2009/0153289 A1 6/2009 Hope et al.
2009/0191854 A1 7/2009 Beason
2009/0197524 A1 8/2009 Haff et al.
2009/0214048 A1 8/2009 Stokes, III et al.
2009/0220107 A1 9/2009 Every et al.
2009/0228919 A1 9/2009 Zott et al.
2009/0238377 A1 9/2009 Ramakrishnan et al.
2009/0238386 A1 9/2009 Usher et al.
2009/0248397 A1 10/2009 Garcia et al.
2009/0249222 A1 10/2009 Schmidt et al.
2009/0264072 A1 10/2009 Dai
2009/0299745 A1 12/2009 Kennewick et al.
2009/0323907 A1 12/2009 Gupta et al.
2009/0323924 A1 12/2009 Tashev et al.
2009/0326949 A1 12/2009 Douthitt et al.
2010/0014690 A1 1/2010 Wolff et al.
2010/0023638 A1 1/2010 Bowman
2010/0035593 A1 2/2010 Franco et al.
2010/0041443 A1 2/2010 Yokota
2010/0070276 A1 3/2010 Wasserblat et al.
2010/0070922 A1 3/2010 DeMaio et al.
2010/0075723 A1 3/2010 Min et al.
2010/0088100 A1 4/2010 Lindahl
2010/0092004 A1 4/2010 Kuze
2010/0161335 A1 6/2010 Whynot
2010/0172516 A1 7/2010 Lastrucci
2010/0178873 A1 7/2010 Lee et al.
2010/0179806 A1 7/2010 Zhang et al.
2010/0179874 A1 7/2010 Higgins et al.
2010/0185448 A1 7/2010 Meisel
2010/0211199 A1 8/2010 Naik et al.
2010/0260348 A1 10/2010 Bhow et al.
2010/0278351 A1 11/2010 Fozunbal et al.
2010/0299639 A1 11/2010 Ramsay et al.
2010/0329472 A1 12/2010 Nakadai et al.
2010/0332236 A1 12/2010 Tan
2011/0019833 A1 1/2011 Kuech et al.
2011/0033059 A1 2/2011 Bhaskar et al.
2011/0035580 A1 2/2011 Wang et al.
2011/0044461 A1 2/2011 Kuech et al.
2011/0044489 A1 2/2011 Saiki et al.
2011/0046952 A1 2/2011 Koshinaka
2011/0066634 A1 3/2011 Phillips et al.
2011/0091055 A1 4/2011 Leblanc
2011/0103615 A1 5/2011 Sun
2011/0131032 A1 6/2011 Yang et al.
2011/0145581 A1 6/2011 Malhotra et al.
2011/0170707 A1 7/2011 Yamada et al.
2011/0176687 A1 7/2011 Birkenes

(56) References Cited

U.S. PATENT DOCUMENTS

2011/0182436 A1 7/2011 Murgia et al.
2011/0202924 A1 8/2011 Banguero et al.
2011/0218656 A1 9/2011 Bishop et al.
2011/0267985 A1 11/2011 Wilkinson et al.
2011/0276333 A1 11/2011 Wang et al.
2011/0280422 A1 11/2011 Neumeyer et al.
2011/0285808 A1 11/2011 Feng et al.
2011/0289506 A1 11/2011 Trivi et al.
2011/0299706 A1 12/2011 Sakai
2012/0009906 A1 1/2012 Patterson et al.
2012/0010890 A1* 1/2012 Koverzin .......... H04W 52/0216 704/E21.001
2012/0020485 A1 1/2012 Msser et al.
2012/0020486 A1 1/2012 Fried et al.
2012/0022863 A1 1/2012 Cho et al.
2012/0022864 A1 1/2012 Leman et al.
2012/0027218 A1 2/2012 Every et al.
2012/0076308 A1 3/2012 Kuech et al.
2012/0078635 A1 3/2012 Rothkopf et al.
2012/0086568 A1 4/2012 Scott et al.
2012/0123268 A1 5/2012 Tanaka et al.
2012/0128160 A1 5/2012 Kim et al.
2012/0131125 A1 5/2012 Seidel et al.
2012/0148075 A1 6/2012 Goh et al.
2012/0162540 A1 6/2012 Ouchi et al.
2012/0163603 A1 6/2012 Abe et al.
2012/0177215 A1 7/2012 Bose et al.
2012/0183149 A1 7/2012 Hiroe
2012/0224457 A1 9/2012 Kim et al.
2012/0224715 A1 9/2012 Kikkeri
2012/0237047 A1 9/2012 Neal et al.
2012/0245941 A1 9/2012 Cheyer
2012/0265528 A1 10/2012 Gruber et al.
2012/0288100 A1 11/2012 Cho
2012/0297284 A1 11/2012 Matthews, III et al.
2012/0308044 A1 12/2012 Vander et al.
2012/0308046 A1 12/2012 Muza
2013/0006453 A1 1/2013 Wang et al.
2013/0024018 A1 1/2013 Chang et al.
2013/0034241 A1 2/2013 Pandey et al.
2013/0039527 A1 2/2013 Jensen et al.
2013/0051755 A1 2/2013 Brown et al.
2013/0058492 A1 3/2013 Silzle et al.
2013/0066453 A1 3/2013 Seefeldt
2013/0073293 A1 3/2013 Jang et al.
2013/0080146 A1 3/2013 Kato et al.
2013/0080167 A1 3/2013 Mozer
2013/0080171 A1 3/2013 Mozer et al.
2013/0124211 A1 5/2013 McDonough
2013/0129100 A1 5/2013 Sorensen
2013/0148821 A1 6/2013 Sorensen
2013/0170647 A1 7/2013 Reilly et al.
2013/0179173 A1 7/2013 Lee et al.
2013/0183944 A1 7/2013 Mozer et al.
2013/0185639 A1 7/2013 Lim
2013/0191119 A1 7/2013 Sugiyama
2013/0191122 A1 7/2013 Mason
2013/0198298 A1 8/2013 Li et al.
2013/0211826 A1 8/2013 Mannby
2013/0216056 A1 8/2013 Thyssen
2013/0230184 A1 9/2013 Kuech et al.
2013/0238326 A1 9/2013 Kim et al.
2013/0262101 A1 10/2013 Srinivasan
2013/0283169 A1 10/2013 Van Wie
2013/0289994 A1 10/2013 Newman et al.
2013/0294611 A1 11/2013 Yoo et al.
2013/0301840 A1 11/2013 Yemdji et al.
2013/0315420 A1 11/2013 You
2013/0317635 A1 11/2013 Bates et al.
2013/0322462 A1 12/2013 Poulsen
2013/0322634 A1 12/2013 Bennett et al.
2013/0322665 A1 12/2013 Bennett et al.
2013/0324031 A1 12/2013 Loureiro
2013/0329896 A1 12/2013 Krishnaswamy et al.
2013/0331970 A1 12/2013 Beckhardt et al.
2013/0332165 A1 12/2013 Beckley et al.
2013/0336499 A1 12/2013 Beckhardt et al.
2013/0339028 A1 12/2013 Rosner et al.
2013/0343567 A1 12/2013 Triplett et al.
2014/0003611 A1 1/2014 Mohammad et al.
2014/0003625 A1 1/2014 Sheen et al.
2014/0003635 A1 1/2014 Mohammad et al.
2014/0005813 A1 1/2014 Reimann
2014/0006026 A1 1/2014 Lamb et al.
2014/0006825 A1 1/2014 Shenhav
2014/0019743 A1 1/2014 DeLuca
2014/0034929 A1 2/2014 Hamada et al.
2014/0046464 A1 2/2014 Reimann
2014/0056435 A1 2/2014 Nems et al.
2014/0064476 A1 3/2014 Mani et al.
2014/0064501 A1 3/2014 Olsen et al.
2014/0073298 A1 3/2014 Rossmann
2014/0075306 A1 3/2014 Rega
2014/0075311 A1 3/2014 Boettcher et al.
2014/0094151 A1 4/2014 Klappert et al.
2014/0100854 A1 4/2014 Chen et al.
2014/0108010 A1 4/2014 Maltseff et al.
2014/0109138 A1 4/2014 Cannistraro et al.
2014/0122075 A1 5/2014 Bak et al.
2014/0122092 A1 5/2014 Goldstein
2014/0126745 A1 5/2014 Dickins et al.
2014/0136195 A1 5/2014 Abdossalami et al.
2014/0145168 A1 5/2014 Ohsawa et al.
2014/0146983 A1 5/2014 Kim et al.
2014/0149118 A1 5/2014 Lee et al.
2014/0159581 A1 6/2014 Pruemmer et al.
2014/0161263 A1 6/2014 Koishida et al.
2014/0163978 A1 6/2014 Basye et al.
2014/0164400 A1 6/2014 Kruglick
2014/0167929 A1 6/2014 Shim et al.
2014/0167931 A1 6/2014 Lee et al.
2014/0168344 A1 6/2014 Shoemake et al.
2014/0172899 A1 6/2014 Hakkani-Tur et al.
2014/0172953 A1 6/2014 Blanksteen
2014/0181199 A1 6/2014 Kumar et al.
2014/0181271 A1 6/2014 Millington
2014/0188476 A1 7/2014 Li et al.
2014/0192986 A1 7/2014 Lee et al.
2014/0195252 A1 7/2014 Gruber et al.
2014/0200881 A1 7/2014 Chatlani
2014/0207457 A1 7/2014 Biatov et al.
2014/0214429 A1 7/2014 Pantel
2014/0215332 A1 7/2014 Lee et al.
2014/0219472 A1 8/2014 Huang et al.
2014/0222436 A1 8/2014 Binder et al.
2014/0229184 A1 8/2014 Shires
2014/0229959 A1 8/2014 Beckhardt et al.
2014/0244013 A1 8/2014 Reilly
2014/0244269 A1 8/2014 Tokutake
2014/0244712 A1 8/2014 Walters et al.
2014/0249817 A1 9/2014 Hart et al.
2014/0252386 A1 9/2014 Ito et al.
2014/0253676 A1 9/2014 Nagase et al.
2014/0254805 A1 9/2014 Su et al.
2014/0258292 A1 9/2014 Thramann et al.
2014/0259075 A1 9/2014 Chang et al.
2014/0269757 A1 9/2014 Park et al.
2014/0270216 A1 9/2014 Tsilfidis et al.
2014/0270282 A1 9/2014 Tammi et al.
2014/0274185 A1 9/2014 Luna et al.
2014/0274203 A1 9/2014 Ganong, III et al.
2014/0274218 A1 9/2014 Kadiwala et al.
2014/0277650 A1 9/2014 Zurek et al.
2014/0278343 A1 9/2014 Tran
2014/0278372 A1 9/2014 Nakadai et al.
2014/0278445 A1 9/2014 Eddington, Jr.
2014/0278933 A1 9/2014 McMillan
2014/0288686 A1 9/2014 Sant et al.
2014/0291642 A1 10/2014 Watabe et al.
2014/0303969 A1 10/2014 Inose et al.
2014/0310002 A1 10/2014 Nitz et al.
2014/0310614 A1 10/2014 Jones
2014/0324203 A1 10/2014 Coburn, IV et al.
2014/0328490 A1 11/2014 Mohammad et al.

(56) References Cited

U.S. PATENT DOCUMENTS

2014/0330896 A1 11/2014 Addala et al.
2014/0334645 A1 11/2014 Yun et al.
2014/0340888 A1 11/2014 Ishisone et al.
2014/0357248 A1 12/2014 Tonshal et al.
2014/0358535 A1 12/2014 Lee et al.
2014/0363022 A1 12/2014 Dizon et al.
2014/0363024 A1 12/2014 Apodaca
2014/0364089 A1 12/2014 Lienhart et al.
2014/0365225 A1 12/2014 Haiut
2014/0365227 A1 12/2014 Cash et al.
2014/0368734 A1 12/2014 Hoffert et al.
2014/0369491 A1 12/2014 Kloberdans et al.
2014/0372109 A1 12/2014 Iyer et al.
2015/0006176 A1 1/2015 Pogue et al.
2015/0006184 A1 1/2015 Marti et al.
2015/0010169 A1 1/2015 Popova et al.
2015/0014680 A1 1/2015 Yamazaki et al.
2015/0016642 A1 1/2015 Walsh et al.
2015/0018992 A1 1/2015 Griffiths et al.
2015/0019201 A1 1/2015 Schoenbach
2015/0019219 A1 1/2015 Tzirkel-Hancock et al.
2015/0030172 A1 1/2015 Gaensler et al.
2015/0032443 A1 1/2015 Karov et al.
2015/0032456 A1 1/2015 Wait
2015/0036831 A1 2/2015 Klippel
2015/0039303 A1 2/2015 Lesso et al.
2015/0039310 A1 2/2015 Clark et al.
2015/0039311 A1 2/2015 Clark et al.
2015/0039317 A1 2/2015 Klein et al.
2015/0058018 A1 2/2015 Georges et al.
2015/0063580 A1 3/2015 Huang et al.
2015/0066479 A1 3/2015 Pasupalak et al.
2015/0073807 A1 3/2015 Kumar
2015/0086034 A1 3/2015 Lombardi et al.
2015/0088500 A1 3/2015 Conliffe
2015/0091709 A1 4/2015 Reichert et al.
2015/0092947 A1 4/2015 Gossain et al.
2015/0104037 A1 4/2015 Lee et al.
2015/0106085 A1 4/2015 Lindahl
2015/0110294 A1 4/2015 Chen et al.
2015/0112672 A1 4/2015 Giacobello et al.
2015/0124975 A1 5/2015 Pontoppidan
2015/0126255 A1 5/2015 Yang et al.
2015/0128065 A1 5/2015 Torii et al.
2015/0134456 A1 5/2015 Baldwin
2015/0154953 A1 6/2015 Bapat et al.
2015/0154954 A1 6/2015 Sharifi
2015/0154976 A1 6/2015 Mutagi
2015/0161990 A1 6/2015 Sharifi
2015/0169279 A1 6/2015 Duga
2015/0170645 A1 6/2015 Di Censo et al.
2015/0170665 A1 6/2015 Gundeti et al.
2015/0172843 A1 6/2015 Quan
2015/0179181 A1 6/2015 Morris et al.
2015/0180432 A1 6/2015 Gao et al.
2015/0181318 A1 6/2015 Gautama et al.
2015/0189438 A1 7/2015 Hampiholi et al.
2015/0200454 A1 7/2015 Heusdens et al.
2015/0200923 A1 7/2015 Triplett
2015/0201271 A1 7/2015 Diethorn et al.
2015/0215382 A1 7/2015 Arora et al.
2015/0221307 A1 8/2015 Shah et al.
2015/0221678 A1 8/2015 Yamazaki et al.
2015/0222563 A1 8/2015 Burns et al.
2015/0222987 A1 8/2015 Angel, Jr. et al.
2015/0228274 A1 8/2015 Leppanen et al.
2015/0228803 A1 8/2015 Koezuka et al.
2015/0237406 A1 8/2015 Ochoa et al.
2015/0243287 A1 8/2015 Nakano et al.
2015/0245152 A1 8/2015 Ding et al.
2015/0245154 A1 8/2015 Dadu et al.
2015/0248885 A1 9/2015 Koulomzin
2015/0249889 A1 9/2015 Iyer et al.
2015/0253292 A1 9/2015 Larkin et al.
2015/0253960 A1 9/2015 Lin et al.
2015/0254057 A1 9/2015 Klein et al.
2015/0263174 A1 9/2015 Yamazaki et al.
2015/0271593 A1 9/2015 Sun et al.
2015/0277846 A1 10/2015 Yen et al.
2015/0279351 A1 10/2015 Nguyen et al.
2015/0280676 A1 10/2015 Holman et al.
2015/0296299 A1 10/2015 Klippel et al.
2015/0302856 A1 10/2015 Kim et al.
2015/0319529 A1 11/2015 Klippel
2015/0325267 A1 11/2015 Lee et al.
2015/0331663 A1 11/2015 Beckhardt et al.
2015/0334471 A1 11/2015 Innes et al.
2015/0338917 A1 11/2015 Steiner et al.
2015/0341406 A1 11/2015 Rockefeller et al.
2015/0346845 A1 12/2015 Di Censo et al.
2015/0348548 A1 12/2015 Piernot et al.
2015/0348551 A1 12/2015 Gruber et al.
2015/0355878 A1 12/2015 Corbin
2015/0356968 A1 12/2015 Rice et al.
2015/0363061 A1 12/2015 De Nigris, III et al.
2015/0363401 A1 12/2015 Chen et al.
2015/0370531 A1 12/2015 Faaborg
2015/0371657 A1 12/2015 Gao
2015/0371659 A1 12/2015 Gao
2015/0371664 A1 12/2015 Bar-Or et al.
2015/0373100 A1 12/2015 Kravets et al.
2015/0380010 A1 12/2015 Srinivasan
2015/0382047 A1 12/2015 Van Os et al.
2015/0382128 A1 12/2015 Ridihalgh et al.
2016/0007116 A1 1/2016 Holman
2016/0014536 A1 1/2016 Sheen
2016/0018873 A1 1/2016 Fernald et al.
2016/0021458 A1 1/2016 Johnson et al.
2016/0026428 A1 1/2016 Morganstern et al.
2016/0027440 A1 1/2016 Gelfenbeyn et al.
2016/0029142 A1 1/2016 Isaac et al.
2016/0034448 A1 2/2016 Tran
2016/0035321 A1 2/2016 Cho et al.
2016/0035337 A1 2/2016 Aggarwal et al.
2016/0036962 A1 2/2016 Rand et al.
2016/0042748 A1 2/2016 Jain et al.
2016/0044151 A1 2/2016 Shoemaker et al.
2016/0050488 A1 2/2016 Matheja et al.
2016/0055847 A1 2/2016 Dahan
2016/0055850 A1 2/2016 Nakadai et al.
2016/0057522 A1 2/2016 Choisel et al.
2016/0066087 A1 3/2016 Solbach et al.
2016/0070526 A1 3/2016 Sheen
2016/0072804 A1 3/2016 Chien et al.
2016/0077710 A1 3/2016 Lewis et al.
2016/0077794 A1 3/2016 Kim et al.
2016/0078864 A1 3/2016 Palanisamy et al.
2016/0086609 A1 3/2016 Yue et al.
2016/0088036 A1 3/2016 Corbin et al.
2016/0088392 A1 3/2016 Huttunen et al.
2016/0093281 A1 3/2016 Kuo et al.
2016/0093304 A1 3/2016 Kim et al.
2016/0094718 A1 3/2016 Mani et al.
2016/0094917 A1 3/2016 Wilk et al.
2016/0098393 A1 4/2016 Hebert
2016/0098992 A1 4/2016 Renard et al.
2016/0103653 A1 4/2016 Jang
2016/0104480 A1 4/2016 Sharifi
2016/0111110 A1 4/2016 Gautama et al.
2016/0118048 A1 4/2016 Heide
2016/0125876 A1 5/2016 Schroeter et al.
2016/0127780 A1 5/2016 Roberts et al.
2016/0133259 A1 5/2016 Rubin et al.
2016/0134924 A1 5/2016 Bush et al.
2016/0134966 A1* 5/2016 Fitzgerald .............. H04R 3/005 381/123
2016/0134982 A1 5/2016 Iyer
2016/0140957 A1 5/2016 Duta et al.
2016/0148612 A1 5/2016 Guo et al.
2016/0148615 A1 5/2016 Lee et al.
2016/0154089 A1 6/2016 Altman
2016/0155442 A1 6/2016 Kannan et al.
2016/0155443 A1 6/2016 Khan et al.
2016/0157035 A1 6/2016 Russell et al.

(56) References Cited

U.S. PATENT DOCUMENTS

2016/0162469 A1 6/2016 Santos
2016/0171976 A1 6/2016 Sun et al.
2016/0173578 A1 6/2016 Sharma et al.
2016/0173983 A1 6/2016 Berthelsen et al.
2016/0180853 A1 6/2016 Vanlund et al.
2016/0189716 A1 6/2016 Lindahl et al.
2016/0192099 A1 6/2016 Oishi et al.
2016/0196499 A1 7/2016 Khan et al.
2016/0203331 A1 7/2016 Khan et al.
2016/0210110 A1 7/2016 Feldman
2016/0212488 A1 7/2016 Os et al.
2016/0212538 A1 7/2016 Fullam et al.
2016/0216938 A1 7/2016 Millington
2016/0217789 A1 7/2016 Lee et al.
2016/0225385 A1 8/2016 Hammarqvist
2016/0232451 A1 8/2016 Scherzer
2016/0234204 A1 8/2016 Rishi et al.
2016/0239255 A1 8/2016 Chavez et al.
2016/0240192 A1 8/2016 Raghuvir
2016/0241976 A1 8/2016 Pearson
2016/0253050 A1 9/2016 Mishra et al.
2016/0260431 A1 9/2016 Newendorp et al.
2016/0283841 A1 9/2016 Sainath et al.
2016/0299737 A1 10/2016 Clayton et al.
2016/0302018 A1 10/2016 Russell et al.
2016/0314782 A1 10/2016 Klimanis
2016/0316293 A1 10/2016 Klimanis
2016/0322045 A1 11/2016 Hatfield et al.
2016/0335485 A1 11/2016 Kim
2016/0336519 A1 11/2016 Seo et al.
2016/0343866 A1 11/2016 Koezuka et al.
2016/0343949 A1 11/2016 Seo et al.
2016/0343954 A1 11/2016 Seo et al.
2016/0345114 A1 11/2016 Hanna et al.
2016/0352915 A1 12/2016 Gautama
2016/0353217 A1 12/2016 Starobin et al.
2016/0353218 A1 12/2016 Starobin et al.
2016/0357503 A1 12/2016 Triplett et al.
2016/0364206 A1 12/2016 Keyser-Allen et al.
2016/0366515 A1 12/2016 Mendes et al.
2016/0372113 A1 12/2016 David et al.
2016/0372688 A1 12/2016 Seo et al.
2016/0373269 A1 12/2016 Okubo et al.
2016/0373909 A1 12/2016 Rasmussen et al.
2016/0379634 A1 12/2016 Yamamoto et al.
2016/0379635 A1 12/2016 Page
2017/0003931 A1 1/2017 Dvortsov et al.
2017/0012207 A1 1/2017 Seo et al.
2017/0012232 A1 1/2017 Kataishi et al.
2017/0019732 A1 1/2017 Mendes et al.
2017/0025124 A1 1/2017 Mixter et al.
2017/0025615 A1 1/2017 Seo et al.
2017/0025630 A1 1/2017 Seo et al.
2017/0026769 A1 1/2017 Patel
2017/0032244 A1 2/2017 Kurata
2017/0034263 A1 2/2017 Archambault et al.
2017/0039025 A1 2/2017 Kielak
2017/0040002 A1 2/2017 Basson et al.
2017/0040018 A1 2/2017 Tormey
2017/0041724 A1 2/2017 Master et al.
2017/0053648 A1 2/2017 Chi
2017/0053650 A1 2/2017 Ogawa
2017/0060526 A1 3/2017 Barton et al.
2017/0062734 A1 3/2017 Suzuki et al.
2017/0070478 A1 3/2017 Park et al.
2017/0076212 A1 3/2017 Shams et al.
2017/0076720 A1 3/2017 Gopalan et al.
2017/0076726 A1 3/2017 Bae
2017/0078824 A1 3/2017 Heo
2017/0083285 A1 3/2017 Meyers et al.
2017/0083606 A1 3/2017 Mohan
2017/0084277 A1 3/2017 Sharifi
2017/0084278 A1 3/2017 Jung
2017/0084292 A1 3/2017 Yoo
2017/0084295 A1 3/2017 Tsiartas et al.
2017/0090864 A1 3/2017 Jorgovanovic
2017/0092278 A1 3/2017 Evermann et al.
2017/0092297 A1 3/2017 Sainath et al.
2017/0092299 A1 3/2017 Matsuo
2017/0092889 A1 3/2017 Seo et al.
2017/0092890 A1 3/2017 Seo et al.
2017/0094215 A1 3/2017 Western
2017/0103748 A1 4/2017 Weissberg et al.
2017/0103754 A1 4/2017 Higbie et al.
2017/0103755 A1 4/2017 Jeon et al.
2017/0110124 A1 4/2017 Boesen et al.
2017/0110130 A1 4/2017 Sharifi et al.
2017/0110144 A1 4/2017 Sharifi et al.
2017/0117497 A1 4/2017 Seo et al.
2017/0123251 A1 5/2017 Nakada et al.
2017/0125037 A1 5/2017 Shin
2017/0125456 A1 5/2017 Kasahara
2017/0133007 A1 5/2017 Drewes
2017/0133011 A1 5/2017 Chen et al.
2017/0134872 A1 5/2017 Silva et al.
2017/0139720 A1 5/2017 Stein
2017/0140449 A1 5/2017 Kannan
2017/0140748 A1 5/2017 Roberts et al.
2017/0140750 A1 5/2017 Wang et al.
2017/0140757 A1 5/2017 Penilla et al.
2017/0140759 A1 5/2017 Kumar et al.
2017/0151930 A1 6/2017 Boesen
2017/0164139 A1 6/2017 Deselaers et al.
2017/0177585 A1 6/2017 Rodger et al.
2017/0178662 A1 6/2017 Ayrapetian et al.
2017/0180561 A1 6/2017 Kadiwala et al.
2017/0186425 A1 6/2017 Dawes et al.
2017/0186427 A1 6/2017 Wang et al.
2017/0188150 A1 6/2017 Brunet et al.
2017/0188437 A1 6/2017 Banta
2017/0193999 A1 7/2017 Aleksic et al.
2017/0206896 A1 7/2017 Ko et al.
2017/0206900 A1 7/2017 Lee et al.
2017/0214996 A1 7/2017 Yeo
2017/0236512 A1 8/2017 Williams et al.
2017/0236515 A1 8/2017 Pinsky et al.
2017/0242649 A1 8/2017 Jarvis et al.
2017/0242651 A1 8/2017 Lang et al.
2017/0242653 A1 8/2017 Lang et al.
2017/0242656 A1 8/2017 Plagge et al.
2017/0242657 A1 8/2017 Jarvis et al.
2017/0243576 A1 8/2017 Millington et al.
2017/0243587 A1 8/2017 Plagge et al.
2017/0245076 A1 8/2017 Kusano et al.
2017/0255612 A1 9/2017 Sarikaya et al.
2017/0257686 A1 9/2017 Gautama et al.
2017/0269900 A1 9/2017 Triplett
2017/0269975 A1 9/2017 Wood et al.
2017/0270919 A1 9/2017 Parthasarathi et al.
2017/0278512 A1 9/2017 Pandya et al.
2017/0287485 A1 10/2017 Civelli et al.
2017/0300289 A1 10/2017 Gattis
2017/0300990 A1 10/2017 Tanaka et al.
2017/0329397 A1 11/2017 Lin
2017/0330565 A1 11/2017 Daley et al.
2017/0331869 A1 11/2017 Bendahan et al.
2017/0332035 A1 11/2017 Shah et al.
2017/0332168 A1 11/2017 Moghimi et al.
2017/0337932 A1 11/2017 Iyengar et al.
2017/0346872 A1 11/2017 Naik et al.
2017/0352357 A1 12/2017 Fink
2017/0353789 A1 12/2017 Kim et al.
2017/0357390 A1 12/2017 Alonso Ruiz et al.
2017/0357475 A1 12/2017 Lee et al.
2017/0357478 A1 12/2017 Piersol et al.
2017/0364371 A1 12/2017 Nandi et al.
2017/0365247 A1 12/2017 Ushakov
2017/0366393 A1 12/2017 Shaker et al.
2017/0374454 A1 12/2017 Bernardini et al.
2017/0374552 A1 12/2017 Xia et al.
2018/0012077 A1 1/2018 Laska et al.
2018/0018964 A1 1/2018 Reilly et al.
2018/0018965 A1 1/2018 Daley
2018/0018967 A1 1/2018 Lang et al.

(56) References Cited

U.S. PATENT DOCUMENTS

| | | | |
|---|---|---|---|
| 2018/0020306 | A1 | 1/2018 | Sheen |
| 2018/0025733 | A1 | 1/2018 | Qian et al. |
| 2018/0033428 | A1 | 2/2018 | Kim et al. |
| 2018/0033429 | A1 | 2/2018 | Makke et al. |
| 2018/0033438 | A1 | 2/2018 | Toma et al. |
| 2018/0040324 | A1 | 2/2018 | Wilberding |
| 2018/0047394 | A1 | 2/2018 | Tian et al. |
| 2018/0053504 | A1 | 2/2018 | Wang et al. |
| 2018/0054506 | A1 | 2/2018 | Hart et al. |
| 2018/0061396 | A1 | 3/2018 | Srinivasan et al. |
| 2018/0061402 | A1 | 3/2018 | Devaraj et al. |
| 2018/0061404 | A1 | 3/2018 | Devaraj et al. |
| 2018/0061409 | A1 | 3/2018 | Valentine et al. |
| 2018/0061419 | A1 | 3/2018 | Melendo Casado et al. |
| 2018/0061420 | A1 | 3/2018 | Patil et al. |
| 2018/0062871 | A1 | 3/2018 | Jones et al. |
| 2018/0084367 | A1 | 3/2018 | Greff et al. |
| 2018/0088900 | A1 | 3/2018 | Glaser et al. |
| 2018/0091898 | A1 | 3/2018 | Yoon et al. |
| 2018/0091913 | A1 | 3/2018 | Hartung et al. |
| 2018/0096678 | A1 | 4/2018 | Zhou et al. |
| 2018/0096683 | A1 | 4/2018 | James et al. |
| 2018/0096696 | A1 | 4/2018 | Mixter |
| 2018/0107446 | A1 | 4/2018 | Wilberding et al. |
| 2018/0108351 | A1 | 4/2018 | Beckhardt et al. |
| 2018/0120947 | A1 | 5/2018 | Wells et al. |
| 2018/0122372 | A1 | 5/2018 | Wanderlust |
| 2018/0122378 | A1 | 5/2018 | Mixter et al. |
| 2018/0130469 | A1 | 5/2018 | Gruenstein et al. |
| 2018/0132217 | A1 | 5/2018 | Stirling-Gallacher |
| 2018/0132298 | A1 | 5/2018 | Birnam et al. |
| 2018/0137857 | A1 | 5/2018 | Zhou et al. |
| 2018/0137861 | A1 | 5/2018 | Ogawa |
| 2018/0139512 | A1 | 5/2018 | Moran et al. |
| 2018/0152557 | A1 | 5/2018 | White et al. |
| 2018/0158454 | A1 | 6/2018 | Campbell et al. |
| 2018/0165055 | A1 | 6/2018 | Yu et al. |
| 2018/0167981 | A1 | 6/2018 | Jonna et al. |
| 2018/0174597 | A1 | 6/2018 | Lee et al. |
| 2018/0182383 | A1 | 6/2018 | Kim et al. |
| 2018/0182390 | A1 | 6/2018 | Hughes et al. |
| 2018/0182397 | A1 | 6/2018 | Carbune et al. |
| 2018/0182410 | A1 | 6/2018 | Kaskari et al. |
| 2018/0188948 | A1 | 7/2018 | Ouyang et al. |
| 2018/0190274 | A1 | 7/2018 | Kirazci et al. |
| 2018/0190285 | A1 | 7/2018 | Heckmann et al. |
| 2018/0196776 | A1 | 7/2018 | Hershko et al. |
| 2018/0197533 | A1 | 7/2018 | Lyon et al. |
| 2018/0199130 | A1 | 7/2018 | Jaffe et al. |
| 2018/0199146 | A1 | 7/2018 | Sheen |
| 2018/0204569 | A1 | 7/2018 | Nadkar et al. |
| 2018/0205963 | A1 | 7/2018 | Matei et al. |
| 2018/0210698 | A1 | 7/2018 | Park et al. |
| 2018/0211665 | A1 | 7/2018 | Park et al. |
| 2018/0218747 | A1 | 8/2018 | Moghimi et al. |
| 2018/0219976 | A1 | 8/2018 | Decenzo et al. |
| 2018/0225933 | A1 | 8/2018 | Park et al. |
| 2018/0228006 | A1 | 8/2018 | Baker et al. |
| 2018/0233130 | A1 | 8/2018 | Kaskari et al. |
| 2018/0233136 | A1 | 8/2018 | Torok et al. |
| 2018/0233137 | A1 | 8/2018 | Torok et al. |
| 2018/0233139 | A1 | 8/2018 | Finkelstein et al. |
| 2018/0233141 | A1 | 8/2018 | Solomon et al. |
| 2018/0233142 | A1 | 8/2018 | Koishida et al. |
| 2018/0233150 | A1 | 8/2018 | Gruenstein et al. |
| 2018/0234765 | A1 | 8/2018 | Torok et al. |
| 2018/0260680 | A1 | 9/2018 | Finkelstein et al. |
| 2018/0261213 | A1 | 9/2018 | Arik et al. |
| 2018/0262793 | A1 | 9/2018 | Lau et al. |
| 2018/0262831 | A1 | 9/2018 | Matheja et al. |
| 2018/0270565 | A1 | 9/2018 | Ganeshkumar |
| 2018/0270573 | A1 | 9/2018 | Lang et al. |
| 2018/0270575 | A1 | 9/2018 | Akutagawa |
| 2018/0277107 | A1 | 9/2018 | Kim |
| 2018/0277113 | A1 | 9/2018 | Hartung et al. |
| 2018/0277119 | A1 | 9/2018 | Baba et al. |
| 2018/0277133 | A1 | 9/2018 | Deetz et al. |
| 2018/0286394 | A1 | 10/2018 | Li et al. |
| 2018/0286414 | A1 | 10/2018 | Ravindran et al. |
| 2018/0293221 | A1 | 10/2018 | Finkelstein et al. |
| 2018/0293484 | A1 | 10/2018 | Wang et al. |
| 2018/0301147 | A1 | 10/2018 | Kim |
| 2018/0308470 | A1 | 10/2018 | Park et al. |
| 2018/0314552 | A1 | 11/2018 | Kim et al. |
| 2018/0322891 | A1 | 11/2018 | Van Den Oord et al. |
| 2018/0324756 | A1 | 11/2018 | Ryu et al. |
| 2018/0330589 | A1 | 11/2018 | Horling |
| 2018/0330727 | A1 | 11/2018 | Tulli |
| 2018/0335903 | A1 | 11/2018 | Coffman et al. |
| 2018/0336274 | A1 | 11/2018 | Choudhury et al. |
| 2018/0336892 | A1 | 11/2018 | Kim et al. |
| 2018/0349093 | A1 | 12/2018 | McCarty et al. |
| 2018/0350356 | A1 | 12/2018 | Garcia |
| 2018/0350379 | A1 | 12/2018 | Wung et al. |
| 2018/0352014 | A1 | 12/2018 | Alsina et al. |
| 2018/0352334 | A1 | 12/2018 | Family et al. |
| 2018/0356962 | A1 | 12/2018 | Corbin |
| 2018/0358009 | A1 | 12/2018 | Daley et al. |
| 2018/0358019 | A1 | 12/2018 | Mont-Reynaud |
| 2018/0365567 | A1 | 12/2018 | Kolavennu et al. |
| 2018/0367944 | A1 | 12/2018 | Heo et al. |
| 2019/0012141 | A1 | 1/2019 | Piersol et al. |
| 2019/0013019 | A1 | 1/2019 | Lawrence |
| 2019/0014592 | A1 | 1/2019 | Hampel et al. |
| 2019/0019112 | A1 | 1/2019 | Gelfenbeyn et al. |
| 2019/0033446 | A1 | 1/2019 | Bultan et al. |
| 2019/0035404 | A1 | 1/2019 | Gabel et al. |
| 2019/0037173 | A1 | 1/2019 | Lee |
| 2019/0042187 | A1 | 2/2019 | Truong et al. |
| 2019/0043488 | A1 | 2/2019 | Bocklet et al. |
| 2019/0043492 | A1 | 2/2019 | Lang |
| 2019/0044745 | A1 | 2/2019 | Knudson et al. |
| 2019/0051298 | A1 | 2/2019 | Lee et al. |
| 2019/0051299 | A1 | 2/2019 | Ossowski et al. |
| 2019/0066672 | A1 | 2/2019 | Wood et al. |
| 2019/0066680 | A1 | 2/2019 | Woo et al. |
| 2019/0066687 | A1 | 2/2019 | Wood et al. |
| 2019/0066710 | A1 | 2/2019 | Bryan et al. |
| 2019/0073999 | A1 | 3/2019 | Prémont et al. |
| 2019/0074025 | A1 | 3/2019 | Lashkari et al. |
| 2019/0079724 | A1 | 3/2019 | Feuz et al. |
| 2019/0081507 | A1 | 3/2019 | Ide |
| 2019/0081810 | A1 | 3/2019 | Jung |
| 2019/0082255 | A1 | 3/2019 | Tajiri et al. |
| 2019/0087455 | A1 | 3/2019 | He et al. |
| 2019/0088261 | A1 | 3/2019 | Lang et al. |
| 2019/0090056 | A1 | 3/2019 | Rexach et al. |
| 2019/0096408 | A1 | 3/2019 | Li et al. |
| 2019/0098400 | A1 | 3/2019 | Buoni et al. |
| 2019/0104119 | A1 | 4/2019 | Giorgi et al. |
| 2019/0104373 | A1 | 4/2019 | Wodrich et al. |
| 2019/0108839 | A1 | 4/2019 | Reilly et al. |
| 2019/0115011 | A1 | 4/2019 | Khellah et al. |
| 2019/0122662 | A1 | 4/2019 | Chang et al. |
| 2019/0130906 | A1 | 5/2019 | Kobayashi et al. |
| 2019/0147860 | A1 | 5/2019 | Chen et al. |
| 2019/0156847 | A1 | 5/2019 | Bryan et al. |
| 2019/0163153 | A1 | 5/2019 | Price et al. |
| 2019/0172452 | A1 | 6/2019 | Smith et al. |
| 2019/0172467 | A1 | 6/2019 | Kim et al. |
| 2019/0172476 | A1 | 6/2019 | Wung et al. |
| 2019/0173687 | A1 | 6/2019 | Mackay et al. |
| 2019/0179607 | A1 | 6/2019 | Thangarathnam et al. |
| 2019/0179611 | A1 | 6/2019 | Wojogbe et al. |
| 2019/0182072 | A1 | 6/2019 | Roe et al. |
| 2019/0186937 | A1 | 6/2019 | Sharifi et al. |
| 2019/0188328 | A1 | 6/2019 | Oyenan et al. |
| 2019/0189117 | A1 | 6/2019 | Kumar |
| 2019/0206391 | A1 | 7/2019 | Busch et al. |
| 2019/0206405 | A1 | 7/2019 | Gillespie et al. |
| 2019/0206412 | A1 | 7/2019 | Li et al. |
| 2019/0219976 | A1 | 7/2019 | Giorgi et al. |
| 2019/0220246 | A1 | 7/2019 | Orr et al. |
| 2019/0221206 | A1 | 7/2019 | Chen et al. |

(56) References Cited

U.S. PATENT DOCUMENTS

| | | | |
|---|---|---|---|
| 2019/0237067 A1 | 8/2019 | Friedman et al. | |
| 2019/0237089 A1 | 8/2019 | Shin | |
| 2019/0239008 A1 | 8/2019 | Lambourne | |
| 2019/0239009 A1 | 8/2019 | Lambourne | |
| 2019/0243603 A1 | 8/2019 | Keyser-Allen et al. | |
| 2019/0243606 A1 | 8/2019 | Jayakumar et al. | |
| 2019/0244608 A1 | 8/2019 | Choi et al. | |
| 2019/0251960 A1 | 8/2019 | Maker et al. | |
| 2019/0259408 A1 | 8/2019 | Freeman et al. | |
| 2019/0281387 A1 | 9/2019 | Woo et al. | |
| 2019/0281397 A1 | 9/2019 | Lambourne | |
| 2019/0287536 A1 | 9/2019 | Sharifi et al. | |
| 2019/0287546 A1 | 9/2019 | Ganeshkumar | |
| 2019/0288970 A1 | 9/2019 | Siddiq | |
| 2019/0289367 A1 | 9/2019 | Siddiq | |
| 2019/0295542 A1 | 9/2019 | Huang et al. | |
| 2019/0295555 A1 | 9/2019 | Wilberding | |
| 2019/0295556 A1 | 9/2019 | Wilberding | |
| 2019/0295563 A1 | 9/2019 | Kamdar et al. | |
| 2019/0297388 A1 | 9/2019 | Panchaksharaiah et al. | |
| 2019/0304443 A1 | 10/2019 | Bhagwan | |
| 2019/0311710 A1 | 10/2019 | Eraslan et al. | |
| 2019/0311712 A1 | 10/2019 | Firik et al. | |
| 2019/0311715 A1 | 10/2019 | Pfeffinger et al. | |
| 2019/0311718 A1 | 10/2019 | Huber et al. | |
| 2019/0311720 A1 | 10/2019 | Pasko | |
| 2019/0311722 A1 | 10/2019 | Caldwell | |
| 2019/0317606 A1 | 10/2019 | Jain et al. | |
| 2019/0318729 A1 | 10/2019 | Chao et al. | |
| 2019/0325870 A1 | 10/2019 | Mitic | |
| 2019/0325888 A1 | 10/2019 | Geng | |
| 2019/0341037 A1 | 11/2019 | Bromand et al. | |
| 2019/0341038 A1 | 11/2019 | Bromand et al. | |
| 2019/0342962 A1 | 11/2019 | Chang et al. | |
| 2019/0347063 A1 | 11/2019 | Liu et al. | |
| 2019/0348044 A1 | 11/2019 | Chun et al. | |
| 2019/0355384 A1* | 11/2019 | Sereshki | H04R 1/406 |
| 2019/0362714 A1 | 11/2019 | Mori et al. | |
| 2019/0364375 A1 | 11/2019 | Soto et al. | |
| 2019/0364422 A1 | 11/2019 | Zhuo | |
| 2019/0371310 A1 | 12/2019 | Fox et al. | |
| 2019/0371324 A1 | 12/2019 | Powell et al. | |
| 2019/0371329 A1 | 12/2019 | D'Souza et al. | |
| 2019/0371342 A1 | 12/2019 | Tukka et al. | |
| 2019/0392832 A1 | 12/2019 | Mitsui et al. | |
| 2020/0007987 A1 | 1/2020 | Woo et al. | |
| 2020/0034492 A1 | 1/2020 | Verbeke et al. | |
| 2020/0043489 A1 | 2/2020 | Bradley et al. | |
| 2020/0043494 A1 | 2/2020 | Maeng | |
| 2020/0051554 A1 | 2/2020 | Kim et al. | |
| 2020/0066279 A1 | 2/2020 | Kang et al. | |
| 2020/0074990 A1 | 3/2020 | Kim et al. | |
| 2020/0075018 A1 | 3/2020 | Chen | |
| 2020/0090647 A1 | 3/2020 | Kurtz | |
| 2020/0092687 A1 | 3/2020 | Devaraj et al. | |
| 2020/0098354 A1 | 3/2020 | Lin et al. | |
| 2020/0098379 A1 | 3/2020 | Tai et al. | |
| 2020/0105245 A1 | 4/2020 | Gupta et al. | |
| 2020/0105256 A1 | 4/2020 | Fainberg et al. | |
| 2020/0105264 A1 | 4/2020 | Jang et al. | |
| 2020/0110571 A1 | 4/2020 | Liu et al. | |
| 2020/0125162 A1 | 4/2020 | D'Amato et al. | |
| 2020/0135194 A1 | 4/2020 | Jeong | |
| 2020/0135224 A1 | 4/2020 | Bromand et al. | |
| 2020/0152206 A1 | 5/2020 | Shen et al. | |
| 2020/0167597 A1 | 5/2020 | Nguyen et al. | |
| 2020/0175989 A1 | 6/2020 | Lockhart et al. | |
| 2020/0184964 A1 | 6/2020 | Myers et al. | |
| 2020/0184980 A1 | 6/2020 | Wilberding | |
| 2020/0193973 A1 | 6/2020 | Tolomei et al. | |
| 2020/0211539 A1 | 7/2020 | Lee | |
| 2020/0211550 A1 | 7/2020 | Pan et al. | |
| 2020/0211556 A1 | 7/2020 | Mixter et al. | |
| 2020/0213729 A1 | 7/2020 | Soto | |
| 2020/0216089 A1 | 7/2020 | Garcia et al. | |
| 2020/0234709 A1 | 7/2020 | Kunitake | |
| 2020/0244650 A1 | 7/2020 | Burris et al. | |
| 2020/0251107 A1 | 8/2020 | Wang et al. | |
| 2020/0265838 A1 | 8/2020 | Lee et al. | |
| 2020/0265842 A1 | 8/2020 | Singh | |
| 2020/0310751 A1 | 10/2020 | Anand et al. | |
| 2020/0336846 A1 | 10/2020 | Rohde et al. | |
| 2020/0342869 A1 | 10/2020 | Lee et al. | |
| 2020/0364026 A1 | 11/2020 | Lee et al. | |
| 2020/0366477 A1 | 11/2020 | Brown et al. | |
| 2020/0395006 A1 | 12/2020 | Smith et al. | |
| 2020/0395010 A1 | 12/2020 | Smith et al. | |
| 2020/0395013 A1 | 12/2020 | Smith et al. | |
| 2020/0409652 A1 | 12/2020 | Wilberding et al. | |
| 2020/0409926 A1 | 12/2020 | Srinivasan et al. | |
| 2021/0029452 A1 | 1/2021 | Tsoi et al. | |
| 2021/0035561 A1 | 2/2021 | D'Amato et al. | |
| 2021/0035572 A1 | 2/2021 | D'Amato et al. | |
| 2021/0067867 A1 | 3/2021 | Kagoshima | |
| 2021/0118429 A1 | 4/2021 | Shan | |
| 2021/0118439 A1 | 4/2021 | Schillmoeller et al. | |
| 2021/0157542 A1 | 5/2021 | De Assis et al. | |
| 2021/0166680 A1 | 6/2021 | Jung et al. | |
| 2021/0183366 A1 | 6/2021 | Reinspach et al. | |
| 2021/0239831 A1 | 8/2021 | Shin et al. | |
| 2021/0249004 A1 | 8/2021 | Smith | |
| 2021/0280185 A1 | 9/2021 | Tan et al. | |
| 2021/0295849 A1 | 9/2021 | Van Der Ven et al. | |
| 2021/0358481 A1 | 11/2021 | D'Amato et al. | |
| 2022/0035514 A1 | 2/2022 | Shin et al. | |
| 2022/0036882 A1 | 2/2022 | Ahn et al. | |
| 2022/0050585 A1 | 2/2022 | Fettes et al. | |
| 2022/0083136 A1 | 3/2022 | DeLeeuw | |
| 2022/0301561 A1 | 9/2022 | Robert Jose et al. | |
| 2023/0019595 A1 | 1/2023 | Smith | |
| 2023/0215433 A1 | 7/2023 | Myers et al. | |
| 2023/0237998 A1 | 7/2023 | Smith et al. | |
| 2023/0274738 A1 | 8/2023 | Smith et al. | |
| 2023/0382349 A1 | 11/2023 | Ham | |

FOREIGN PATENT DOCUMENTS

| | | | |
|---|---|---|---|
| CN | 1323435 | A | 11/2001 |
| CN | 1748250 | A | 3/2006 |
| CN | 1781291 | A | 5/2006 |
| CN | 101310558 | A | 11/2008 |
| CN | 101427154 | A | 5/2009 |
| CN | 101480039 | A | 7/2009 |
| CN | 101661753 | A | 3/2010 |
| CN | 101686282 | A | 3/2010 |
| CN | 101907983 | A | 12/2010 |
| CN | 102123188 | A | 7/2011 |
| CN | 102256098 | A | 11/2011 |
| CN | 102567468 | A | 7/2012 |
| CN | 102999161 | A | 3/2013 |
| CN | 103052001 | A | 4/2013 |
| CN | 103181192 | A | 6/2013 |
| CN | 103210663 | A | 7/2013 |
| CN | 103546616 | A | 1/2014 |
| CN | 103811007 | A | 5/2014 |
| CN | 104010251 | A | 8/2014 |
| CN | 104035743 | A | 9/2014 |
| CN | 104053088 | A | 9/2014 |
| CN | 104092936 | A | 10/2014 |
| CN | 104104769 | A | 10/2014 |
| CN | 104115224 | A | 10/2014 |
| CN | 104155938 | A | 11/2014 |
| CN | 104282305 | A | 1/2015 |
| CN | 104520927 | A | 4/2015 |
| CN | 104538030 | A | 4/2015 |
| CN | 104572009 | A | 4/2015 |
| CN | 104575504 | A | 4/2015 |
| CN | 104581510 | A | 4/2015 |
| CN | 104635539 | A | 5/2015 |
| CN | 104865550 | A | 8/2015 |
| CN | 104885406 | A | 9/2015 |
| CN | 104885438 | A | 9/2015 |
| CN | 105101083 | A | 11/2015 |
| CN | 105162886 | A | 12/2015 |

(56) References Cited

FOREIGN PATENT DOCUMENTS

| | | | |
|---|---|---|---|
| CN | 105187907 | A | 12/2015 |
| CN | 105204357 | A | 12/2015 |
| CN | 105206281 | A | 12/2015 |
| CN | 105284076 | A | 1/2016 |
| CN | 105284168 | A | 1/2016 |
| CN | 105389099 | A | 3/2016 |
| CN | 105427861 | A | 3/2016 |
| CN | 105453179 | A | 3/2016 |
| CN | 105472191 | A | 4/2016 |
| CN | 105493179 | A | 4/2016 |
| CN | 105493442 | A | 4/2016 |
| CN | 105632486 | A | 6/2016 |
| CN | 105679318 | A | 6/2016 |
| CN | 106028223 | A | 10/2016 |
| CN | 106030699 | A | 10/2016 |
| CN | 106375902 | A | 2/2017 |
| CN | 106531165 | A | 3/2017 |
| CN | 106708403 | A | 5/2017 |
| CN | 106796784 | A | 5/2017 |
| CN | 106910500 | A | 6/2017 |
| CN | 107004410 | A | 8/2017 |
| CN | 107122158 | A | 9/2017 |
| CN | 107465974 | A | 12/2017 |
| CN | 107644313 | A | 1/2018 |
| CN | 107767863 | A | 3/2018 |
| CN | 107832837 | A | 3/2018 |
| CN | 107919116 | A | 4/2018 |
| CN | 107919123 | A | 4/2018 |
| CN | 108028047 | A | 5/2018 |
| CN | 108028048 | A | 5/2018 |
| CN | 108198548 | A | 6/2018 |
| CN | 109712626 | A | 5/2019 |
| EP | 1349146 | A1 | 10/2003 |
| EP | 1389853 | A1 | 2/2004 |
| EP | 2051542 | A1 | 4/2009 |
| EP | 2166737 | A1 | 3/2010 |
| EP | 2683147 | A1 | 1/2014 |
| EP | 2986034 | A1 | 2/2016 |
| EP | 3128767 | A2 | 2/2017 |
| EP | 3133595 | A1 | 2/2017 |
| EP | 3142107 | A1 | 3/2017 |
| EP | 2351021 | B1 | 9/2017 |
| EP | 3270377 | A1 | 1/2018 |
| EP | 3285502 | A1 | 2/2018 |
| GB | 2501367 | A | 10/2013 |
| JP | S63301998 | A | 12/1988 |
| JP | H0883091 | A | 3/1996 |
| JP | 2001236093 | A | 8/2001 |
| JP | 2003223188 | A | 8/2003 |
| JP | 2004096520 | A | 3/2004 |
| JP | 2004109361 | A | 4/2004 |
| JP | 2004163590 | A | 6/2004 |
| JP | 2004347943 | A | 12/2004 |
| JP | 2004354721 | A | 12/2004 |
| JP | 2005242134 | A | 9/2005 |
| JP | 2005250867 | A | 9/2005 |
| JP | 2005284492 | A | 10/2005 |
| JP | 2006092482 | A | 4/2006 |
| JP | 2007013400 | A | 1/2007 |
| JP | 2007142595 | A | 6/2007 |
| JP | 2007235875 | A | 9/2007 |
| JP | 2008079256 | A | 4/2008 |
| JP | 2008158868 | A | 7/2008 |
| JP | 2008217444 | A | 9/2008 |
| JP | 2010141748 | A | 6/2010 |
| JP | 2013037148 | A | 2/2013 |
| JP | 2014071138 | A | 4/2014 |
| JP | 2014510481 | A | 4/2014 |
| JP | 2014137590 | A | 7/2014 |
| JP | 2015161551 | A | 9/2015 |
| JP | 2015527768 | A | 9/2015 |
| JP | 2016009193 | A | 1/2016 |
| JP | 2016095383 | A | 5/2016 |
| JP | 2017072857 | A | 4/2017 |
| JP | 2017129860 | A | 7/2017 |
| JP | 2017227912 | A | 12/2017 |
| JP | 2018055259 | A | 4/2018 |
| JP | 2019109510 | A | 7/2019 |
| KR | 20100036351 | A | 4/2010 |
| KR | 100966415 | B1 | 6/2010 |
| KR | 20100111071 | A | 10/2010 |
| KR | 20130050987 | A | 5/2013 |
| KR | 101284134 | B1 | 7/2013 |
| KR | 20140005410 | A | 1/2014 |
| KR | 20140035310 | A | 3/2014 |
| KR | 20140054643 | A | 5/2014 |
| KR | 20140111859 | A | 9/2014 |
| KR | 20140112900 | A | 9/2014 |
| TW | 201629950 | A | 8/2016 |
| WO | 200153994 | | 7/2001 |
| WO | 03054854 | A2 | 7/2003 |
| WO | 2003093950 | A2 | 11/2003 |
| WO | 2008048599 | A1 | 4/2008 |
| WO | 2008096414 | A1 | 8/2008 |
| WO | 2012166386 | A2 | 12/2012 |
| WO | 2013184792 | A1 | 12/2013 |
| WO | 2014064531 | A1 | 5/2014 |
| WO | 2014159581 | A1 | 10/2014 |
| WO | 2015017303 | A1 | 2/2015 |
| WO | 2015037396 | A1 | 3/2015 |
| WO | 2015105788 | A1 | 7/2015 |
| WO | 2015131024 | A1 | 9/2015 |
| WO | 2015133022 | A1 | 9/2015 |
| WO | 2015178950 | A1 | 11/2015 |
| WO | 2015195216 | A1 | 12/2015 |
| WO | 2016003509 | A1 | 1/2016 |
| WO | 2016014142 | A1 | 1/2016 |
| WO | 2016014686 | | 1/2016 |
| WO | 2016014686 | A1 | 1/2016 |
| WO | 2016022926 | A1 | 2/2016 |
| WO | 2016033364 | A1 | 3/2016 |
| WO | 2016057268 | A1 | 4/2016 |
| WO | 2016085775 | A2 | 6/2016 |
| WO | 2016136062 | A1 | 9/2016 |
| WO | 2016165067 | A1 | 10/2016 |
| WO | 2016171956 | A1 | 10/2016 |
| WO | 2016200593 | A1 | 12/2016 |
| WO | 2017039632 | A1 | 3/2017 |
| WO | 2017058654 | A1 | 4/2017 |
| WO | 2017138934 | A1 | 8/2017 |
| WO | 2017147075 | A1 | 8/2017 |
| WO | 2017147936 | A1 | 9/2017 |
| WO | 2018027142 | A1 | 2/2018 |
| WO | 2018064362 | A1 | 4/2018 |
| WO | 2018067404 | A1 | 4/2018 |
| WO | 2018140777 | A1 | 8/2018 |
| WO | 2019005772 | A1 | 1/2019 |
| WO | 2020061439 | A1 | 3/2020 |
| WO | 2020068795 | A1 | 4/2020 |
| WO | 2020132298 | A1 | 6/2020 |

OTHER PUBLICATIONS

Chinese Patent Office, Chinese Office Action and Translation mailed on Mar. 30, 2021, issued in connection with Chinese Application No. 202010302650.7, 15 pages.

Chinese Patent Office, First Office Action and Translation mailed on Jun. 1, 2021, issued in connection with Chinese Application No. 201980089721.5, 21 pages.

Chinese Patent Office, First Office Action and Translation mailed on Feb. 9, 2023, issued in connection with Chinese Application No. 201880076788.0, 13 pages.

Chinese Patent Office, First Office Action and Translation mailed on Oct. 9, 2022, issued in connection with Chinese Application No. 201780056695.7, 10 pages.

Chinese Patent Office, First Office Action and Translation mailed on Dec. 1, 2021, issued in connection with Chinese Application No. 201780077204.7, 11 pages.

Chinese Patent Office, First Office Action and Translation mailed on Nov. 10, 2022, issued in connection with Chinese Application No. 201980070006.7, 15 pages.

(56) References Cited

OTHER PUBLICATIONS

Chinese Patent Office, First Office Action and Translation mailed on Jan. 19, 2023, issued in connection with Chinese Application No. 201880064916.X, 10 pages.
Chinese Patent Office, First Office Action and Translation mailed on Sep. 19, 2022, issued in connection with Chinese Application No. 201980056604.9, 13 pages.
Chinese Patent Office, First Office Action and Translation mailed on Dec. 20, 2021, issued in connection with Chinese Application No. 202010302650.7, 10 pages.
Chinese Patent Office, First Office Action and Translation mailed on Mar. 20, 2019, issued in connection with Chinese Application No. 201780025028.2, 18 pages.
Chinese Patent Office, First Office Action and Translation mailed on Nov. 25, 2022, issued in connection with Chinese Application No. 201780056321.5, 8 pages.
Chinese Patent Office, First Office Action and Translation mailed on Feb. 27, 2023, issued in connection with Chinese Application No. 201980003798.6, 12 pages.
Chinese Patent Office, First Office Action and Translation mailed on Mar. 27, 2019, issued in connection with Chinese Application No. 201780025029.7, 9 pages.
Chinese Patent Office, First Office Action and Translation mailed on May 27, 2021, issued in connection with Chinese Application No. 201880026360.5, 15 pages.
Chinese Patent Office, First Office Action and Translation mailed on Dec. 28, 2020, issued in connection with Chinese Application No. 201880072203.8, 11 pages.
Chinese Patent Office, First Office Action and Translation mailed on Dec. 30, 2022, issued in connection with Chinese Application No. 201880076775.3, 10 pages.
Chinese Patent Office, First Office Action and Translation mailed on Nov. 5, 2019, issued in connection with Chinese Application No. 201780072651.3, 19 pages.
Chinese Patent Office, First Office Action and Translation mailed on Sep. 6, 2023, issued in connection with Chinese Application No. 202010179593.8, 14 pages.
Chinese Patent Office, First Office Action mailed on Feb. 28, 2020, issued in connection with Chinese Application No. 201780061543.6, 29 pages.
Chinese Patent Office, Second Office Action and Translation mailed on Mar. 3, 2022, issued in connection with Chinese Application No. 201880077216.4, 11 pages.
Chinese Patent Office, Second Office Action and Translation mailed on Apr. 1, 2023, issued in connection with Chinese Application No. 201980056604.9, 11 pages.
Chinese Patent Office, Second Office Action and Translation mailed on May 11, 2020, issued in connection with Chinese Application No. 201780061543.6, 17 pages.
Chinese Patent Office, Second Office Action and Translation mailed on Jul. 18, 2019, issued in connection with Chinese Application No. 201780025029.7, 14 pages.
Chinese Patent Office, Second Office Action and Translation mailed on Sep. 23, 2019, issued in connection with Chinese Application No. 201780025028.2, 15 pages.
Chinese Patent Office, Second Office Action and Translation mailed on Mar. 31, 2020, issued in connection with Chinese Application No. 201780072651.3, 17 pages.
Chinese Patent Office, Second Office Action mailed on Dec. 21, 2022, issued in connection with Chinese Application No. 201980089721.5, 12 pages.
Chinese Patent Office, Second Office Action mailed on May 30, 2023, issued in connection with Chinese Application No. 201980070006.7, 9 pages.
Chinese Patent Office, Third Office Action and Translation mailed on Sep. 16, 2019, issued in connection with Chinese Application No. 201780025029.7, 14 pages.
Chinese Patent Office, Third Office Action and Translation mailed on Aug. 5, 2020, issued in connection with Chinese Application No. 201780072651.3, 10 pages.
Chinese Patent Office, Translation of Office Action mailed on Jul. 18, 2019, issued in connection with Chinese Application No. 201780025029.7, 8 pages.
Chung et al. Empirical Evaluation of Gated Recurrent Neural Network on Sequence Modeling. Dec. 11, 2014, 9 pages.
Cipriani,. The complete list of OK, Google commands—CNET. Jul. 1, 2016, 5 pages. [online], [retrieved on Jan. 15, 2020]. Retrieved from the Internet: (URL:https://web.archive.org/web/20160803230926/https://www.cnet.com/how-to/complete-list-of-ok-googl ••-commands/).
Corrected Notice of Allowability mailed on Mar. 8, 2017, issued in connection with U.S. Appl. No. 15/229,855, filed Aug. 5, 2016, 6 pages.
Couke et al. Efficient Keyword Spotting using Dilated Convolutions and Gating, arXiv: 1811.07684v2, Feb. 18, 2019, 5 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
European Patent Office, Decision to Refuse European Patent Application mailed on May 30, 2022, issued in connection with European Application No. 17200837.7, 4 pages.
European Patent Office, European EPC Article 94.3 mailed on Jun. 5, 2023, issued in connection with European Application No. 20710649.3, 8 pages.
European Patent Office, European EPC Article 94.3 mailed on Feb. 10, 2023, issued in connection with European Application No. 19729968.8, 7 pages.
European Patent Office, European EPC Article 94.3 mailed on Jan. 10, 2024, issued in connection with European Application No. 20757152.2, 6 pages.
European Patent Office, European EPC Article 94.3 mailed on Mar. 11, 2022, issued in connection with European Application No. 19731415.6, 7 pages.
European Patent Office, European EPC Article 94.3 mailed on Nov. 11, 2021, issued in connection with European Application No. 19784172.9, 5 pages.
European Patent Office, European EPC Article 94.3 mailed on Oct. 12, 2023, issued in connection with European Application No. 20736489.4, 8 pages.
European Patent Office, European EPC Article 94.3 mailed on Dec. 18, 2023, issued in connection with European Application No. 21703134.3, 7 pages.
European Patent Office, European EPC Article 94.3 mailed on May 2, 2022, issued in connection with European Application No. 20185599.6, 7 pages.
European Patent Office, European EPC Article 94.3 mailed on Jun. 21, 2022, issued in connection with European Application No. 19780508.8, 5 pages.
European Patent Office, European EPC Article 94.3 mailed on Feb. 23, 2021, issued in connection with European Application No. 17200837.7, 8 pages.
European Patent Office, European EPC Article 94.3 mailed on Feb. 23, 2023, issued in connection with European Application No. 19839734.1, 8 pages.
European Patent Office, European EPC Article 94.3 mailed on Jan. 24, 2024, issued in connection with European Application No. 21180778.9, 8 pages.
Notice of Allowance mailed on Feb. 28, 2024, issued in connection with U.S. Appl. No. 16/989,350, filed Aug. 10, 2020, 9 pages.
Notice of Allowance mailed on Mar. 28, 2018, issued in connection with U.S. Appl. No. 15/699,982, filed Sep. 8, 2017, 17 pages.
Notice of Allowance mailed on Mar. 28, 2024, issued in connection with U.S. Appl. No. 18/316,400, filed May 12, 2023, 8 pages.
Notice of Allowance mailed on May 28, 2021, issued in connection with U.S. Appl. No. 16/524,306, filed Jul. 29, 2019, 9 pages.
Notice of Allowance mailed on Sep. 28, 2022, issued in connection with U.S. Appl. No. 17/444,043, filed Jul. 29, 2021, 17 pages.
Notice of Allowance mailed on Dec. 29, 2017, issued in connection with U.S. Appl. No. 15/131,776, filed Apr. 18, 2016, 13 pages.
Notice of Allowance mailed on Dec. 29, 2022, issued in connection with U.S. Appl. No. 17/327,911, filed May 24, 2021, 14 pages.

(56) References Cited

OTHER PUBLICATIONS

Notice of Allowance mailed on Jan. 29, 2021, issued in connection with U.S. Appl. No. 16/290,599, filed Mar. 1, 2019, 9 pages.
Notice of Allowance mailed on Jul. 29, 2022, issued in connection with U.S. Appl. No. 17/236,559, filed Apr. 21, 2021, 6 pages.
Notice of Allowance mailed on Jun. 29, 2020, issued in connection with U.S. Appl. No. 16/216,357, filed Dec. 11, 2018, 8 pages.
Notice of Allowance mailed on Mar. 29, 2021, issued in connection with U.S. Appl. No. 16/600,949, filed Oct. 14, 2019, 9 pages.
Notice of Allowance mailed on Mar. 29, 2023, issued in connection with U.S. Appl. No. 17/722,438, filed Apr. 18, 2022, 7 pages.
Notice of Allowance mailed on May 29, 2020, issued in connection with U.S. Appl. No. 16/148,879, filed Oct. 1, 2018, 6 pages.
Notice of Allowance mailed on Sep. 29, 2021, issued in connection with U.S. Appl. No. 16/876,493, filed May 18, 2020, 5 pages.
Notice of Allowance mailed on Sep. 29, 2023, issued in connection with U.S. Appl. No. 16/168,389, filed Oct. 23, 2018, 11 pages.
Notice of Allowance mailed on Apr. 3, 2019, issued in connection with U.S. Appl. No. 16/160,107, filed Oct. 15, 2018, 7 pages.
Notice of Allowance mailed on Jun. 3, 2021, issued in connection with U.S. Appl. No. 16/876,493, filed May 18, 2020, 7 pages.
Notice of Allowance mailed on Mar. 3, 2022, issued in connection with U.S. Appl. No. 16/679,538, filed Nov. 11, 2019, 7 pages.
Notice of Allowance mailed on Jul. 30, 2018, issued in connection with U.S. Appl. No. 15/098,718, filed Apr. 14, 2016, 5 pages.
Notice of Allowance mailed on Jul. 30, 2019, issued in connection with U.S. Appl. No. 15/131,254, filed Apr. 18, 2016, 9 pages.
Notice of Allowance mailed on Jun. 30, 2023, issued in connection with U.S. Appl. No. 17/303,001, filed May 18, 2021, 8 pages.
Notice of Allowance mailed on Mar. 30, 2020, issued in connection with U.S. Appl. No. 15/973,413, filed May 7, 2018, 5 pages.
Notice of Allowance mailed on Mar. 30, 2023, issued in connection with U.S. Appl. No. 17/303,066, filed May 19, 2021, 7 pages.
Notice of Allowance mailed on Nov. 30, 2018, issued in connection with U.S. Appl. No. 15/438,725, filed Feb. 21, 2017, 5 pages.
Notice of Allowance mailed on Oct. 30, 2019, issued in connection with U.S. Appl. No. 16/131,392, filed Sep. 14, 2018, 9 pages.
Notice of Allowance mailed on Oct. 30, 2020, issued in connection with U.S. Appl. No. 16/528,016, filed Jul. 31, 2019, 10 pages.
Notice of Allowance mailed on Aug. 31, 2023, issued in connection with U.S. Appl. No. 18/145,520, filed Dec. 22, 2022, 2 pages.
Notice of Allowance mailed on Mar. 31, 2023, issued in connection with U.S. Appl. No. 17/303,735, filed Jun. 7, 2021, 19 pages.
Notice of Allowance mailed on May 31, 2019, issued in connection with U.S. Appl. No. 15/717,621, filed Sep. 27, 2017, 9 pages.
Notice of Allowance mailed on Aug. 4, 2023, issued in connection with U.S. Appl. No. 18/145,520, filed Dec. 22, 2022, 10 pages.
Notice of Allowance mailed on Jun. 4, 2021, issued in connection with U.S. Appl. No. 16/528,265, filed Jul. 31, 2019, 17 pages.
Notice of Allowance mailed on Mar. 4, 2020, issued in connection with U.S. Appl. No. 16/444,975, filed Jun. 18, 2019, 10 pages.
Notice of Allowance mailed on Apr. 5, 2023, issued in connection with U.S. Appl. No. 17/549,253, filed Dec. 13, 2021, 10 pages.
Notice of Allowance mailed on Feb. 5, 2020, issued in connection with U.S. Appl. No. 16/178,122, filed Nov. 1, 2018, 9 pages.
Notice of Allowance mailed on Oct. 5, 2018, issued in connection with U.S. Appl. No. 15/211,748, filed Jul. 15, 2018, 10 pages.
Notice of Allowance mailed on Feb. 6, 2019, issued in connection with U.S. Appl. No. 16/102,153, filed Aug. 13, 2018, 9 pages.
Notice of Allowance mailed on Feb. 6, 2020, issued in connection with U.S. Appl. No. 16/227,308, filed Dec. 20, 2018, 7 pages.
Notice of Allowance mailed on Mar. 6, 2023, issued in connection with U.S. Appl. No. 17/449,926, filed Oct. 4, 2021, 8 pages.
Notice of Allowance mailed on Apr. 7, 2020, issued in connection with U.S. Appl. No. 15/098,760, filed Apr. 14, 2016, 7 pages.
Notice of Allowance mailed on Apr. 7, 2020, issued in connection with U.S. Appl. No. 16/147,710, filed Sep. 29, 2018, 15 pages.
Notice of Allowance mailed on Jun. 7, 2019, issued in connection with U.S. Appl. No. 16/102,153, filed Aug. 13, 2018, 9 pages.
Notice of Allowance mailed on Jun. 7, 2021, issued in connection with U.S. Appl. No. 16/528,224, filed Jul. 31, 2019, 9 pages.
Notice of Allowance mailed on Apr. 8, 2022, issued in connection with U.S. Appl. No. 16/813,643, filed Mar. 9, 2020, 7 pages.
Notice of Allowance mailed on Mar. 8, 2024, issued in connection with U.S. Appl. No. 17/135,173, filed Dec. 28, 2020, 9 pages.
Notice of Allowance mailed on Nov. 8, 2021, issued in connection with U.S. Appl. No. 17/008,104, filed Aug. 31, 2020, 9 pages.
Notice of Allowance mailed on Nov. 8, 2023, issued in connection with U.S. Appl. No. 18/066,093, filed Dec. 14, 2022, 11 pages.
Notice of Allowance mailed on Aug. 9, 2018, issued in connection with U.S. Appl. No. 15/229,868, filed Aug. 5, 2016, 11 pages.
Notice of Allowance mailed on Dec. 9, 2021, issued in connection with U.S. Appl. No. 16/845,946, filed Apr. 10, 2020, 10 pages.
Notice of Allowance mailed on Feb. 9, 2022, issued in connection with U.S. Appl. No. 17/247,736, filed Dec. 21, 2020, 8 pages.
Notice of Allowance mailed on Mar. 9, 2018, issued in connection with U.S. Appl. No. 15/584,782, filed May 2, 2017, 8 pages.
Notice of Allowance mailed on Dec. 2, 2020, issued in connection with U.S. Appl. No. 15/989,715, filed May 25, 2018, 11 pages.
Notice of Allowance mailed on Dec. 2, 2021, issued in connection with U.S. Appl. No. 16/841,116, filed Apr. 6, 2020, 5 pages.
Notice of Allowance mailed on Oct. 2, 2023, issued in connection with U.S. Appl. No. 17/810,533, filed Jul. 1, 2022, 8 pages.
Notice of Allowance mailed on Sep. 2, 2020, issued in connection with U.S. Appl. No. 16/214,711, filed Dec. 10, 2018, 9 pages.
Notice of Allowance mailed on Dec. 20, 2022, issued in connection with U.S. Appl. No. 16/806,747, filed Mar. 2, 2020, 5 pages.
Notice of Allowance mailed on Jan. 20, 2023, issued in connection with U.S. Appl. No. 16/915,234, filed Jun. 29, 2020, 6 pages.
Notice of Allowance mailed on Jul. 20, 2020, issued in connection with U.S. Appl. No. 15/984,073, filed May 18, 2018, 12 pages.
Notice of Allowance mailed on Jun. 20, 2022, issued in connection with U.S. Appl. No. 16/947,895, filed Aug. 24, 2020, 7 pages.
Notice of Allowance mailed on Mar. 20, 2018, issued in connection with U.S. Appl. No. 15/784,952, filed Oct. 16, 2017, 7 pages.
Notice of Allowance mailed on Mar. 20, 2023, issued in connection with U.S. Appl. No. 17/562,412, filed Dec. 27, 2021, 9 pages.
Notice of Allowance mailed on Oct. 20, 2021, issued in connection with U.S. Appl. No. 16/439,032, filed Jun. 12, 2019, 8 pages.
Notice of Allowance mailed on Sep. 20, 2018, issued in connection with U.S. Appl. No. 15/946,599, filed Apr. 5, 2018, 7 pages.
Notice of Allowance mailed on Apr. 21, 2021, issued in connection with U.S. Appl. No. 16/145,275, filed Sep. 28, 2018, 8 pages.
Notice of Allowance mailed on Aug. 21, 2023, issued in connection with U.S. Appl. No. 17/548,921, filed Dec. 13, 2021, 10 pages.
Notice of Allowance mailed on Dec. 21, 2021, issued in connection with U.S. Appl. No. 16/271,550, filed Feb. 8, 2019, 11 pages.
Notice of Allowance mailed on Feb. 21, 2020, issued in connection with U.S. Appl. No. 16/416,752, filed May 20, 2019, 6 pages.
Notice of Allowance mailed on Jan. 21, 2020, issued in connection with U.S. Appl. No. 16/672,764, filed Nov. 4, 2019, 10 pages.
Notice of Allowance mailed on Jan. 21, 2021, issued in connection with U.S. Appl. No. 16/600,644, filed Oct. 14, 2019, 7 pages.
Notice of Allowance mailed on Jul. 21, 2023, issued in connection with U.S. Appl. No. 17/986,241, filed Nov. 14, 2022, 12 pages.
Notice of Allowance mailed on Mar. 21, 2023, issued in connection with U.S. Appl. No. 17/353,254, filed Jun. 21, 2021, 8 pages.
Notice of Allowance mailed on Nov. 21, 2022, issued in connection with U.S. Appl. No. 17/454,676, filed Nov. 12, 2021, 8 pages.
Notice of Allowance mailed on Oct. 21, 2019, issued in connection with U.S. Appl. No. 15/946,585, filed Apr. 5, 2018, 5 pages.
Notice of Allowance mailed on Sep. 21, 2022, issued in connection with U.S. Appl. No. 17/128,949, filed Dec. 21, 2020, 8 pages.
Notice of Allowance mailed on Aug. 22, 2017, issued in connection with U.S. Appl. No. 15/273,679, filed Sep. 22, 2016, 5 pages.
Notice of Allowance mailed on Jan. 22, 2018, issued in connection with U.S. Appl. No. 15/178,180, filed Jun. 9, 2016, 9 pages.
Notice of Allowance mailed on Jul. 22, 2020, issued in connection with U.S. Appl. No. 16/131,409, filed Sep. 14, 2018, 13 pages.
Notice of Allowance mailed on Jul. 22, 2020, issued in connection with U.S. Appl. No. 16/790,621, filed Feb. 13, 2020, 10 pages.

(56) References Cited

OTHER PUBLICATIONS

Notice of Allowance mailed on Nov. 22, 2021, issued in connection with U.S. Appl. No. 16/834,483, filed Mar. 30, 2020, 10 pages.
Notice of Allowance mailed on Sep. 22, 2022, issued in connection with U.S. Appl. No. 17/163,506, filed Jan. 31, 2021, 13 pages.
Notice of Allowance mailed on Sep. 22, 2022, issued in connection with U.S. Appl. No. 17/248,427, filed Jan. 25, 2021, 9 pages.
Notice of Allowance mailed on Aug. 23, 2021, issued in connection with U.S. Appl. No. 16/109,375, filed Aug. 22, 2018, 10 pages.
Notice of Allowance mailed on Feb. 23, 2023, issued in connection with U.S. Appl. No. 17/532,674, filed Nov. 22, 2021, 10 pages.
Notice of Allowance mailed on Jun. 23, 2021, issued in connection with U.S. Appl. No. 16/814,844, filed Mar. 10, 2020, 8 pages.
Notice of Allowance mailed on Apr. 24, 2019, issued in connection with U.S. Appl. No. 16/154,469, filed Oct. 8, 2018, 5 pages.
Notice of Allowance mailed on Mar. 24, 2022, issued in connection with U.S. Appl. No. 16/378,516, filed Apr. 8, 2019, 7 pages.
Notice of Allowance mailed on Nov. 24, 2023, issued in connection with U.S. Appl. No. 18/070,024, filed Nov. 28, 2022, 7 pages.
Notice of Allowance mailed on Oct. 25, 2021, issued in connection with U.S. Appl. No. 16/723,909, filed Dec. 20, 2019, 11 pages.
Notice of Allowance mailed on Apr. 26, 2022, issued in connection with U.S. Appl. No. 17/896,129, filed Aug. 26, 2022, 8 pages.
Notice of Allowance mailed on Apr. 26, 2023, issued in connection with U.S. Appl. No. 17/658,717, filed Apr. 11, 2022, 11 pages.
Notice of Allowance mailed on Aug. 26, 2020, issued in connection with U.S. Appl. No. 15/948,541, filed Apr. 9, 2018, 9 pages.
Notice of Allowance mailed on Aug. 26, 2022, issued in connection with U.S. Appl. No. 17/145,667, filed Jan. 11, 2021, 8 pages.
Notice of Allowance mailed on May 26, 2021, issued in connection with U.S. Appl. No. 16/927,670, filed Jul. 13, 2020, 10 pages.
Notice of Allowance mailed on Oct. 26, 2022, issued in connection with U.S. Appl. No. 17/486,574, filed Sep. 27, 2021, 11 pages.
Notice of Allowance mailed on Apr. 27, 2020, issued in connection with U.S. Appl. No. 16/700,607, filed Dec. 2, 2019, 10 pages.
Notice of Allowance mailed on Jun. 27, 2022, issued in connection with U.S. Appl. No. 16/812,758, filed Mar. 9, 2020, 16 pages.
Notice of Allowance mailed on Mar. 27, 2019, issued in connection with U.S. Appl. No. 16/214,666, filed Dec. 10, 2018, 6 pages.
Notice of Allowance mailed on Mar. 27, 2024, issued in connection with U.S. Appl. No. 18/061,570, filed Dec. 5, 2022, 8 pages.
Notice of Allowance mailed on Sep. 27, 2023, issued in connection with U.S. Appl. No. 17/656,794, filed Mar. 28, 2022, 11 pages.
Notice of Allowance mailed on Sep. 27, 2023, issued in connection with U.S. Appl. No. 18/048,945, filed Oct. 24, 2022, 9 pages.
Notice of Allowance mailed on Sep. 27, 2023, issued in connection with U.S. Appl. No. 18/061,243, filed Dec. 2, 2022, 8 pages.
European Patent Office, European EPC Article 94.3 mailed on Feb. 26, 2021, issued in connection with European Application No. 18789515.6, 8 pages.
European Patent Office, European EPC Article 94.3 mailed on Jun. 27, 2023, issued in connection with European Application No. 21195031.6, 4 pages.
European Patent Office, European EPC Article 94.3 mailed on Nov. 27, 2023, issued in connection with European Application No. 19780508.8, 7 pages.
European Patent Office, European EPC Article 94.3 mailed on Nov. 28, 2022, issued in connection with European Application No. 18789515.6, 7 pages.
European Patent Office, European EPC Article 94.3 mailed on Nov. 28, 2023, issued in connection with European Application No. 19731415.6, 9 pages.
European Patent Office, European EPC Article 94.3 mailed on Mar. 29, 2023, issued in connection with European Application No. 22182193.7, 4 pages.
European Patent Office, European EPC Article 94.3 mailed on Mar. 3, 2022, issued in connection with European Application No. 19740292.8, 10 pages.
European Patent Office, European EPC Article 94.3 mailed on Jun. 30, 2022, issued in connection with European Application No. 19765953.5, 4 pages.
European Patent Office, European EPC Article 94.3 mailed on Aug. 31, 2023, issued in connection with European Application No. 19773326.4, 5 pages.
European Patent Office, European EPC Article 94.3 mailed on Jul. 31, 2023, issued in connection with European Application No. 21164130.3, 5 pages.
European Patent Office, European EPC Article 94.3 mailed on Apr. 6, 2023, issued in connection with European Application No. 21193616.6, 7 pages.
European Patent Office, European EPC Article 94.3 mailed on Sep. 6, 2023, issued in connection with European Application No. 19197116.7, 4 pages.
European Patent Office, European EPC Article 94.3 mailed on Sep. 7, 2023, issued in connection with European Application No. 20185599.6, 6 pages.
European Patent Office, European Extended Search Report mailed on Oct. 7, 2021, issued in connection with European Application No. 21193616.6, 9 pages.
European Patent Office, European Extended Search Report mailed on Oct. 7, 2022, issued in connection with European Application No. 22182193.7, 8 pages.
European Patent Office, European Extended Search Report mailed on Jan. 2, 2024, issued in connection with European Application No. 23188226.7, 10 pages.
European Patent Office, European Extended Search Report mailed on Apr. 22, 2022, issued in connection with European Application No. 21195031.6, 14 pages.
European Patent Office, European Extended Search Report mailed on Jun. 23, 2022, issued in connection with European Application No. 22153180.9, 6 pages.
European Patent Office, European Extended Search Report mailed on Nov. 25, 2020, issued in connection with European Application No. 20185599.6, 9 pages.
European Patent Office, European Extended Search Report mailed on Feb. 3, 2020, issued in connection with European Application No. 19197116.7, 9 pages.
European Patent Office, European Extended Search Report mailed on Jan. 3, 2019, issued in connection with European Application No. 177570702, 8 pages.
European Patent Office, European Extended Search Report mailed on Jan. 3, 2019, issued in connection with European Application No. 17757075.1, 9 pages.
European Patent Office, European Extended Search Report mailed on Jun. 30, 2022, issued in connection with European Application No. 21212763.3, 9 pages.
European Patent Office, European Extended Search Report mailed on Oct. 30, 2017, issued in connection with EP Application No. 17174435.2, 11 pages.
European Patent Office, European Extended Search Report mailed on Aug. 6, 2020, issued in connection with European Application No. 20166332.5, 10 pages.
European Patent Office, European Extended Search Report mailed on Jul. 8, 2022, issued in connection with European Application No. 22153523.0, 9 pages.
European Patent Office, European Office Action mailed on Jul. 1, 2020, issued in connection with European Application No. 17757075.1, 7 pages.
European Patent Office, European Office Action mailed on Jan. 14, 2020, issued in connection with European Application No. 17757070.2, 7 pages.
European Patent Office, European Office Action mailed on Jan. 21, 2021, issued in connection with European Application No. 17792272.1, 7 pages.
European Patent Office, European Office Action mailed on Jan. 22, 2019, issued in connection with European Application No. 17174435.2, 9 pages.
European Patent Office, European Office Action mailed on Sep. 23, 2020, issued in connection with European Application No. 18788976.1, 7 pages.

(56) References Cited

OTHER PUBLICATIONS

European Patent Office, European Office Action mailed on Oct. 26, 2020, issued in connection with European Application No. 18760101.8, 4 pages.
European Patent Office, European Office Action mailed on Aug. 30, 2019, issued in connection with European Application No. 17781608.9, 6 pages.
European Patent Office, European Office Action mailed on Sep. 9, 2020, issued in connection with European Application No. 18792656.3, 10 pages.
European Patent Office, European Search Report mailed on Mar. 1, 2022, issued in connection with European Application No. 21180778.9, 9 pages.
European Patent Office, European Search Report mailed on Feb. 2, 2024, issued in connection with European Application No. 23200723.7, 5 pages.
European Patent Office, European Search Report mailed on Oct. 4, 2022, issued in connection with European Application No. 22180226.7, 6 pages.
European Patent Office, European Search Report mailed on Sep. 21, 2023, issued in connection with European Application No. 23172783.5, 8 pages.
European Patent Office, Examination Report mailed on Jul. 15, 2021, issued in connection with European Patent Application No. 19729968.8, 7 pages.
European Patent Office, Extended Search Report mailed on Aug. 13, 2021, issued in connection with European Patent Application No. 21164130.3, 11 pages.
European Patent Office, Extended Search Report mailed on May 16, 2018, issued in connection with European Patent Application No. 17200837.7, 11 pages.
European Patent Office, Extended Search Report mailed on Jul. 25, 2019, issued in connection with European Patent Application No. 18306501.0, 14 pages.
European Patent Office, Extended Search Report mailed on May 29, 2020, issued in connection with European Patent Application No. 19209389.6, 8 pages.
European Patent Office, Summons to Attend Oral Proceedings mailed on Jul. 15, 2022, issued in connection with European Application No. 17792272.1, 11 pages.
European Patent Office, Summons to Attend Oral Proceedings mailed on Dec. 20, 2019, issued in connection with European Application No. 17174435.2, 13 pages.
European Patent Office, Summons to Attend Oral Proceedings mailed on Feb. 4, 2022, issued in connection with European Application No. 17757075.1, 10 pages.
European Patent Office, Summons to Attend Oral Proceedings mailed on Dec. 9, 2021, issued in connection with European Application No. 17200837.7, 10 pages.
Fadilpasic, "Cortana can now be the default PDA on your Android", IT Pro Portal: Accessed via WayBack Machine; http://web.archive.org/web/20171129124915/https://www.itproportal.com/2015/08/11/cortana-can-now-be-. . . , Aug. 11, 2015, 6 pages.
Final Office Action mailed Jul. 23, 2021, issued in connection with U.S. Appl. No. 16/439,046, filed Jun. 12, 2019, 12 pages.
Final Office Action mailed on Oct. 6, 2017, issued in connection with U.S. Appl. No. 15/098,760, filed Apr. 14, 2016, 25 pages.
International Bureau, International Preliminary Report on Patentability, mailed on Sep. 7, 2018, issued in connection with International Application No. PCT/US2017/018739, filed on Feb. 21, 2017, 7 pages.
International Bureau, International Search Report and Written Opinion mailed on Nov. 10, 2020, issued in connection with International Application No. PCT/US2020/044250, filed on Jul. 30, 2020, 15 pages.
International Bureau, International Search Report and Written Opinion mailed on Dec. 11, 2019, issued in connection with International Application No. PCT/US2019/052129, filed on Sep. 20, 2019, 18 pages.
International Bureau, International Search Report and Written Opinion mailed on Nov. 13, 2018, issued in connection with International Application No. PCT/US2018/045397, filed on Aug. 6, 2018, 11 pages.
International Bureau, International Search Report and Written Opinion mailed on Jan. 14, 2019, issued in connection with International Application No. PCT/U.S. Pat. No. 2018053472, filed on Sep. 28, 2018, 10 pages.
International Bureau, International Search Report and Written Opinion mailed on Jul. 14, 2020, issued in connection with International Application No. PCT/US2020/017150, filed on Feb. 7, 2020, 27 pages.
International Bureau, International Search Report and Written Opinion mailed on Nov. 14, 2017, issued in connection with International Application No. PCT/US2017/045521, filed on Aug. 4, 2017, 10 pages.
International Bureau, International Search Report and Written Opinion mailed on Jul. 17, 2019, issued in connection with International Application No. PCT/US2019/032934, filed on May 17, 2019, 17 pages.
International Bureau, International Search Report and Written Opinion mailed on Nov. 18, 2019, issued in connection with International Application No. PCT/US2019/048558, filed on Aug. 28, 2019, 11 pages.
International Bureau, International Search Report and Written Opinion mailed on Nov. 18, 2019, issued in connection with International Application No. PCT/U.S. Pat. No. 2019052841, filed on Sep. 25, 2019, 12 pages.
International Bureau, International Search Report and Written Opinion mailed on Mar. 2, 2020, issued in connection with International Application No. PCT/U.S. Pat. No. 2019064907, filed on Dec. 6, 2019, 11 pages.
International Bureau, International Search Report and Written Opinion mailed on Mar. 2, 2020, issued in connection with International Application No. PCT/US2019/064907, filed on Dec. 6, 2019, 9 pages.
International Bureau, International Search Report and Written Opinion mailed on Dec. 20, 2019, issued in connection with International Application No. PCT/U.S. Pat. No. 2019052654, filed on Sep. 24, 2019, 11 pages.
International Bureau, International Search Report and Written Opinion mailed on Mar. 20, 2023, issued in connection with International Application No. PCT/US2022/045399, filed on Sep. 30, 2022, 25 pages.
International Bureau, International Search Report and Written Opinion mailed on Sep. 21, 2020, issued in connection with International Application No. PCT/US2020/037229, filed on Jun. 11, 2020, 17 pages.
International Bureau, International Search Report and Written Opinion mailed on Oct. 22, 2020, issued in connection with International Application No. PCT/US2020/044282, filed on Jul. 30, 2020, 15 pages.
International Bureau, International Search Report and Written Opinion mailed on Apr. 23, 2021, issued in connection with International Application No. PCT/US2021/070007, filed on Jan. 6, 2021, 11 pages.
International Bureau, International Search Report and Written Opinion mailed on Jul. 24, 2018, issued in connection with International Application No. PCT/US2018/019010, filed on Feb. 21, 2018, 12 pages.
International Bureau, International Search Report and Written Opinion, mailed on Feb. 27, 2019, issued in connection with International Application No. PCT/US2018/053123, filed on Sep. 27, 2018, 16 pages.
International Bureau, International Search Report and Written Opinion mailed on Sep. 27, 2019, issued in connection with International Application No. PCT/US2019/039828, filed on Jun. 28, 2019, 13 pages.
International Bureau, International Search Report and Written Opinion mailed on Nov. 29, 2019, issued in connection with International Application No. PCT/US2019/053253, filed on Sep. 29, 2019, 14 pages.

(56) References Cited

OTHER PUBLICATIONS

International Bureau, International Search Report and Written Opinion mailed on Sep. 4, 2019, issued in connection with International Application No. PCT/US2019/033945, filed on May 24, 2019, 8 pages.
International Bureau, International Search Report and Written Opinion mailed on Aug. 6, 2020, issued in connection with International Application No. PCT/FR2019/000081, filed on May 24, 2019, 12 pages.
International Bureau, International Search Report and Written Opinion mailed on Dec. 6, 2018, issued in connection with International Application No. PCT/US2018/050050, filed on Sep. 7, 2018, 9 pages.
International Bureau, International Search Report and Written Opinion mailed on Dec. 6, 2019, issued in connection with International Application No. PCT/U.S. Pat. No. 2019050852, filed on Sep. 12, 2019, 10 pages.
International Bureau, International Search Report and Written Opinion mailed on Oct. 6, 2017, issued in connection with International Application No. PCT/US2017/045551, filed on Aug. 4, 2017, 12 pages.
International Bureau, International Search Report and Written Opinion mailed on Apr. 8, 2020, issued in connection with International Application No. PCT/US2019/067576, filed on Dec. 19, 2019, 12 pages.
International Searching Authority, International Search Report and Written Opinion mailed on Feb. 8, 2021, issued in connection with International Application No. PCT/EP2020/082243, filed on Nov. 16, 2020, 10 pages.
International Searching Authority, International Search Report and Written Opinion mailed on Feb. 12, 2021, issued in connection with International Application No. PCT/US2020/056632, filed on Oct. 21, 2020, 10 pages.
International Searching Authority, International Search Report and Written Opinion mailed on Dec. 19, 2018, in connection with International Application No. PCT/US2018/053517, 13 pages.
International Searching Authority, International Search Report and Written Opinion mailed on Nov. 22, 2017, issued in connection with International Application No. PCT/US2017/054063, filed on Sep. 28, 2017, 11 pages.
International Searching Authority, International Search Report and Written Opinion mailed on Apr. 23, 2021, issued in connection with International Application No. PCT/US2020/066231, filed on Dec. 18, 2020, 9 pages.
International Searching Authority, International Search Report and Written Opinion mailed on Jan. 23, 2018, issued in connection with International Application No. PCT/US2017/57220, filed on Oct. 18, 2017, 8 pages.
International Searching Authority, International Search Report and Written Opinion mailed on May 23, 2017, issued in connection with International Application No. PCT/US2017/018739, Filed on Feb. 21, 2017, 10 pages.
International Searching Authority, International Search Report and Written Opinion mailed on Oct. 23, 2017, issued in connection with International Application No. PCT/US2017/042170, filed on Jul. 14, 2017, 15 pages.
International Searching Authority, International Search Report and Written Opinion mailed on Oct. 24, 2017, issued in connection with International Application No. PCT/US2017/042227, filed on Jul. 14, 2017, 16 pages.
International Searching Authority, International Search Report and Written Opinion mailed on May 30, 2017, issued in connection with International Application No. PCT/US2017/018728, Filed on Feb. 21, 2017, 11 pages.
International Searching Authority, Invitation to Pay Additional Fees on Jan. 27, 2023, issued in connection with International Application No. PCT/US2022/045399, filed on Sep. 30, 2022, 19 pages.
Japanese Patent Office, Decision of Refusal and Translation mailed on Oct. 4, 2022, issued in connection with Japanese Patent Application No. 2021-535871, 6 pages.
Japanese Patent Office, Decision of Refusal and Translation mailed on May 23, 2023, issued in connection with Japanese Patent Application No. 2021-163622, 13 pages.
Japanese Patent Office, Decision of Refusal and Translation mailed on Jul. 26, 2022, issued in connection with Japanese Patent Application No. 2020-513852, 10 pages.
Japanese Patent Office, Decision of Refusal and Translation mailed on Jun. 8, 2021, issued in connection with Japanese Patent Application No. 2019-073348, 5 pages.
Japanese Patent Office, English Translation of Office Action mailed on Nov. 17, 2020, issued in connection with Japanese Application No. 2019-145039, 5 pages.
Japanese Patent Office, English Translation of Office Action mailed on Aug. 27, 2020, issued in connection with Japanese Application No. 2019-073349, 6 pages.
Japanese Patent Office, English Translation of Office Action mailed on Jul. 30, 2020, issued in connection with Japanese Application No. 2019-517281, 26 pages.
Japanese Patent Office, Non-Final Office Action and Translation mailed on Nov. 5, 2019, issued in connection with Japanese Patent Application No. 2019-517281, 6 pages.
Japanese Patent Office, Non-Final Office Action mailed on Apr. 4, 2023, issued in connection with Japanese Patent Application No. 2021-573944, 5 pages.
Japanese Patent Office, Notice of Reasons for Refusal and Translation mailed on Sep. 13, 2022, issued in connection with Japanese Patent Application No. 2021-163622, 12 pages.
Japanese Patent Office, Notice of Reasons for Refusal and Translation mailed on Jun. 22, 2021, issued in connection with Japanese Patent Application No. 2020-517935, 4 pages.
Japanese Patent Office, Notice of Reasons for Refusal and Translation mailed on Nov. 28, 2021, issued in connection with Japanese Patent Application No. 2020-550102, 9 pages.
Oord et al. WaveNet: A Generative Model for Raw Audio. Arxiv. org, Cornell University Library, Sep. 12, 2016, 15 pages.
Optimizing Siri on HomePod in Far-Field Settings. Audio Software Engineering and Siri Speech Team, Machine Learning Journal vol. 1, Issue 12. https://machinelearning.apple.com/2018/12/03/optimizing-siri-on-homepod-in-far-field-settings.html. Dec. 2018, 18 pages.
Palm, Inc., "Handbook for the Palm VII Handheld," May 2000, 311 pages.
Parada et al. Contextual Information Improves OOV Detection in Speech. Proceedings of the 2010 Annual Conference of the North American Chapter of the Association for Computational Linguistics, Jun. 2, 2010, 9 pages.
Pre-Appeal Brief Decision mailed on Jan. 18, 2022, issued in connection with U.S. Appl. No. 16/806,747, filed Mar. 2, 2020, 2 pages.
Pre-Appeal Brief Decision mailed on Jun. 2, 2021, issued in connection with U.S. Appl. No. 16/213,570, filed Dec. 7, 2018, 2 pages.
Preinterview First Office Action mailed on Aug. 5, 2019, issued in connection with U.S. Appl. No. 16/434,426, filed Jun. 7, 2019, 4 pages.
Preinterview First Office Action mailed on Mar. 25, 2020, issued in connection with U.S. Appl. No. 16/109,375, filed Aug. 22, 2018, 6 pages.
Preinterview First Office Action mailed on Sep. 30, 2019, issued in connection with U.S. Appl. No. 15/989,715, filed May 25, 2018, 4 pages.
Preinterview First Office Action mailed on May 7, 2020, issued in connection with U.S. Appl. No. 16/213,570, filed Dec. 7, 2018, 5 pages.
Preinterview First Office Action mailed on Jan. 8, 2021, issued in connection with U.S. Appl. No. 16/798,967, filed Feb. 24, 2020, 4 pages.
Presentations at WinHEC 2000, May 2000, 138 pages.
Renato De Mori. Spoken Language Understanding: A Survey. Automatic Speech Recognition Understanding, 2007. IEEE, Dec. 1, 2007, 56 pages.
Restriction Requirement mailed on Aug. 14, 2019, issued in connection with U.S. Appl. No. 16/214,711, filed Dec. 10, 2018, 5 pages.

(56) References Cited

OTHER PUBLICATIONS

Restriction Requirement mailed on Aug. 9, 2018, issued in connection with U.S. Appl. No. 15/717,621, filed Sep. 27, 2017, 8 pages.
Rottondi et al., "An Overview on Networked Music Performance Technologies," IEEE Access, vol. 4, pp. 8823-8843, 2016, DOI: 10.1109/ACCESS.2016.2628440, 21 pages.
Rybakov et al. Streaming keyword spotting on mobile devices, arXiv:2005.06720v2, Jul. 29, 2020, 5 pages.
Shan et al. Attention-based End-to-End Models for Small-Footprint Keyword Spotting, arXiv: 1803.10916v1, Mar. 29, 2018, 5 pages.
Simon Doclo et al. Combined Acoustic Echo and Noise Reduction Using GSVD-Based Optimal Filtering. In 2000 IEEE International Conference on Acoustics, Speech, and Signal Processing. Proceedings (Cat. No. 00CH37100), Aug. 6, 2002, 4 pages. [retrieved on Feb. 23, 2023], Retrieved from the Internet: URL: https://scholar.google.com/scholar?hl=en&as_sdt=0%2C14amp;q=COMBINED+ACOUSTIC+ECHO+AND+NOISE+REDUCTION+USING+GSVD-BASED+OPTIMAL+FILTERING&btnG =.
Snips: How to Snips—Assistant creation Installation, Jun. 26, 2017, 6 pages.
Souden et al. "An Integrated Solution for Online Multichannel Noise Tracking and Reduction." IEEE Transactions on Audio, Speech, and Language Processing, vol. 19. No. 7, Sep. 7, 2011, 11 pages.
Souden et al. "Gaussian Model-Based Multichannel Speech Presence Probability" IEEE Transactions on Audio, Speech, and Language Processing, vol. 18, No. 5, Jul. 5, 2010, 6pages.
Souden et al. "On Optimal Frequency-Domain Multichannel Linear Filtering for Noise Reduction." IEEE Transactions on Audio, Speech, and Language Processing, vol. 18, No. 2, Feb. 2010, 17pages.
Speidel, Hans. Chatbot Training: How to use training data to provide fully automated customer support. Retrieved from the Internet: URL: https://www.crowdguru.de/wp-content/uploads/Case-Study-Chatbox-training-How-to-use-training-data-to-provide-fully-automated-customer-support.pdf. Jun. 29, 2017, 4 pages.
Stemmer et al. Speech Recognition and Understanding on Hardware-Accelerated DSP. Proceedings of Interspeech 2017: Show Tell Contribution, Aug. 20, 2017, 2 pages.
Steven J. Nowlan and Geoffrey E. Hinton "Simplifying Neural Networks by Soft Weight-Sharing" Neural Computation 4, 1992, 21 pages.
Tsiami et al. "Experiments in acoustic source localization using sparse arrays in adverse indoors environments", 2014 22nd European Signal Processing Conference, Sep. 1, 2014, 5 pages.
Tsung-Hsien Wen et al: "A Network-based End-to-End Trainable Task-oriented Dialogue System", CORR (ARXIV), vol. 1604. 04562v1, Apr. 15, 2016 (Apr. 15, 2016), pp. 1-11.
Tsung-Hsien Wen et al: "A Network-based End-to-End Trainable Task-oriented Dialogue System", CORR ARXIV, vol. 1604. 04562v1, Apr. 15, 2016, pp. 1-11, XP055396370, Stroudsburg, PA, USA.
Tweet: "How to start using Google app voice commands to make your life easier Share This Story shop @Bullet", Jan. 21, 2016, https://bgr.com/2016/01/21/best-ok-google-voice-commands/, 3 page.
Ullrich et al. "Soft Weight-Sharing for Neural Network Compression." ICLR 2017, 16 pages.
U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Vacher at al. "Recognition of voice commands by multisource ASR and noise cancellation in a smart home environment" Signal Processing Conference 2012 Proceedings of the 20th European, IEEE, Aug. 27, 2012, 5 pages.
Vacher et al. "Speech Recognition in a Smart Home: Some Experiments for Telemonitoring," 2009 Proceedings of the 5th Conference on Speech Technology and Human-Computer Dialogoue, Constant, 2009, 10 pages.
"S Voice or Google Now?"; https://web.archive.org/web/20160807040123/lowdown.carphonewarehouse.com/news/s-voice-or-google-now/ . . . , Apr. 28, 2015; 4 pages.
Wen et al. A Network-based End-to-End Trainable Task-oriented Dialogue System, CORR (ARXIV), Apr. 15, 2016, 11 pages.
Wikipedia. "The Wayback Machine", Speech recognition software for Linux, Sep. 22, 2016, 4 pages. [retrieved on Mar. 28, 2022], Retrieved from the Internet: URL: https://web.archive.org/web/20160922151304/https://en.wikipedia.org/wiki/Speech_recognition_software_for_Linux.
Wolf et al. On the potential of channel selection for recognition of reverberated speech with multiple microphones. Interspeech, TALP Research Center, Jan. 2010, 5 pages.
Wölfel et al. Multi-source far-distance microphone selection and combination for automatic transcription of lectures, Interspeech 2006—ICSLP, Jan. 2006, 5 pages.
Wu et al. End-to-End Recurrent Entity Network for Entity-Value Independent Goal-Oriented Dialog Learning. DSTC6—Dialog System Technology Challenges, Dec. 10, 2017, 5 pages.
Wung et al. "Robust Acoustic Echo Cancellation in the Short-Time Fourier Transform Domain Using Adaptive Crossband Filters" IEEE International Conference on Acoustic, Speech and Signal Processing ICASSP, 2014, p. 1300-1304.
Xiao et al. "A Learning-Based Approach to Direction of Arrival Estimation in Noisy and Reverberant Environments," 2015 IEEE International Conference on Acoustics, Speech and Signal Processing, Apr. 19, 2015, 5 pages.
Xiaoguang et al. "Robust Small-Footprint Keyword Spotting Using Sequence-To-Sequence Model with Connectionist Temporal Classifier", 2019 IEEE, Sep. 28, 2019, 5 pages.
Xu et al. An End-to-end Approach for Handling Unknown Slot Values in Dialogue State Tracking. ARXIV.org, Cornell University Library, May 3, 2018, 10 pages.
Yamaha DME 64 Owner's Manual; copyright 2004, 80 pages.
Yamaha DME Designer 3.0 Owner's Manual; Copyright 2008, 501 pages.
Yamaha DME Designer 3.5 setup manual guide; copyright 2004, 16 pages.
Yamaha DME Designer 3.5 User Manual; Copyright 2004, 507 pages.
Non-Final Office Action mailed on Feb. 21, 2019, issued in connection with U.S. Appl. No. 16/214,666, filed Dec. 10, 2018, 12 pages.
Non-Final Office Action mailed on Jan. 21, 2020, issued in connection with U.S. Appl. No. 16/214,711, filed Dec. 10, 2018, 9 pages.
Non-Final Office Action mailed on Jan. 21, 2020, issued in connection with U.S. Appl. No. 16/598,125, filed Oct. 10, 2019, 25 pages.
Non-Final Office Action mailed on Nov. 21, 2023, issued in connection with U.S. Appl. No. 18/088,976, filed Dec. 27, 2022, 9 pages.
Non-Final Office Action mailed on Oct. 21, 2019, issued in connection with U.S. Appl. No. 15/973,413, filed May 7, 2018, 10 pages.
Non-Final Office Action mailed on Dec. 22, 2022, issued in connection with U.S. Appl. No. 16/168,389, filed Oct. 23, 2018, 39 pages.
Non-Final Office Action mailed on Jul. 22, 2020, issued in connection with U.S. Appl. No. 16/145,275, filed Sep. 28, 2018, 11 pages.
Non-Final Office Action mailed on May 22, 2018, issued in connection with U.S. Appl. No. 15/946,599, filed Apr. 5, 2018, 19 pages.
Non-Final Office Action mailed on Sep. 22, 2020, issued in connection with U.S. Appl. No. 16/539,843, filed Aug. 13, 2019, 7 pages.
Non-Final Office Action mailed on Jun. 23, 2021, issued in connection with U.S. Appl. No. 16/439,032, filed Jun. 12, 2019, 13 pages.

(56) References Cited

OTHER PUBLICATIONS

Non-Final Office Action mailed on Jun. 23, 2023, issued in connection with U.S. Appl. No. 18/048,945, filed Oct. 24, 2022, 10 pages.
Non-Final Office Action mailed on Mar. 23, 2022, issued in connection with U.S. Appl. No. 16/907,953, filed Jun. 22, 2020, 7 pages.
Non-Final Office Action mailed on May 23, 2019, issued in connection with U.S. Appl. No. 16/154,071, filed Oct. 8, 2018, 36 pages.
Non-Final Office Action mailed on Nov. 23, 2020, issued in connection with U.S. Appl. No. 16/524,306, filed Jul. 29, 2019, 14 pages.
Non-Final Office Action mailed on Oct. 23, 2023, issued in connection with U.S. Appl. No. 17/932,715, filed Sep. 16, 2022, 14 pages.
Non-Final Office Action mailed on Sep. 23, 2020, issued in connection with U.S. Appl. No. 16/177,185, filed Oct. 31, 2018, 17 pages.
Non-Final Office Action mailed on Sep. 23, 2022, issued in connection with U.S. Appl. No. 16/153,530, filed Oct. 5, 2018, 25 pages.
Non-Final Office Action mailed on Apr. 24, 2023, issued in connection with U.S. Appl. No. 17/532,744, filed Nov. 22, 2021, 18 pages.
Non-Final Office Action mailed on Apr. 24, 2024, issued in connection with U.S. Appl. No. 18/461,430, filed Sep. 5, 2023, 22 pages.
Non-Final Office Action mailed on Aug. 24, 2017, issued in connection with U.S. Appl. No. 15/297,627, filed Oct. 19, 2016, 13 pages.
Non-Final Office Action mailed on Jul. 24, 2019, issued in connection with U.S. Appl. No. 16/439,009, filed Jun. 12, 2019, 26 pages.
Non-Final Office Action mailed on May 24, 2022, issued in connection with U.S. Appl. No. 17/101,949, filed Nov. 23, 2020, 10 pages.
Non-Final Office Action mailed on Apr. 25, 2023, issued in connection with U.S. Appl. No. 17/536,572, filed Nov. 29, 2021, 8 pages.
Non-Final Office Action mailed on Apr. 25, 2023, issued in connection with U.S. Appl. No. 17/656,794, filed Mar. 28, 2022, 22 pages.
Non-Final Office Action mailed on Jul. 25, 2017, issued in connection with U.S. Appl. No. 15/273,679, filed Jul. 22, 2016, 11 pages.
Non-Final Office Action mailed on May 25, 2023, issued in connection with U.S. Appl. No. 18/157,937, filed Jan. 23, 2023, 9 pages.
Non-Final Office Action mailed on Oct. 25, 2022, issued in connection with U.S. Appl. No. 17/549,034, filed Dec. 13, 2021, 20 pages.
Non-Final Office Action mailed on Dec. 26, 2018, issued in connection with U.S. Appl. No. 16/154,469, filed Oct. 8, 2018, 7 pages.
Non-Final Office Action mailed on Jan. 26, 2017, issued in connection with U.S. Appl. No. 15/098,867, filed Apr. 14, 2016, 16 pages.
Non-Final Office Action mailed on Jan. 26, 2024, issued in connection with U.S. Appl. No. 17/450,925, filed Oct. 14, 2021, 9 pages.
Non-Final Office Action mailed on May 26, 2022, issued in connection with U.S. Appl. No. 16/989,805, filed Aug. 10, 2020, 14 pages.
Non-Final Office Action mailed on Oct. 26, 2017, issued in connection with U.S. Appl. No. 15/438,744, filed Feb. 21, 2017, 12 pages.
Non-Final Office Action mailed on Oct. 26, 2021, issued in connection with U.S. Appl. No. 16/736,725, filed Jan. 7, 2020, 12 pages.
Non-Final Office Action mailed on Feb. 27, 2023, issued in connection with U.S. Appl. No. 17/493,430, filed Oct. 4, 2021, 17 pages.
Non-Final Office Action mailed on Jun. 27, 2018, issued in connection with U.S. Appl. No. 15/438,749, filed Feb. 21, 2017, 16 pages.
Non-Final Office Action mailed on Jun. 27, 2019, issued in connection with U.S. Appl. No. 16/437,437, filed Jun. 11, 2019, 8 pages.
Non-Final Office Action mailed on Jun. 27, 2019, issued in connection with U.S. Appl. No. 16/437,476, filed Jun. 11, 2019, 8 pages.
Non-Final Office Action mailed on Mar. 27, 2020, issued in connection with U.S. Appl. No. 16/790,621, filed Feb. 13, 2020, 8 pages.
Non-Final Office Action mailed on May 27, 2020, issued in connection with U.S. Appl. No. 16/715,713, filed Dec. 16, 2019, 14 pages.
Non-Final Office Action mailed on Oct. 27, 2020, issued in connection with U.S. Appl. No. 16/213,570, filed Dec. 7, 2018, 13 pages.
Non-Final Office Action mailed on Oct. 27, 2020, issued in connection with U.S. Appl. No. 16/715,984, filed Dec. 16, 2019, 14 pages.
Non-Final Office Action mailed on Oct. 27, 2020, issued in connection with U.S. Appl. No. 16/819,755, filed Mar. 16, 2020, 8 pages.
Non-Final Office Action mailed on Aug. 28, 2023, issued in connection with U.S. Appl. No. 17/722,661, filed Apr. 18, 2022, 16 pages.
Non-Final Office Action mailed on Feb. 28, 2023, issued in connection with U.S. Appl. No. 17/548,921, filed Dec. 13, 2021, 12 pages.
Non-Final Office Action mailed on Mar. 28, 2022, issued in connection with U.S. Appl. No. 17/222,151, filed Apr. 5, 2021, 5 pages.
Non-Final Office Action mailed on Mar. 28, 2024, issued in connection with U.S. Appl. No. 18/192,452, filed Mar. 29, 2023, 7 pages.
Non-Final Office Action mailed on Oct. 28, 2019, issued in connection with U.S. Appl. No. 16/145,275, filed Sep. 28, 2018, 11 pages.
Non-Final Office Action mailed on Oct. 28, 2021, issued in connection with U.S. Appl. No. 16/378,516, filed Apr. 8, 2019, 10 pages.
Non-Final Office Action mailed on Oct. 28, 2021, issued in connection with U.S. Appl. No. 17/247,736, filed Dec. 21, 2020, 12 pages.
Non-Final Office Action mailed on Feb. 29, 2024, issued in connection with U.S. Appl. No. 18/449,244, filed Aug. 14, 2023, 15 pages.
Notice of Allowance mailed on Jun. 13, 2023, issued in connection with U.S. Appl. No. 17/249,776, filed Mar. 12, 2021, 10 pages.
Notice of Allowance mailed on Mar. 13, 2024, issued in connection with U.S. Appl. No. 18/449,254, filed Aug. 14, 2023, 10 pages.
Notice of Allowance mailed on Nov. 13, 2020, issued in connection with U.S. Appl. No. 16/131,409, filed Sep. 14, 2018, 11 pages.
Notice of Allowance mailed on Aug. 14, 2017, issued in connection with U.S. Appl. No. 15/098,867, filed Apr. 14, 2016, 10 pages.
Notice of Allowance mailed on Aug. 14, 2020, issued in connection with U.S. Appl. No. 16/598,125, filed Oct. 10, 2019, 5 pages.
Notice of Allowance mailed on Aug. 14, 2023, issued in connection with U.S. Appl. No. 17/549,034, filed Dec. 13, 2021, 9 pages.
Notice of Allowance mailed on Dec. 14, 2023, issued in connection with U.S. Appl. No. 17/722,661, filed Apr. 18, 2022, 12 pages.
Notice of Allowance mailed on Feb. 14, 2017, issued in connection with U.S. Appl. No. 15/229,855, filed Aug. 5, 2016, 11 pages.
Notice of Allowance mailed on Jan. 14, 2021, issued in connection with U.S. Appl. No. 17/087,423, filed Nov. 2, 2020, 8 pages.
Notice of Allowance mailed on Jan. 14, 2022, issued in connection with U.S. Appl. No. 16/966,397, filed Jul. 30, 2020, 5 pages.
Notice of Allowance mailed on Jun. 14, 2017, issued in connection with U.S. Appl. No. 15/282,554, filed Sep. 30, 2016, 11 pages.
Notice of Allowance mailed on Nov. 14, 2018, issued in connection with U.S. Appl. No. 15/297,627, filed Oct. 19, 2016, 5 pages.
Notice of Allowance mailed on Sep. 14, 2023, issued in connection with U.S. Appl. No. 18/061,579, filed Dec. 5, 2022, 7 pages.

(56) References Cited

OTHER PUBLICATIONS

Notice of Allowance mailed on Aug. 15, 2022, issued in connection with U.S. Appl. No. 17/101,949, filed Nov. 23, 2020, 11 pages.
Notice of Allowance mailed on Dec. 15, 2017, issued in connection with U.S. Appl. No. 15/223,218, filed Jul. 29, 2016, 7 pages.
Notice of Allowance mailed on Dec. 15, 2023, issued in connection with U.S. Appl. No. 18/157,937, filed Jan. 23, 2023, 8 pages.
Notice of Allowance mailed on Feb. 15, 2023, issued in connection with U.S. Appl. No. 17/659,613, filed Apr. 18, 2022, 21 pages.
Notice of Allowance mailed on Jan. 15, 2020, issued in connection with U.S. Appl. No. 16/439,009, filed Jun. 12, 2019, 9 pages.
Notice of Allowance mailed on Jun. 15, 2023, issued in connection with U.S. Appl. No. 17/305,698, filed Jul. 13, 2021, 8 pages.
Notice of Allowance mailed on Jun. 15, 2023, issued in connection with U.S. Appl. No. 17/305,920, filed Jul. 16, 2021, 8 pages.
Notice of Allowance mailed on Mar. 15, 2019, issued in connection with U.S. Appl. No. 15/804,776, filed Nov. 6, 2017, 9 pages.
Notice of Allowance mailed on Oct. 15, 2019, issued in connection with U.S. Appl. No. 16/437,437, filed Jun. 11, 2019, 9 pages.
Notice of Allowance mailed on Oct. 15, 2020, issued in connection with U.S. Appl. No. 16/715,713, filed Dec. 16, 2019, 9 pages.
Notice of Allowance mailed on Oct. 15, 2021, issued in connection with U.S. Appl. No. 16/213,570, filed Dec. 7, 2018, 8 pages.
Notice of Allowance mailed on Sep. 15, 2021, issued in connection with U.S. Appl. No. 16/685,135, filed Nov. 15, 2019, 10 pages.
Notice of Allowance mailed on Sep. 15, 2022, issued in connection with U.S. Appl. No. 16/736,725, filed Jan. 1, 2020, 11 pages.
Notice of Allowance mailed on Apr. 16, 2021, issued in connection with U.S. Appl. No. 16/798,967, filed Feb. 24, 2020, 16 pages.
Notice of Allowance mailed on Aug. 16, 2017, issued in connection with U.S. Appl. No. 15/098,892, filed Apr. 14, 2016, 9 pages.
Notice of Allowance mailed on Aug. 16, 2023, issued in connection with U.S. Appl. No. 17/536,572, filed Nov. 29, 2021, 7 pages.
Notice of Allowance mailed on Apr. 17, 2024, issued in connection with U.S. Appl. No. 18/088,976, filed Dec. 27, 2022, 7 pages.
Notice of Allowance mailed on Apr. 17, 2024, issued in connection with U.S. Appl. No. 18/471,693, filed Sep. 21, 2023, 12 pages.
Notice of Allowance mailed on Aug. 17, 2017, issued in connection with U.S. Appl. No. 15/131,244, filed Apr. 18, 2016, 9 pages.
Notice of Allowance mailed on Aug. 17, 2022, issued in connection with U.S. Appl. No. 17/135,347, filed Dec. 28, 2020, 14 pages.
Notice of Allowance mailed on Feb. 17, 2021, issued in connection with U.S. Appl. No. 16/715,984, filed Dec. 16, 2019, 8 pages.
Notice of Allowance mailed on Jul. 17, 2019, issued in connection with U.S. Appl. No. 15/718,911, filed Sep. 28, 2017, 5 pages.
Notice of Allowance mailed on Jun. 17, 2020, issued in connection with U.S. Appl. No. 16/141,875, filed Sep. 25, 2018, 6 pages.
Notice of Allowance mailed on Nov. 17, 2022, issued in connection with U.S. Appl. No. 17/486,222, filed Sep. 27, 2021, 10 pages.
Notice of Allowance mailed on Sep. 17, 2018, issued in connection with U.S. Appl. No. 15/211,689, filed Jul. 15, 2016, 6 pages.
Notice of Allowance mailed on Apr. 18, 2019, issued in connection with U.S. Appl. No. 16/173,797, filed Oct. 29, 2018, 9 pages.
Notice of Allowance mailed on Dec. 18, 2019, issued in connection with U.S. Appl. No. 16/434,426, filed Jun. 7, 2019, 13 pages.
Notice of Allowance mailed on Feb. 18, 2020, issued in connection with U.S. Appl. No. 16/022,662, filed Jun. 28, 2018, 8 pages.
Notice of Allowance mailed on Jul. 18, 2019, issued in connection with U.S. Appl. No. 15/438,749, filed Feb. 21, 2017, 9 pages.
Notice of Allowance mailed on Jul. 18, 2019, issued in connection with U.S. Appl. No. 15/721,141, filed Sep. 29, 2017, 8 pages.
Notice of Allowance mailed on Jul. 18, 2022, issued in connection with U.S. Appl. No. 17/222,151, filed Apr. 5, 2021, 5 pages.
Notice of Allowance mailed on Mar. 18, 2021, issued in connection with U.S. Appl. No. 16/177,185, filed Oct. 31, 2018, 8 pages.
Notice of Allowance mailed on Aug. 19, 2020, issued in connection with U.S. Appl. No. 16/271,560, filed Feb. 8, 2019, 9 pages.
Notice of Allowance mailed on Dec. 19, 2018, issued in connection with U.S. Appl. No. 15/818,051, filed Nov. 20, 2017, 9 pages.
Notice of Allowance mailed on Jul. 19, 2018, issued in connection with U.S. Appl. No. 15/681,937, filed Aug. 21, 2017, 7 pages.
Notice of Allowance mailed on Mar. 19, 2021, issued in connection with U.S. Appl. No. 17/157,686, filed Jan. 25, 2021, 11 pages.
Notice of Allowance mailed on Aug. 2, 2019, issued in connection with U.S. Appl. No. 16/102,650, filed Aug. 13, 2018, 5 pages.
First Action Interview Office Action mailed on Aug. 14, 2019, issued in connection with U.S. Appl. No. 16/227,308, filed Dec. 20, 2018, 4 pages.
First Action Interview Office Action mailed on Jun. 15, 2020, issued in connection with U.S. Appl. No. 16/213,570, filed Dec. 7, 2018, 4 pages.
First Action Interview Office Action mailed on Jun. 2, 2020, issued in connection with U.S. Appl. No. 16/109,375, filed Aug. 22, 2018, 10 pages.
First Action Interview Office Action mailed on Jan. 22, 2020, issued in connection with U.S. Appl. No. 15/989,715, filed May 25, 2018, 3 pages.
First Action Interview Office Action mailed on Jul. 5, 2019, issued in connection with U.S. Appl. No. 16/227,308, filed Dec. 20, 2018, 4 pages.
Freiberger, Karl, "Development and Evaluation of Source Localization Algorithms for Coincident Microphone Arrays," Diploma Thesis, Apr. 1, 2010, 106 pages.
Giacobello et al. "A Sparse Nonuniformly Partitioned Multidelay Filter for Acoustic Echo Cancellation," 2013, IEEE Workshop on Applications of Signal Processing to Audio and Acoustics, Oct. 2013, New Paltz, NY, 4 pages.
Giacobello et al. "Tuning Methodology for Speech Enhancement Algorithms using a Simulated Conversational Database and Perceptual Objective Measures," 2014, 4th Joint Workshop on Hands-free Speech Communication and Microphone Arrays HSCMA, 2014, 5 pages.
*Google LLC* v. *Sonos, Inc.*, International Trade Commission Case No. 337-TA-1330, Order No. 25: Regarding Respondent Sonos, Inc.'s Omnibus Motion for Summary Determination; dated May 16, 2023, 7 pages.
*Google LLC* v. *Sonos, Inc.*, International Trade Commission Case No. 337-TA-1330, Order No. 28: Regarding Respondent Sonos, Inc.'s Omnibus Motion for Summary Determination; dated May 22, 2023, 3 pages.
*Google LLC* v. *Sonos, Inc.*, International Trade Commission Case No. 337-TA-1330, Order No. 37: Regarding Complainant Google LLC's Motions in Limine; dated Jul. 7, 2023, 10 pages.
*Google LLC* v. *Sonos, Inc.*, International Trade Commission Case No. 337-TA-1330, Respondent Sonos, Inc.'s Motion in Limine No. 4. Motion to Exclude Untimely Validity Arguments Regarding Claim 11 of U.S. Pat. No. 11,024,311; dated Jun. 13, 2023, 34 pages.
*Google LLC* v. *Sonos, Inc.*, International Trade Commission Case No. 337-TA-1330, Respondent Sonos, Inc.'s Response to Google's Motion in Limine No. 3 Preclude Sonos from Presenting Evidence or Argument that Claim 3 of the '748 Patent is Indefinite for Lack of Antecedent Basis; dated Jun. 12, 2023, 26 pages.
Han et al. "Deep Compression: Compressing Deep Neural Networks with Pruning, Trained Quantization and Huffman Coding." ICLR 2016, Feb. 15, 2016, 14 pages.
Hans Speidel: "Chatbot Training: How to use training data to provide fully automated customer support", Jun. 29, 2017, pp. 1-3, XP055473185, Retrieved from the Internet: URL:https://www.crowdguru.de/wp-content/uploads/Case-Study-Chatbot-training-How-to-use.training-data-to-provide-fully-automated-customer-support.pdf [retrieved on May 7, 2018].
Helwani et al."Source-domain adaptive filtering for MIMO systems with application to acoustic echo cancellation", Acoustics Speech and Signal Processing, 2010 IEEE International Conference, Mar. 14, 2010, 4 pages.
Helwani et al. Source-domain adaptive filtering for MIMO systems with application to acoustic echo cancellation. In 2010 IEEE International Conference on Acoustics, Speech and Signal Processing, Jun. 28, 2010, 4 pages. [retrieved on Feb. 23, 2023], Retrieved from the Internet: URL: https://scholar.google.com/scholar?hl=en&as_sdt=0%2C14&q=SOURCE-DOMAIN+ADAPTIV

(56) References Cited

OTHER PUBLICATIONS

E+FILTERING+FOR+MIMO+SYSTEMS+WITH+APPLICATION+TO+ACOUSTIC+ECHO+CANCELLATION&btnG =.
Hirano et al. "A Noise-Robust Stochastic Gradient Algorithm with an Adaptive Step-Size Suitable for Mobile Hands-Free Telephones," 1995, International Conference on Acoustics, Speech, and Signal Processing, vol. 2, 4 pages.
Indian Patent Office, Examination Report mailed on May 24, 2021, issued in connection with Indian Patent Application No. 201847035595, 6 pages.
Indian Patent Office, Examination Report mailed on Feb. 25, 2021, issued in connection with Indian Patent Application No. 201847035625, 6 pages.
Indian Patent Office, Examination Report mailed on Feb. 28, 2024, issued in connection with Indian Patent Application No. 201847035625, 3 pages.
Indian Patent Office, Examination Report mailed on Dec. 5, 2023, issued in connection with Indian Patent Application No. 201847035625, 3 pages.
International Bureau, International Preliminary Report on Patentability and Written Opinion, mailed on Apr. 1, 2021, issued in connection with International Application No. PCT/US2019/052129, filed on Sep. 20, 2019, 13 pages.
International Bureau, International Preliminary Report on Patentability and Written Opinion, mailed on Jul. 1, 2021, issued in connection with International Application No. PCT/US2019/067576, filed on Dec. 19, 2019, 8 pages.
International Bureau, International Preliminary Report on Patentability and Written Opinion, mailed on Aug. 10, 2021, issued in connection with International Application No. PCT/US2020/017150, filed on Feb. 7, 2020, 20 pages.
International Bureau, International Preliminary Report on Patentability and Written Opinion, mailed on Dec. 10, 2020, issued in connection with International Application No. PCT/US2019/033945, filed on May 25, 2018, 7 pages.
International Bureau, International Preliminary Report on Patentability and Written Opinion, mailed on Mar. 10, 2020, issued in connection with International Application No. PCT/US2018/050050, filed on Sep. 7, 2018, 7 pages.
International Bureau, International Preliminary Report on Patentability and Written Opinion, mailed on Apr. 15, 2021, issued in connection with International Application No. PCT/US2019/054332, filed on Oct. 2, 2019, 9 pages.
International Bureau, International Preliminary Report on Patentability and Written Opinion, mailed on Jan. 15, 2019, issued in connection with International Application No. PCT/US2017/042170, filed on Jul. 14, 2017, 7 pages.
International Bureau, International Preliminary Report on Patentability and Written Opinion, mailed on Jan. 15, 2019, issued in connection with International Application No. PCT/US2017/042227, filed on Jul. 14, 2017, 7 pages.
International Bureau, International Preliminary Report on Patentability and Written Opinion, mailed on Mar. 25, 2021, issued in connection with International Application No. PCT/US2019/050852, filed on Sep. 12, 2019, 8 pages.
International Bureau, International Preliminary Report on Patentability and Written Opinion, mailed on Aug. 27, 2019, issued in connection with International Application No. PCT/US2018/019010, filed on Feb. 21, 2018, 9 pages.
International Bureau, International Preliminary Report on Patentability and Written Opinion, mailed on Mar. 31, 2020, issued in connection with International Application No. PCT/US2018/053517, filed on Sep. 28, 2018, 10 pages.
International Bureau, International Preliminary Report on Patentability and Written Opinion, mailed on Feb. 5, 2019, issued in connection with International Application No. PCT/US2017/045521, filed on Aug. 4, 2017, 7 pages.
International Bureau, International Preliminary Report on Patentability and Written Opinion, mailed on Feb. 5, 2019, issued in connection with International Application No. PCT/US2017/045551, filed on Aug. 4, 2017, 9 pages.
International Bureau, International Preliminary Report on Patentability and Written Opinion, mailed on Jan. 7, 2021, issued in connection with International Application No. PCT/US2019/039828, filed on Jun. 28, 2019, 11 pages.
International Bureau, International Preliminary Report on Patentability and Written Opinion, mailed on Apr. 8, 2021, issued in connection with International Application No. PCT/US2019/052654, filed on Sep. 24, 2019, 7 pages.
International Bureau, International Preliminary Report on Patentability and Written Opinion, mailed on Apr. 8, 2021, issued in connection with International Application No. PCT/US2019/052841, filed on Sep. 25, 2019, 8 pages.
International Bureau, International Preliminary Report on Patentability and Written Opinion, mailed on Apr. 8, 2021, issued in connection with International Application No. PCT/US2019/053253, filed on Sep. 26, 2019, 10 pages.
International Bureau, International Preliminary Report on Patentability, mailed on Apr. 11, 2019, issued in connection with International Application No. PCT/US2017/0054063, filed on Sep. 28, 2017, 9 pages.
International Bureau, International Preliminary Report on Patentability, mailed on Jun. 17, 2021, issued in connection with International Application No. PCT/US2019/064907, filed on Dec. 6, 2019, 8 pages.
International Bureau, International Preliminary Report on Patentability, mailed on Mar. 2, 2021, issued in connection with International Application No. PCT/US2019/048558, filed on Aug. 28, 2019, 8 pages.
International Bureau, International Preliminary Report on Patentability, mailed on Feb. 20, 2020, issued in connection with International Application No. PCT/US2018/045397, filed on Aug. 6, 2018, 8 pages.
International Bureau, International Preliminary Report on Patentability, mailed on Jul. 21, 2022, issued in connection with International Application No. PCT/US2021/070007, filed on Jan. 6, 2021, 8 pages.
International Bureau, International Preliminary Report on Patentability, mailed on Apr. 23, 2019, issued in connection with International Application No. PCT/US2017/057220, filed on Oct. 18, 2017, 7 pages.
International Bureau, International Preliminary Report on Patentability, mailed on Apr. 26, 2022, issued in connection with International Application No. PCT/US2020/056632, filed on Oct. 21, 2020, 7 pages.
International Bureau, International Preliminary Report on Patentability, mailed on Mar. 31, 2020, issued in connection with International Application No. PCT/U.S. Pat. No. 2018053123, filed on Sep. 27, 2018, 12 pages.
International Bureau, International Preliminary Report on Patentability, mailed on Mar. 31, 2020, issued in connection with International Application No. PCT/U.S. Pat. No. 2018053472, filed on Sep. 28, 2018, 8 pages.
International Bureau, International Preliminary Report on Patentability, mailed on Mar. 31, 2020, issued in connection with International Application No. PCT/US2018053517, filed on Sep. 28, 2018, 10 pages.
International Bureau, International Preliminary Report on Patentability, mailed on Sep. 7, 2018, issued in connection with International Application No. PCT/US2017/018728, filed on Feb. 21, 2017, 8 pages.
Advisory Action mailed on Nov. 7, 2022, issued in connection with U.S. Appl. No. 16/168,389, filed Oct. 23, 2018, 4 pages.
Advisory Action mailed on Jun. 10, 2020, issued in connection with U.S. Appl. No. 15/936,177, filed Mar. 26, 2018, 4 pages.
Advisory Action mailed on Aug. 13, 2021, issued in connection with U.S. Appl. No. 16/271,550, filed Feb. 8, 2019, 4 pages.
Advisory Action mailed on Dec. 13, 2023, issued in connection with U.S. Appl. No. 18/048,034, filed Oct. 20, 2022, 4 pages.
Advisory Action mailed on Apr. 23, 2021, issued in connection with U.S. Appl. No. 16/219,702, filed Dec. 13, 2018, 3 pages.

(56) References Cited

OTHER PUBLICATIONS

Advisory Action mailed on Apr. 24, 2020, issued in connection with U.S. Appl. No. 15/948,541, filed Apr. 9, 2018, 4 pages.
Advisory Action mailed on Feb. 26, 2024, issued in connection with U.S. Appl. No. 17/532,744, filed Nov. 22, 2021, 4 pages.
Advisory Action mailed on Feb. 28, 2022, issued in connection with U.S. Appl. No. 16/813,643, filed Mar. 9, 2020, 3 pages.
Advisory Action mailed on Jun. 28, 2018, issued in connection with U.S. Appl. No. 15/438,744, filed Feb. 21, 2017, 3 pages.
Advisory Action mailed on Dec. 31, 2018, issued in connection with U.S. Appl. No. 15/804,776, filed Nov. 6, 2017, 4 pages.
Advisory Action mailed on Sep. 8, 2021, issued in connection with U.S. Appl. No. 16/168,389, filed Oct. 23, 2018, 4 pages.
Advisory Action mailed on Jun. 9, 2020, issued in connection with U.S. Appl. No. 16/145,275, filed Sep. 28, 2018, 3 pages.
Andra et al. Contextual Keyword Spotting in Lecture Video With Deep Convolutional Neural Network. 2017 International Conference on Advanced Computer Science and Information Systems, IEEE, Oct. 28, 2017, 6 pages.
Anonymous,. S Voice or Google Now—The Lowdown. Apr. 28, 2015, 9 pages. [online], [retrieved on Nov. 29, 2017]. Retrieved from the Internet (URL: http://web.archive.org/web/20160807040123/http://lowdown.carphonewarehouse.com/news/s-voice-or-google-now/29958/).
Anonymous: "What are the function of 4 Microphones on iPhone 6S/6S+?", ETrade Supply, Dec. 24, 2015, XP055646381, Retrieved from the Internet: URL:https://www.etradesupply.com/blog/4-microphones-iphone-6s6s-for/ [retrieved on Nov. 26, 2019].
Audhkhasi Kartik et al. End-to-end ASR-free keyword search from speech. 2017 IEEE International Conference on Acoustics, Speech and Signal Processing, Mar. 5, 2017, 7 pages.
AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Australian Patent Office, Australian Examination Report Action mailed on Nov. 10, 2022, issued in connection with Australian Application No. 2018312989, 2 pages.
Australian Patent Office, Australian Examination Report Action mailed on Jul. 11, 2023, issued in connection with Australian Application No. 2022246446, 2 pages.
Australian Patent Office, Australian Examination Report Action mailed on Apr. 14, 2020, issued in connection with Australian Application No. 2019202257, 3 pages.
Australian Patent Office, Australian Examination Report Action mailed on Jun. 14, 2023, issued in connection with Australian Application No. 2019299865, 2 pages.
Australian Patent Office, Australian Examination Report Action mailed on May 19, 2022, issued in connection with Australian Application No. 2021212112, 2 pages.
Australian Patent Office, Australian Examination Report Action mailed on Sep. 25, 2023, issued in connection with Australian Application No. 2018338812, 3 pages.
Australian Patent Office, Australian Examination Report Action mailed on Sep. 28, 2022, issued in connection with Australian Application No. 2018338812, 3 pages.
Australian Patent Office, Australian Examination Report Action mailed on Oct. 3, 2019, issued in connection with Australian Application No. 2018230932, 3 pages.
Australian Patent Office, Australian Examination Report Action mailed on Oct. 31, 2023, issued in connection with Australian Application No. 2023203687, 2 pages.
Australian Patent Office, Australian Examination Report Action mailed on Mar. 4, 2022, issued in connection with Australian Application No. 2021202786, 2 pages.
Australian Patent Office, Australian Examination Report Action mailed on Apr. 7, 2021, issued in connection with Australian Application No. 2019333058, 2 pages.
Australian Patent Office, Australian Examination Report Action mailed on Aug. 7, 2020, issued in connection with Australian Application No. 2019236722, 4 pages.
Australian Patent Office, Examination Report mailed on Jun. 28, 2021, issued in connection with Australian Patent Application No. 2019395022, 2 pages.
Australian Patent Office, Examination Report mailed on Oct. 30, 2018, issued in connection with Australian Application No. 2017222436, 3 pages.
"Automatic Parameter Tying in Neural Networks" ICLR 2018, 14 pages.
Bertrand et al. "Adaptive Distributed Noise Reduction for Speech Enhancement in Wireless Acoustic Sensor Networks" Jan. 2010, 4 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Canadian Patent Office, Canadian Examination Report mailed on Dec. 1, 2021, issued in connection with Canadian Application No. 3096442, 4 pages.
Canadian Patent Office, Canadian Examination Report mailed on Oct. 12, 2023, issued in connection with Canadian Application No. 3084279, 4 pages.
Canadian Patent Office, Canadian Examination Report mailed on Sep. 14, 2022, issued in connection with Canadian Application No. 3067776, 4 pages.
Canadian Patent Office, Canadian Examination Report mailed on Dec. 19, 2023, issued in connection with Canadian Application No. 3067776, 3 pages.
Canadian Patent Office, Canadian Examination Report mailed on Oct. 19, 2022, issued in connection with Canadian Application No. 3123601, 5 pages.
Canadian Patent Office, Canadian Examination Report mailed on Nov. 2, 2021, issued in connection with Canadian Application No. 3067776, 4 pages.
Canadian Patent Office, Canadian Examination Report mailed on Oct. 26, 2021, issued in connection with Canadian Application No. 3072492, 3 pages.
Canadian Patent Office, Canadian Examination Report mailed on Mar. 29, 2022, issued in connection with Canadian Application No. 3111322, 3 pages.
Canadian Patent Office, Canadian Examination Report mailed on Jan. 3, 2024, issued in connection with Canadian Application No. 3123601, 3 pages.
Canadian Patent Office, Canadian Examination Report mailed on Jun. 7, 2022, issued in connection with Canadian Application No. 3105494, 5 pages.
Canadian Patent Office, Canadian Examination Report mailed on Mar. 9, 2021, issued in connection with Canadian Application No. 3067776, 5 pages.
Canadian Patent Office, Canadian Office Action mailed on Nov. 14, 2018, issued in connection with Canadian Application No. 3015491, 3 pages.
Chinese Patent Office, Chinese Office Action and Translation mailed on Jul. 2, 2021, issued in connection with Chinese Application No. 201880077216.4, 22 pages.
Non-Final Office Action mailed on Dec. 13, 2023, issued in connection with U.S. Appl. No. 18/316,434, filed May 12, 2023, 29 pages.
Non-Final Office Action mailed on Jan. 13, 2017, issued in connection with U.S. Appl. No. 15/098,805, filed Apr. 14, 2016, 11 pages.
Non-Final Office Action mailed on Mar. 13, 2024, issued in connection with U.S. Appl. No. 18/309,939, filed May 1, 2023, 15 pages.
Non-Final Office Action mailed on Nov. 13, 2018, issued in connection with U.S. Appl. No. 15/717,621, filed Sep. 27, 2017, 23 pages.
Non-Final Office Action mailed on Nov. 13, 2018, issued in connection with U.S. Appl. No. 16/160,107, filed Oct. 15, 2018, 8 pages.
Non-Final Office Action mailed on Nov. 13, 2019, issued in connection with U.S. Appl. No. 15/984,073, filed May 18, 2018, 18 pages.

(56) References Cited

OTHER PUBLICATIONS

Non-Final Office Action mailed on Oct. 13, 2021, issued in connection with U.S. Appl. No. 16/679,538, filed Nov. 11, 2019, 8 pages.
Non-Final Office Action mailed on May 14, 2020, issued in connection with U.S. Appl. No. 15/948,541, filed Apr. 9, 2018, 8 pages.
Non-Final Office Action mailed on Nov. 14, 2022, issued in connection with U.S. Appl. No. 17/077,974, filed Oct. 22, 2020, 6 pages.
Non-Final Office Action mailed on Sep. 14, 2017, issued in connection with U.S. Appl. No. 15/178,180, filed Jun. 9, 2016, 16 pages.
Non-Final Office Action mailed on Sep. 14, 2018, issued in connection with U.S. Appl. No. 15/959,907, filed Apr. 23, 2018, 15 pages.
Non-Final Office Action mailed on Sep. 14, 2022, issued in connection with U.S. Appl. No. 17/446,690, filed Sep. 1, 2021, 10 pages.
Non-Final Office Action mailed on Sep. 14, 2023, issued in connection with U.S. Appl. No. 17/528,843, filed Nov. 17, 2021, 20 pages.
Non-Final Office Action mailed on Apr. 15, 2020, issued in connection with U.S. Appl. No. 16/138,111, filed Sep. 21, 2018, 15 pages.
Non-Final Office Action mailed on Aug. 15, 2022, issued in connection with U.S. Appl. No. 17/448,015, filed Sep. 17, 2021, 12 pages.
Non-Final Office Action mailed on Dec. 15, 2020, issued in connection with U.S. Appl. No. 17/087,423, filed Nov. 2, 2020, 7 pages.
Non-Final Office Action mailed on Dec. 15, 2022, issued in connection with U.S. Appl. No. 17/549,253, filed Dec. 13, 2021, 10 pages.
Non-Final Office Action mailed on Feb. 15, 2023, issued in connection with U.S. Appl. No. 17/453,632, filed Nov. 4, 2021, 12 pages.
Non-Final Office Action mailed on Jan. 15, 2019, issued in connection with U.S. Appl. No. 16/173,797, filed Oct. 29, 2018, 6 pages.
Non-Final Office Action mailed on Nov. 15, 2019, issued in connection with U.S. Appl. No. 16/153,530, filed Oct. 5, 2018, 17 pages.
Non-Final Office Action mailed on Sep. 15, 2022, issued in connection with U.S. Appl. No. 17/247,507, filed Dec. 14, 2020, 9 pages.
Non-Final Office Action mailed on Sep. 15, 2022, issued in connection with U.S. Appl. No. 17/327,911, filed May 24, 2021, 44 pages.
Non-Final Office Action mailed on Feb. 16, 2023, issued in connection with U.S. Appl. No. 17/305,920, filed Jul. 16, 2021, 12 pages.
Non-Final Office Action mailed on Mar. 16, 2018, issued in connection with U.S. Appl. No. 15/681,937, filed Aug. 21, 2017, 5 pages.
Non-Final Office Action mailed on Oct. 16, 2018, issued in connection with U.S. Appl. No. 15/131,254, filed Apr. 18, 2016, 16 pages.
Non-Final Office Action mailed on Sep. 16, 2021, issued in connection with U.S. Appl. No. 16/879,553, filed May 20, 2020, 24 pages.
Non-Final Office Action mailed on Aug. 17, 2021, issued in connection with U.S. Appl. No. 17/236,559, filed Apr. 21, 2021, 10 pages.
Non-Final Office Action mailed on Sep. 17, 2020, issued in connection with U.S. Appl. No. 16/600,949, filed Oct. 14, 2019, 29 pages.
Non-Final Office Action mailed on Apr. 18, 2018, issued in connection with U.S. Appl. No. 15/811,468, filed Nov. 13, 2017, 14 pages.
Non-Final Office Action mailed on Aug. 18, 2021, issued in connection with U.S. Appl. No. 16/845,946, filed Apr. 10, 2020, 14 pages.
Non-Final Office Action mailed on Jan. 18, 2019, issued in connection with U.S. Appl. No. 15/721,141, filed Sep. 29, 2017, 18 pages.
Non-Final Office Action mailed on Jan. 18, 2024, issued in connection with U.S. Appl. No. 18/048,034, filed Oct. 20, 2022, 10 pages.
Non-Final Office Action mailed on Jul. 18, 2023, issued in connection with U.S. Appl. No. 18/066,093, filed Dec. 14, 2022, 12 pages.
Non-Final Office Action mailed on Mar. 18, 2024, issued in connection with U.S. Appl. No. 17/532,744, filed Nov. 22, 2021, 20 pages.
Non-Final Office Action mailed on Oct. 18, 2019, issued in connection with U.S. Appl. No. 15/098,760, filed Apr. 14, 2016, 27 pages.
Non-Final Office Action mailed on Oct. 18, 2022, issued in connection with U.S. Appl. No. 16/949,973, filed Nov. 23, 2020, 31 pages.
Non-Final Office Action mailed on Sep. 18, 2019, issued in connection with U.S. Appl. No. 16/179,779, filed Nov. 2, 2018, 14 pages.
Non-Final Office Action mailed on Apr. 19, 2017, issued in connection with U.S. Appl. No. 15/131,776, filed Apr. 18, 2016, 12 pages.
Non-Final Office Action mailed on Dec. 19, 2019, issued in connection with U.S. Appl. No. 16/147,710, filed Sep. 29, 2018, 10 pages.
Non-Final Office Action mailed on Feb. 19, 2020, issued in connection with U.S. Appl. No. 16/148,879, filed Oct. 1, 2018, 15 pages.
Non-Final Office Action mailed on Jan. 19, 2024, issued in connection with U.S. Appl. No. 18/331,580, filed Jun. 8, 2023, 11 pages.
Non-Final Office Action mailed on Sep. 19, 2022, issued in connection with U.S. Appl. No. 17/385,542, filed Jul. 26, 2021, 9 pages.
Non-Final Office Action mailed on Sep. 2, 2020, issued in connection with U.S. Appl. No. 16/290,599, filed Mar. 1, 2019, 17 pages.
Non-Final Office Action mailed on Sep. 2, 2021, issued in connection with U.S. Appl. No. 16/947,895, filed Aug. 24, 2020, 16 pages.
Non-Final Office Action mailed on Apr. 20, 2023, issued in connection with U.S. Appl. No. 18/061,570, filed Dec. 5, 2022, 12 pages.
Non-Final Office Action mailed on Feb. 20, 2018, issued in connection with U.S. Appl. No. 15/211,748, filed Jul. 15, 2016, 31 pages.
Non-Final Office Action mailed on Jun. 20, 2019, issued in connection with U.S. Appl. No. 15/946,585, filed Apr. 5, 2018, 10 pages.
Non-Final Office Action mailed on Oct. 20, 2022, issued in connection with U.S. Appl. No. 17/532,674, filed Nov. 22, 2021, 52 pages.
Non-Final Office Action mailed on Apr. 21, 2021, issued in connection with U.S. Appl. No. 16/109,375, filed Aug. 22, 2018, 9 pages.
Non-Final Office Action mailed on Aug. 21, 2019, issued in connection with U.S. Appl. No. 16/192,126, filed Nov. 15, 2018, 8 pages.
Non-Final Office Action mailed on Mar. 29, 2019, issued in connection with U.S. Appl. No. 16/102,650, filed Aug. 13, 2018, 11 pages.
Non-Final Office Action mailed on Mar. 29, 2021, issued in connection with U.S. Appl. No. 16/528,265, filed Jul. 31, 2019, 18 pages.
Non-Final Office Action mailed on Nov. 29, 2021, issued in connection with U.S. Appl. No. 16/989,350, filed Aug. 10, 2020, 15 pages.
Non-Final Office Action mailed on Sep. 29, 2020, issued in connection with U.S. Appl. No. 16/402,617, filed May 3, 2019, 12 pages.
Non-Final Office Action mailed on Dec. 3, 2020, issued in connection with U.S. Appl. No. 16/145,275, filed Sep. 28, 2018, 11 pages.

(56) References Cited

OTHER PUBLICATIONS

Non-Final Office Action mailed on Jul. 3, 2019, issued in connection with U.S. Appl. No. 15/948,541, filed Apr. 9, 2018, 7 pages.
Non-Final Office Action mailed on Jul. 3, 2023, issued in connection with U.S. Appl. No. 17/135,173, filed Dec. 28, 2020, 22 pages.
Non-Final Office Action mailed on May 3, 2019, issued in connection with U.S. Appl. No. 16/178,122, filed Nov. 1, 2018, 14 pages.
Non-Final Office Action mailed on Oct. 3, 2018, issued in connection with U.S. Appl. No. 16/102,153, filed Aug. 13, 2018, 20 pages.
Non-Final Office Action mailed on Apr. 30, 2019, issued in connection with U.S. Appl. No. 15/718,521, filed Sep. 28, 2017, 39 pages.
Non-Final Office Action mailed on Jun. 30, 2017, issued in connection with U.S. Appl. No. 15/277,810, filed Sep. 27, 2016, 13 pages.
Non-Final Office Action mailed on Sep. 30, 2022, issued in connection with U.S. Appl. No. 17/353,254, filed Jun. 21, 2021, 22 pages.
Non-Final Office Action mailed on Apr. 4, 2019, issued in connection with U.S. Appl. No. 15/718,911, filed Sep. 28, 2017, 21 pages.
Non-Final Office Action mailed on Aug. 4, 2020, issued in connection with U.S. Appl. No. 16/600,644, filed Oct. 14, 2019, 30 pages.
Non-Final Office Action mailed on Jan. 4, 2019, issued in connection with U.S. Appl. No. 15/948,541, filed Apr. 9, 2018, 6 pages.
Non-Final Office Action mailed on Jan. 4, 2022, issued in connection with U.S. Appl. No. 16/879,549, filed May 20, 2020, 14 pages.
Non-Final Office Action mailed on Nov. 4, 2022, issued in connection with U.S. Appl. No. 17/445,272, filed Aug. 17, 2021, 22 pages.
Non-Final Office Action mailed on Oct. 4, 2022, issued in connection with U.S. Appl. No. 16/915,234, filed Jun. 29, 2020, 16 pages.
Non-Final Office Action mailed on Apr. 5, 2023, issued in connection with U.S. Appl. No. 18/145,501, filed Dec. 22, 2022, 6 pages.
Non-Final Office Action mailed on Jul. 5, 2023, issued in connection with U.S. Appl. No. 18/061,579, filed Dec. 5, 2022, 11 pages.
Non-Final Office Action mailed on Nov. 5, 2021, issued in connection with U.S. Appl. No. 16/153,530, filed Oct. 5, 2018, 21 pages.
Non-Final Office Action mailed on Apr. 6, 2020, issued in connection with U.S. Appl. No. 16/424,825, filed May 29, 2019, 22 pages.
Non-Final Office Action mailed on Feb. 6, 2018, issued in connection with U.S. Appl. No. 15/211,689, filed Jul. 15, 2016, 32 pages.
Non-Final Office Action mailed on Feb. 6, 2018, issued in connection with U.S. Appl. No. 15/237,133, filed Aug. 15, 2016, 6 pages.
Non-Final Office Action mailed on Jan. 6, 2021, issued in connection with U.S. Appl. No. 16/439,046, filed Jun. 12, 2019, 13 pages.
Non-Final Office Action mailed on Mar. 6, 2020, issued in connection with U.S. Appl. No. 16/141,875, filed Sep. 25, 2018, 8 pages.
Non-Final Office Action mailed on Oct. 6, 2023, issued in connection with U.S. Appl. No. 17/222,950, filed Apr. 5, 2021, 9 pages.
Non-Final Office Action mailed on Sep. 6, 2017, issued in connection with U.S. Appl. No. 15/131,254, filed Apr. 18, 2016, 13 pages.
Non-Final Office Action mailed on Sep. 6, 2018, issued in connection with U.S. Appl. No. 15/098,760, filed Apr. 14, 2016, 29 pages.
Non-Final Office Action mailed on Dec. 7, 2021, issued in connection with U.S. Appl. No. 16/168,389, filed Oct. 23, 2018, 36 pages.
Non-Final Office Action mailed on Feb. 7, 2023, issued in connection with U.S. Appl. No. 17/303,001, filed May 18, 2021, 8 pages.
Non-Final Office Action mailed on Jan. 7, 2022, issued in connection with U.S. Appl. No. 17/135,123, filed Dec. 28, 2020, 16 pages.
Non-Final Office Action mailed on Jun. 7, 2023, issued in connection with U.S. Appl. No. 16/179,779, filed Nov. 2, 2018, 29 pages.
Non-Final Office Action mailed on Mar. 7, 2022, issued in connection with U.S. Appl. No. 16/812,758, filed Mar. 9, 2020, 18 pages.
Non-Final Office Action mailed on Sep. 7, 2023, issued in connection with U.S. Appl. No. 17/340,590, filed Jun. 7, 2021, 18 pages.
Non-Final Office Action mailed on Feb. 8, 2022, issued in connection with U.S. Appl. No. 16/806,747, filed Mar. 2, 2020, 17 pages.
Non-Final Office Action mailed on Jun. 8, 2023, issued in connection with U.S. Appl. No. 18/048,034, filed Oct. 20, 2022, 8 pages.
Non-Final Office Action mailed on Jun. 8, 2023, issued in connection with U.S. Appl. No. 18/061,243, filed Dec. 2, 2022, 10 pages.
Non-Final Office Action mailed on Sep. 8, 2020, issued in connection with U.S. Appl. No. 15/936,177, filed Mar. 26, 2018, 19 pages.
Non-Final Office Action mailed on Apr. 9, 2018, issued in connection with U.S. Appl. No. 15/804,776, filed Nov. 6, 2017, 18 pages.
Non-Final Office Action mailed on Apr. 9, 2021, issued in connection with U.S. Appl. No. 16/780,483, filed Feb. 3, 2020, 45 pages.
Non-Final Office Action mailed on Feb. 9, 2021, issued in connection with U.S. Appl. No. 16/806,747, filed Mar. 2, 2020, 16 pages.
Non-Final Office Action mailed on May 9, 2018, issued in connection with U.S. Appl. No. 15/818,051, filed Nov. 20, 2017, 22 pages.
Non-Final Office Action mailed on Sep. 9, 2020, issued in connection with U.S. Appl. No. 16/168,389, filed Oct. 23, 2018, 29 pages.
Notice of Allowance mailed Aug. 10, 2021, issued in connection with U.S. Appl. No. 17/157,686, filed Jan. 25, 2021, 9 pages.
Notice of Allowance mailed Aug. 2, 2021, issued in connection with U.S. Appl. No. 16/660,197, filed Oct. 22, 2019, 7 pages.
Notice of Allowance mailed Mar. 31, 2021, issued in connection with U.S. Appl. No. 16/813,643, filed Mar. 9, 2020, 11 pages.
Notice of Allowance mailed Aug. 4, 2021, issued in connection with U.S. Appl. No. 16/780,483, filed Feb. 3, 2020, 5 pages.
Notice of Allowance mailed on Dec. 2, 2019, issued in connection with U.S. Appl. No. 15/718,521, filed Sep. 28, 2017, 15 pages.
Zaykovskiy, Dmitry. Survey of the Speech Recognition Techniques for Mobile Devices. Proceedings of Specom 2006, Jun. 25, 2006, 6 pages.
Zhang et al. Noise Robust Speech Recognition Using Multi-Channel Based Channel Selection And Channel Weighting. The Institute of Electronics, Information and Communication Engineers, arXiv:1604.03276v1 [cs. SD] Jan. 1, 2010, 8 pages.
Final Office Action mailed on Jun. 1, 2022, issued in connection with U.S. Appl. No. 16/806,747, filed Mar. 2, 2020, 20 pages.
Final Office Action mailed on Feb. 10, 2021, issued in connection with U.S. Appl. No. 16/219,702, filed Dec. 13, 2018, 9 pages.
Final Office Action mailed on Feb. 10, 2021, issued in connection with U.S. Appl. No. 16/402,617, filed May 3, 2019, 13 pages.
Final Office Action mailed on Nov. 10, 2020, issued in connection with U.S. Appl. No. 16/600,644, filed Oct. 14, 2019, 19 pages.
Final Office Action mailed on Apr. 11, 2019, issued in connection with U.S. Appl. No. 15/131,254, filed Apr. 18, 2016, 17 pages.
Final Office Action mailed on Aug. 11, 2017, issued in connection with U.S. Appl. No. 15/131,776, filed Apr. 18, 2016, 7 pages.
Final Office Action mailed on Dec. 11, 2019, issued in connection with U.S. Appl. No. 16/227,308, filed Dec. 20, 2018, 10 pages.
Final Office Action mailed on Sep. 11, 2019, issued in connection with U.S. Appl. No. 16/178,122, filed Nov. 1, 2018, 13 pages.
Final Office Action mailed on Apr. 13, 2018, issued in connection with U.S. Appl. No. 15/131,254, filed Apr. 18, 2016, 18 pages.
Final Office Action mailed on Apr. 13, 2018, issued in connection with U.S. Appl. No. 15/438,744, filed Feb. 21, 2017, 20 pages.
Final Office Action mailed on May 13, 2020, issued in connection with U.S. Appl. No. 16/153,530, filed Oct. 5, 2018, 20 pages.
Final Office Action mailed on Jul. 15, 2021, issued in connection with U.S. Appl. No. 16/153,530, filed Oct. 5, 2018, 22 pages.
Final Office Action mailed on Jun. 15, 2017, issued in connection with U.S. Appl. No. 15/098,718, filed Apr. 14, 2016, 15 pages.
Final Office Action mailed on Jun. 15, 2021, issued in connection with U.S. Appl. No. 16/819,755, filed Mar. 16, 2020, 12 pages.
Final Office Action mailed on Oct. 15, 2018, issued in connection with U.S. Appl. No. 15/804,776, filed Nov. 6, 2017, 18 pages.
Final Office Action mailed on Oct. 15, 2020, issued in connection with U.S. Appl. No. 16/109,375, filed Aug. 22, 2018, 9 pages.
Final Office Action mailed on Oct. 16, 2018, issued in connection with U.S. Appl. No. 15/438,725, filed Feb. 21, 2017, 10 pages.
Final Office Action mailed on Aug. 17, 2022, issued in connection with U.S. Appl. No. 16/179,779, filed Nov. 2, 2018, 26 pages.
Final Office Action mailed on Dec. 17, 2021, issued in connection with U.S. Appl. No. 16/813,643, filed Mar. 9, 2020, 12 pages.
Final Office Action mailed on May 17, 2023, issued in connection with U.S. Appl. No. 16/168,389, filed Oct. 23, 2018, 44 pages.
Final Office Action mailed on May 18, 2020, issued in connection with U.S. Appl. No. 16/177,185, filed Oct. 31, 2018, 16 pages.
Final Office Action mailed on Feb. 21, 2018, issued in connection with U.S. Appl. No. 15/297,627, filed Oct. 19, 2016, 12 pages.

(56) References Cited

OTHER PUBLICATIONS

Final Office Action mailed on Mar. 21, 2022, issued in connection with U.S. Appl. No. 16/153,530, filed Oct. 5, 2018, 23 pages.
Final Office Action mailed on May 21, 2020, issued in connection with U.S. Appl. No. 15/989,715, filed May 25, 2018, 21 pages.
Final Office Action mailed on Aug. 22, 2022, issued in connection with U.S. Appl. No. 16/168,389, filed Oct. 23, 2018, 37 pages.
Final Office Action mailed on Aug. 22, 2023, issued in connection with U.S. Appl. No. 18/061,570, filed Dec. 5, 2022, 12 pages.
Final Office Action mailed on Feb. 22, 2021, issued in connection with U.S. Appl. No. 15/936,177, filed Mar. 26, 2018, 20 pages.
Final Office Action mailed on Feb. 22, 2021, issued in connection with U.S. Appl. No. 16/213,570, filed Dec. 7, 2018, 12 pages.
Final Office Action mailed on Jun. 22, 2020, issued in connection with U.S. Appl. No. 16/179,779, filed Nov. 2, 2018, 16 pages.
Final Office Action mailed on Mar. 23, 2020, issued in connection with U.S. Appl. No. 16/145,275, filed Sep. 28, 2018, 11 pages.
Final Office Action mailed on Feb. 24, 2020, issued in connection with U.S. Appl. No. 15/936,177, filed Mar. 26, 2018, 20 pages.
Final Office Action mailed on Aug. 25, 2023, issued in connection with U.S. Appl. No. 16/989,350, filed Aug. 10, 2020, 21 pages.
Final Office Action mailed on Apr. 26, 2019, issued in connection with U.S. Appl. No. 15/721,141, filed Sep. 29, 2017, 20 pages.
Final Office Action mailed on Feb. 27, 2024, issued in connection with U.S. Appl. No. 17/340,590, filed Jun. 7, 2021, 28 pages.
Final Office Action mailed on Jul. 27, 2022, issued in connection with U.S. Appl. No. 16/989,350, filed Aug. 10, 2020, 15 pages.
Final Office Action mailed on Sep. 27, 2023, issued in connection with U.S. Appl. No. 18/048,034, filed Oct. 20, 2022, 9 pages.
Final Office Action mailed on Mar. 29, 2023, issued in connection with U.S. Appl. No. 17/549,034, filed Dec. 13, 2021, 21 pages.
Final Office Action mailed on Nov. 29, 2021, issued in connection with U.S. Appl. No. 17/236,559, filed Apr. 21, 2021, 11 pages.
Final Office Action mailed on Apr. 30, 2019, issued in connection with U.S. Appl. No. 15/098,760, filed Apr. 14, 2016, 6 pages.
Final Office Action mailed on Jun. 4, 2021, issued in connection with U.S. Appl. No. 16/168,389, filed Oct. 23, 2018, 38 pages.
Final Office Action mailed on Oct. 4, 2021, issued in connection with U.S. Appl. No. 16/806,747, filed Mar. 2, 2020, 17 pages.
Final Office Action mailed on Feb. 5, 2019, issued in connection with U.S. Appl. No. 15/438,749, filed Feb. 21, 2017, 17 pages.
Final Office Action mailed on Oct. 6, 2023, issued in connection with U.S. Appl. No. 17/532,744, filed Nov. 22, 2021, 21 pages.
Final Office Action mailed on Feb. 7, 2020, issued in connection with U.S. Appl. No. 15/948,541, filed Apr. 9, 2018, 8 pages.
Final Office Action mailed on Jun. 7, 2022, issued in connection with U.S. Appl. No. 16/736,725, filed Jan. 7, 2020, 14 pages.
Final Office Action mailed on Jun. 8, 2021, issued in connection with U.S. Appl. No. 16/271,550, filed Feb. 8, 2019, 41 pages.
Final Office Action mailed on Sep. 8, 2020, issued in connection with U.S. Appl. No. 16/213,570, filed Dec. 7, 2018, 12 pages.
Final Office Action mailed on Aug. 9, 2023, issued in connection with U.S. Appl. No. 17/493,430, filed Oct. 4, 2021, 19 pages.
Fiorenza Arisio et al. "Deliverable 1.1 User Study, analysis of requirements and definition of the application task," May 31, 2012, http://dirha.fbk.eu/sites/dirha.fbk.eu/files/docs/DIRHA_D1.1., 31 pages.
First Action Interview Office Action mailed on Mar. 8, 2021, issued in connection with U.S. Appl. No. 16/798,967, filed Feb. 24, 2020, 4 pages.
Japanese Patent Office, Notice of Reasons for Refusal and Translation mailed on Aug. 8, 2023, issued in connection with Japanese Patent Application No. 2022-101346, 6 pages.
Japanese Patent Office, Office Action and Translation mailed on Nov. 15, 2022, issued in connection with Japanese Patent Application No. 2021-146144, 9 pages.
Japanese Patent Office, Office Action and Translation mailed on Mar. 16, 2021, issued in connection with Japanese Patent Application No. 2020-506725, 7 pages.
Japanese Patent Office, Office Action and Translation mailed on Nov. 17, 2020, issued in connection with Japanese Patent Application No. 2019-145039, 7 pages.
Japanese Patent Office, Office Action and Translation mailed on Apr. 20, 2021, issued in connection with Japanese Patent Application No. 2020-513852, 9 pages.
Japanese Patent Office, Office Action and Translation mailed on Feb. 24, 2021, issued in connection with Japanese Patent Application No. 2019-517281, 4 pages.
Japanese Patent Office, Office Action and Translation mailed on Apr. 27, 2021, issued in connection with Japanese Patent Application No. 2020-518400, 10 pages.
Japanese Patent Office, Office Action and Translation mailed on Aug. 27, 2020, issued in connection with Japanese Patent Application No. 2019-073349, 6 pages.
Japanese Patent Office, Office Action and Translation mailed on Jul. 30, 2020, issued in connection with Japanese Patent Application No. 2019-517281, 6 pages.
Japanese Patent Office, Office Action and Translation mailed on Jul. 6, 2020, issued in connection with Japanese Patent Application No. 2019-073348, 10 pages.
Japanese Patent Office, Office Action and Translation mailed on Jul. 6, 2021, issued in connection with Japanese Patent Application No. 2019-073349, 6 pages.
Japanese Patent Office, Office Action and Translation mailed on Oct. 8, 2019, issued in connection with Japanese Patent Application No. 2019-521032, 5 pages.
Japanese Patent Office, Office Action mailed on Dec. 7, 2021, issued in connection with Japanese Patent Application No. 2020-513852, 6 pages.
Japanese Patent Office, Office Action mailed on Nov. 29, 2022, issued in connection with Japanese Patent Application No. 2021-181224, 6 pages.
Japanese Patent Office, Office Action Translation mailed on Nov. 5, 2019, issued in connection with Japanese Patent Application No. 2019-517281, 2 pages.
Japanese Patent Office, Office Action Translation mailed on Oct. 8, 2019, issued in connection with Japanese Patent Application No. 2019-521032, 8 pages.
Jo et al., "Synchronized One-to-many Media Streaming with Adaptive Playout Control," Proceedings of SPIE, 2002, pp. 71-82, vol. 4861.
Johnson, "Implementing Neural Networks into Modern Technology," IJCNN'99. International Joint Conference on Neural Networks . Proceedings [Cat. No. 99CH36339], Washington, DC, USA, 1999, pp. 1028-1032, vol. 2, doi: 10.1109/IJCNN.1999.831096. [retrieved on Jun. 22, 2020].
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Jose Alvarez and Mathieu Salzmann "Compression-aware Training of Deep Networks" 31st Conference on Neural Information Processing Systems, Nov. 13, 2017, 12pages.
Joseph Szurley et al, "Efficient computation of microphone utility in a wireless acoustic sensor network with multi-channel Wiener filter based noise reduction", 2012 IEEE International Conference on Acoustics, Speech and Signal Processing, Kyoto, Japan, Mar. 25-30, 2012, pp. 2657-2660, XP032227701, DOI: 10.1109/ICASSP .2012. 6288463 ISBN: 978-1-4673-0045-2.
Katsamanis et al. Robust far-field spoken command recognition for home automation combining adaptation and multichannel processing. ICASSP, IEEE International Conference on Acoustics, Speech and Signal Processing—Proceedings, May 2014, pp. 5547-5551.
Ketabdar et al. Detection of Out-of-Vocabulary Words in Posterior Based ASR. Proceedings of Interspeech 2007, Aug. 27, 2007, 4 pages.
Kim et al. Character-Aware Neural Language Models. Retrieved from the Internet: URL: https://arxiv.org/pdf/1508.06615v3.pdf, Oct. 16, 2015, 9 pages.
Korean Patent Office, Korean Examination Report and Translation mailed on Apr. 10, 2023, issued in connection with Korean Application No. 10-2022-7024007, 8 pages.

(56) References Cited

OTHER PUBLICATIONS

Korean Patent Office, Korean Examination Report and Translation mailed on Oct. 13, 2022, issued in connection with Korean Application No. 10-2021-7030939, 4 pages.
Korean Patent Office, Korean Examination Report and Translation mailed on Apr. 19, 2022, issued in connection with Korean Application No. 10-2021-7008937, 14 pages.
Korean Patent Office, Korean Examination Report and Translation mailed on Jul. 19, 2023, issued in connection with Korean Application No. 10-2022-7024007, 9 pages.
Korean Patent Office, Korean Examination Report and Translation mailed on Nov. 25, 2021, issued in connection with Korean Application No. 10-2021-7008937, 14 pages.
Korean Patent Office, Korean Examination Report and Translation mailed on Apr. 26, 2021, issued in connection with Korean Application No. 10-2021-7008937, 15 pages.
Korean Patent Office, Korean Examination Report and Translation mailed on Jul. 26, 2022, issued in connection with Korean Application No. 10-2022-7016656, 17 pages.
Korean Patent Office, Korean Examination Report and Translation mailed on Dec. 27, 2021, issued in connection with Korean Application No. 10-2021-7008937, 22 pages.
Korean Patent Office, Korean Examination Report and Translation mailed on Mar. 31, 2023, issued in connection with Korean Application No. 10-2022-7016656, 7 pages.
Korean Patent Office, Korean Examination Report and Translation mailed on Oct. 31, 2021, issued in connection with Korean Application No. 10-2022-7024007, 10 pages.
Korean Patent Office, Korean Office Action and Translation mailed on Oct. 14, 2021, issued in connection with Korean Application No. 10-2020-7011843, 29 pages.
Korean Patent Office, Korean Office Action and Translation mailed on Aug. 16, 2019, issued in connection with Korean Application No. 10-2018-7027452, 14 pages.
Korean Patent Office, Korean Office Action and Translation mailed on Apr. 2, 2020, issued in connection with Korean Application No. 10-2020-7008486, 12 pages.
Korean Patent Office, Korean Office Action and Translation mailed on Mar. 25, 2020, issued in connection with Korean Application No. 10-2019-7012192, 14 pages.
Korean Patent Office, Korean Office Action and Translation mailed on Aug. 26, 2020, issued in connection with Korean Application No. 10-2019-7027640, 16 pages.
Korean Patent Office, Korean Office Action and Translation mailed on Mar. 30, 2020, issued in connection with Korean Application No. 10-2020-7004425, 5 pages.
Korean Patent Office, Korean Office Action and Translation mailed on Jan. 4, 2021, issued in connection with Korean Application No. 10-2020-7034425, 14 pages.
Korean Patent Office, Korean Office Action and Translation mailed on Sep. 9, 2019, issued in connection with Korean Application No. 10-2018-7027451, 21 pages.
Korean Patent Office, Korean Office Action mailed on May 8, 2019, issued in connection with Korean Application No. 10-2018-7027451, 7 pages.
Korean Patent Office, Korean Office Action mailed on May 8, 2019, issued in connection with Korean Application No. 10-2018-7027452, 5 pages.
Korean Patent Office, Korean Preliminary Rejection and Translation mailed on Dec. 26, 2023, issued in connection with Korean Application No. 10-2023-7031855, 4 pages.
Korean Patent Office, Korean Preliminary Rejection and Translation mailed on Dec. 5, 2023, issued in connection with Korean Application No. 10-2023-7032988, 11 pages.
Korean Patent Office, Office Action and Translation mailed on Feb. 27, 2023, issued in connection with Korean Application No. 10-2022-7021879, 5 pages.
Lei et al. Accurate and Compact Large Vocabulary Speech Recognition on Mobile Devices. Interspeech 2013, Aug. 25, 2013, 4 pages.
Lengerich et al. An End-to-End Architecture for Keyword Spotting and Voice Activity Detection, arXiv:1611.09405v1, Nov. 28, 2016, 5 pages.
Notice of Allowance mailed on Nov. 2, 2022, issued in connection with U.S. Appl. No. 16/989,805, filed Aug. 10, 2020, 5 pages.
Notice of Allowance mailed on Nov. 3, 2022, issued in connection with U.S. Appl. No. 17/448,015, filed Sep. 17, 2021, 7 pages.
Notice of Allowance mailed on Dec. 4, 2017, issued in connection with U.S. Appl. No. 15/277,810, filed Sep. 27, 2016, 5 pages.
Notice of Allowance mailed on Jul. 5, 2018, issued in connection with U.S. Appl. No. 15/237,133, filed Aug. 15, 2016, 5 pages.
Notice of Allowance mailed on Feb. 6, 2023, issued in connection with U.S. Appl. No. 17/077,974, filed Oct. 22, 2020, 7 pages.
Notice of Allowance mailed on Jan. 6, 2023, issued in connection with U.S. Appl. No. 17/896,129, filed Aug. 26, 2022, 13 pages.
Notice of Allowance mailed on Dec. 7, 2022, issued in connection with U.S. Appl. No. 17/315,599, filed May 10, 2021, 11 pages.
Notice of Allowance mailed on Feb. 8, 2023, issued in connection with U.S. Appl. No. 17/446,690, filed Sep. 1, 2021, 8 pages.
Notice of Allowance mailed on Jan. 9, 2023, issued in connection with U.S. Appl. No. 17/247,507, filed Dec. 14, 2020, 8 pages.
Notice of Allowance mailed on Jul. 9, 2018, issued in connection with U.S. Appl. No. 15/438,741, filed Feb. 21, 2017, 5 pages.
Notice of Allowance mailed on Jun. 9, 2023, issued in connection with U.S. Appl. No. 17/532,674, filed Nov. 22, 2021, 13 pages.
Notice of Allowance mailed on Mar. 9, 2023, issued in connection with U.S. Appl. No. 17/662,302, filed May 6, 2022, 7 pages.
Notice of Allowance mailed on Nov. 9, 2022, issued in connection with U.S. Appl. No. 17/385,542, filed Jul. 26, 2021, 8 pages.
Notice of Allowance mailed on Apr. 1, 2019, issued in connection with U.S. Appl. No. 15/935,966, filed Mar. 26, 2018, 5 pages.
Notice of Allowance mailed on Aug. 1, 2018, issued in connection with U.S. Appl. No. 15/297,627, filed Oct. 19, 2016, 9 pages.
Notice of Allowance mailed on Feb. 1, 2022, issued in connection with U.S. Appl. No. 16/439,046, filed Jun. 12, 2019, 9 pages.
Notice of Allowance mailed on Jun. 1, 2021, issued in connection with U.S. Appl. No. 16/219,702, filed Dec. 13, 2018, 8 pages.
Notice of Allowance mailed on Jun. 1, 2021, issued in connection with U.S. Appl. No. 16/685,135, filed Nov. 15, 2019, 10 pages.
Notice of Allowance mailed on Mar. 1, 2022, issued in connection with U.S. Appl. No. 16/879,549, filed May 20, 2020, 9 pages.
Notice of Allowance mailed on Sep. 1, 2021, issued in connection with U.S. Appl. No. 15/936,177, filed Mar. 26, 2018, 22 pages.
Notice of Allowance mailed on Aug. 10, 2020, issued in connection with U.S. Appl. No. 16/424,825, filed May 29, 2019, 9 pages.
Notice of Allowance mailed on Feb. 10, 2021, issued in connection with U.S. Appl. No. 16/138,111, filed Sep. 21, 2018, 8 pages.
Notice of Allowance mailed on Jul. 10, 2023, issued in connection with U.S. Appl. No. 17/315,599, filed May 10, 2021, 2 pages.
Notice of Allowance mailed on Jun. 10, 2022, issued in connection with U.S. Appl. No. 16/879,549, filed May 20, 2020, 8 pages.
Notice of Allowance mailed on Apr. 11, 2018, issued in connection with U.S. Appl. No. 15/719,454, filed Sep. 28, 2017, 15 pages.
Notice of Allowance mailed on Aug. 11, 2023, issued in connection with U.S. Appl. No. 17/878,649, filed Aug. 1, 2022, 7 pages.
Notice of Allowance mailed on May 11, 2022, issued in connection with U.S. Appl. No. 17/135,123, filed Dec. 28, 2020, 8 pages.
Notice of Allowance mailed on May 11, 2022, issued in connection with U.S. Appl. No. 17/145,667, filed Jan. 11, 2021, 7 pages.
Notice of Allowance mailed on May 11, 2023, issued in connection with U.S. Appl. No. 18/061,638, filed Dec. 5, 2022, 15 pages.
Notice of Allowance mailed on Oct. 11, 2019, issued in connection with U.S. Appl. No. 16/437,476, filed Jun. 11, 2019, 9 pages.
Notice of Allowance mailed on Sep. 11, 2019, issued in connection with U.S. Appl. No. 16/154,071, filed Oct. 8, 2018, 5 pages.
Notice of Allowance mailed on Aug. 12, 2021, issued in connection with U.S. Appl. No. 16/819,755, filed Mar. 16, 2020, 6 pages.
Notice of Allowance mailed on Dec. 12, 2018, issued in connection with U.S. Appl. No. 15/811,468, filed Nov. 13, 2017, 9 pages.
Notice of Allowance mailed on Jul. 12, 2017, issued in connection with U.S. Appl. No. 15/098,805, filed Apr. 14, 2016, 8 pages.
Notice of Allowance mailed on Jul. 12, 2022, issued in connection with U.S. Appl. No. 16/907,953, filed Jun. 22, 2020, 8 pages.

(56) References Cited

OTHER PUBLICATIONS

Notice of Allowance mailed on Jul. 12, 2022, issued in connection with U.S. Appl. No. 17/391,404, filed Aug. 2, 2021, 13 pages.
Notice of Allowance mailed on Jul. 12, 2023, issued in connection with U.S. Appl. No. 18/151,619, filed Jan. 9, 2023, 13 pages.
Notice of Allowance mailed on Jun. 12, 2019, issued in connection with U.S. Appl. No. 15/670,361, filed Aug. 7, 2017, 7 pages.
Notice of Allowance mailed on Jun. 12, 2023, issued in connection with U.S. Appl. No. 17/453,632, filed Nov. 4, 2021, 9 pages.
Notice of Allowance mailed on May 12, 2021, issued in connection with U.S. Appl. No. 16/402,617, filed May 3, 2019, 8 pages.
Notice of Allowance mailed on Sep. 12, 2018, issued in connection with U.S. Appl. No. 15/438,744, filed Feb. 21, 2017, 15 pages.
Notice of Allowance mailed on Apr. 13, 2022, issued in connection with U.S. Appl. No. 17/236,559, filed Apr. 21, 2021, 7 pages.
Notice of Allowance mailed on Dec. 13, 2017, issued in connection with U.S. Appl. No. 15/784,952, filed Oct. 16, 2017, 9 pages.
Notice of Allowance mailed on Dec. 13, 2021, issued in connection with U.S. Appl. No. 16/879,553, filed May 20, 2020, 15 pages.
Notice of Allowance mailed on Feb. 13, 2019, issued in connection with U.S. Appl. No. 15/959,907, filed Apr. 23, 2018, 10 pages.
Notice of Allowance mailed on Feb. 13, 2023, issued in connection with U.S. Appl. No. 18/045,360, filed Oct. 10, 2022, 9 pages.
Notice of Allowance mailed on Jan. 13, 2020, issued in connection with U.S. Appl. No. 16/192,126, filed Nov. 15, 2018, 6 pages.
Notice of Allowance mailed on Jan. 13, 2021, issued in connection with U.S. Appl. No. 16/539,843, filed Aug. 13, 2019, 5 pages.
Notice of Allowance mailed on Jul. 13, 2023, issued in connection with U.S. Appl. No. 18/145,501, filed Dec. 22, 2022, 9 pages.
Louderback, Jim, "Affordable Audio Receiver Furnishes Homes With MP3," TechTV Vault. Jun. 28, 2000 retrieved Jul. 10, 2014, 2 pages.
Maja Taseska and Emanual A.P. Habets, "MMSE-Based Blind Source Extraction in Diffuse Noise Fields Using a Complex Coherence-Based a Priori Sap Estimator." International Workshop on Acoustic Signal Enhancement 2012, Sep. 4-6, 2012, 4pages.
Mathias Wolfel. Channel Selection by Class Separability Measures for Automatic Transcriptions on Distant Microphones, Interspeech 2007 10.21437/Interspeech.2007-255, 4 pages.
Matrix—The Ultimate Development Board Sep. 14, 2019 Matrix—The Ultimate Development Board Sep. 14, 2019 https-//web.archive.org/web/20190914035838/https-//www.matrix.one/ , 1 page.
Mesaros et al. Detection and Classification of Acoustic Scenes and Events: Outcome of the DCASE 2016 Challenge. IEEE/ACM Transactions on Audio, Speech, and Language Processing. Feb. 2018, 16 pages.
Molina et al., "Maximum Entropy-Based Reinforcement Learning Using a Confidence Measure in Speech Recognition for Telephone Speech," in IEEE Transactions on Audio, Speech, and Language Processing, vol. 18, No. 5, pp. 1041-1052, Jul. 2010, doi: 10.1109/TASL.2009.2032618. [Retrieved online] URLhttps://ieeexplore.ieee.org/document/5247099?partnum=5247099&searchProductType=IEEE%20Journals%20Transactions.
Morales-Cordovilla et al. "Room Localization for Distant Speech Recognition," Proceedings of Interspeech 2014, Sep. 14, 2014, 4 pages.
Newman, Jared. "Chromecast Audio's multi-room support has arrived," Dec. 11, 2015, https://www.pcworld.com/article/3014204/customer-electronic/chromcase-audio-s-multi-room-support-has . . . , 1 page.
Ngo et al. "Incorporating the Conditional Speech Presence Probability in Multi-Channel Wiener Filter Based Noise Reduction in Hearing Aids." EURASIP Journal on Advances in Signal Processing vol. 2009, Jun. 2, 2009, 11 pages.
Non-Final Office Action mailed Jul. 12, 2021, issued in connection with U.S. Appl. No. 17/008,104, filed Aug. 31, 2020, 6 pages.
Non-Final Office Action mailed Jun. 18, 2021, issued in connection with U.S. Appl. No. 17/236,559, filed Apr. 21, 2021, 9 pages.
Non-Final Office Action mailed Apr. 21, 2021, issued in connection with U.S. Appl. No. 16/109,375, filed Aug. 22, 2018, 9 pages.
Non-Final Office Action mailed Dec. 21, 2020, issued in connection with U.S. Appl. No. 16/153,530, filed Oct. 5, 2018, 22 pages.
Non-Final Office Action mailed Jul. 22, 2021, issued in connection with U.S. Appl. No. 16/179,779, filed Nov. 2, 2018, 19 pages.
Non-Final Office Action mailed Apr. 23, 2021, issued in connection with U.S. Appl. No. 16/660,197, filed Oct. 22, 2019, 9 pages.
Non-Final Office Action mailed Jun. 25, 2021, issued in connection with U.S. Appl. No. 16/213,570, filed Dec. 7, 2018, 11 pages.
Non-Final Office Action mailed Jul. 8, 2021, issued in connection with U.S. Appl. No. 16/813,643, filed Mar. 9, 2020, 12 pages.
Non-Final Office Action mailed Dec. 9, 2020, issued in connection with U.S. Appl. No. 16/271,550, filed Feb. 8, 2019, 35 pages.
Non-Final Office Action mailed Jul. 9, 2021, issued in connection with U.S. Appl. No. 16/806,747, filed Mar. 2, 2020, 18 pages.
Non-Final Office Action mailed on Jun. 1, 2017, issued in connection with U.S. Appl. No. 15/223,218, filed Jul. 29, 2016, 7 pages.
Non-Final Office Action mailed on Feb. 2, 2023, issued in connection with U.S. Appl. No. 17/305,698, filed Jul. 13, 2021, 16 pages.
Non-Final Office Action mailed on Nov. 2, 2017, issued in connection with U.S. Appl. No. 15/584,782, filed May 2, 2017, 11 pages.
Non-Final Office Action mailed on Nov. 3, 2017, issued in connection with U.S. Appl. No. 15/438,741, filed Feb. 21, 2017, 11 pages.
Non-Final Office Action mailed on Nov. 4, 2019, issued in connection with U.S. Appl. No. 16/022,662, filed Jun. 28, 2018, 16 pages.
Non-Final Office Action mailed on Dec. 5, 2022, issued in connection with U.S. Appl. No. 17/662,302, filed May 6, 2022, 12 pages.
Non-Final Office Action mailed on Oct. 5, 2022, issued in connection with U.S. Appl. No. 17/449,926, filed Oct. 4, 2021, 11 pages.
Non-Final Office Action mailed on Sep. 5, 2019, issued in connection with U.S. Appl. No. 16/416,752, filed May 20, 2019, 14 pages.
Non-Final Office Action mailed on Feb. 7, 2017, issued in connection with U.S. Appl. No. 15/131,244, filed Apr. 18, 2016, 12 pages.
Non-Final Office Action mailed on Feb. 8, 2017, issued in connection with U.S. Appl. No. 15/098,892, filed Apr. 14, 2016, 17 pages.
Non-Final Office Action mailed on Mar. 9, 2017, issued in connection with U.S. Appl. No. 15/098,760, filed Apr. 14, 2016, 13 pages.
Non-Final Office Action mailed on Oct. 9, 2019, issued in connection with U.S. Appl. No. 15/936,177, filed Mar. 26, 2018, 16 pages.
Non-Final Office Action mailed on Feb. 1, 2024, issued in connection with U.S. Appl. No. 18/313,013, filed May 5, 2023, 47 pages.
Non-Final Office Action mailed on Jul. 1, 2020, issued in connection with U.S. Appl. No. 16/138,111, filed Sep. 21, 2018, 14 pages.
Non-Final Office Action mailed on Aug. 10, 2023, issued in connection with U.S. Appl. No. 18/070,024, filed Nov. 28, 2022, 4 pages.
Non-Final Office Action mailed on Jan. 10, 2018, issued in connection with U.S. Appl. No. 15/098,718, filed Apr. 14, 2016, 15 pages.
Non-Final Office Action mailed on Jan. 10, 2018, issued in connection with U.S. Appl. No. 15/229,868, filed Aug. 5, 2016, 13 pages.
Non-Final Office Action mailed on Jan. 10, 2018, issued in connection with U.S. Appl. No. 15/438,725, filed Feb. 21, 2017, 15 pages.
Non-Final Office Action mailed on Sep. 10, 2018, issued in connection with U.S. Appl. No. 15/670,361, filed Aug. 7, 2017, 17 pages.
Non-Final Office Action mailed on Aug. 11, 2021, issued in connection with U.S. Appl. No. 16/841,116, filed Apr. 6, 2020, 9 pages.
Non-Final Office Action mailed on Feb. 11, 2021, issued in connection with U.S. Appl. No. 16/876,493, filed May 18, 2020, 16 pages.
Non-Final Office Action mailed on Feb. 11, 2022, issued in connection with U.S. Appl. No. 17/145,667, filed Jan. 11, 2021, 9 pages.
Non-Final Office Action mailed on Mar. 11, 2021, issued in connection with U.S. Appl. No. 16/834,483, filed Mar. 30, 2020, 11 pages.
Non-Final Office Action mailed on Oct. 11, 2019, issued in connection with U.S. Appl. No. 16/177,185, filed Oct. 31, 2018, 14 pages.
Non-Final Office Action mailed on Sep. 11, 2020, issued in connection with U.S. Appl. No. 15/989,715, filed May 25, 2018, 8 pages.

(56) References Cited

OTHER PUBLICATIONS

Non-Final Office Action mailed on Sep. 11, 2020, issued in connection with U.S. Appl. No. 16/219,702, filed Dec. 13, 2018, 9 pages.
Non-Final Office Action mailed on Apr. 12, 2021, issued in connection with U.S. Appl. No. 16/528,224, filed Jul. 31, 2019, 9 pages.
Non-Final Office Action mailed on Apr. 12, 2023, issued in connection with U.S. Appl. No. 17/878,649, filed Aug. 1, 2022, 16 pages.
Non-Final Office Action mailed on Dec. 12, 2016, issued in connection with U.S. Appl. No. 15/098,718, filed Apr. 14, 2016, 11 pages.
Non-Final Office Action mailed on Feb. 12, 2019, issued in connection with U.S. Appl. No. 15/670,361, filed Aug. 7, 2017, 13 pages.
Non-Final Office Action mailed on Dec. 13, 2023, issued in connection with U.S. Appl. No. 18/316,400, filed May 12, 2023, 6 pages.

* cited by examiner

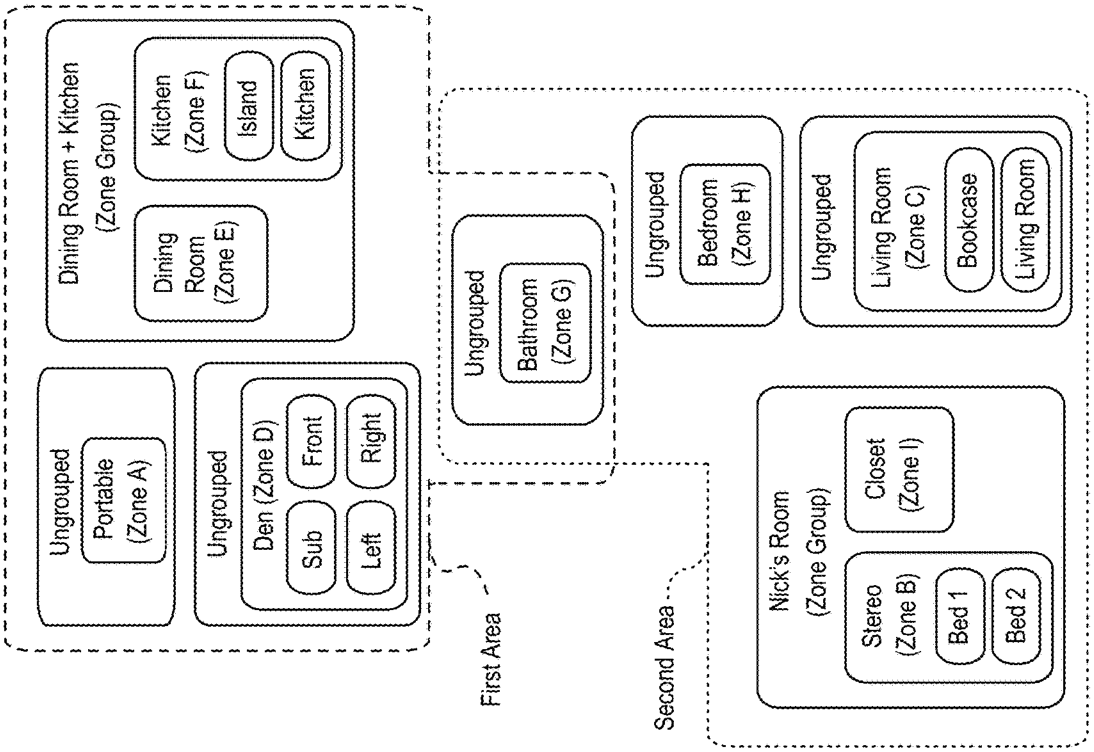

Figure 3A

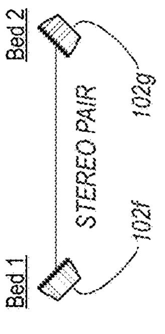

Figure 3B

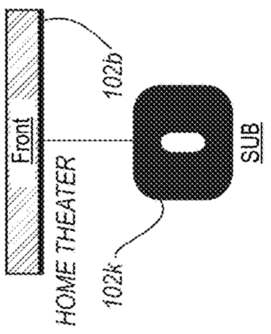

Figure 3C

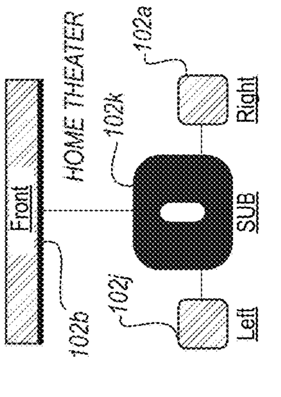

Figure 3D

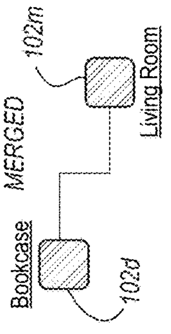

Figure 3E

Bed 1
Bed 2
STEREO PAIR
102f
102g
Front
HOME THEATER
SUB
102b
102k
Front
HOME THEATER
SUB
Left
Right
102b
102j
102k
102a
Bookcase
MERGED
Living Room
102d
102m
Dining Room + Kitchen
(Zone Group)
Dining
Room
(Zone E)
Kitchen
(Zone F)
Island
Kitchen
Ungrouped
Portable
(Zone A)
Ungrouped
Den (Zone D)
Sub
Front
Left
Right
Ungrouped
Bathroom
(Zone G)
Ungrouped
Bedroom
(Zone H)
Ungrouped
Living Room
(Zone C)
Bookcase
Living Room
Nick's Room
(Zone Group)
Stereo
(Zone B)
Bed 1
Bed 2
Closet
(Zone I)
First Area
Second Area

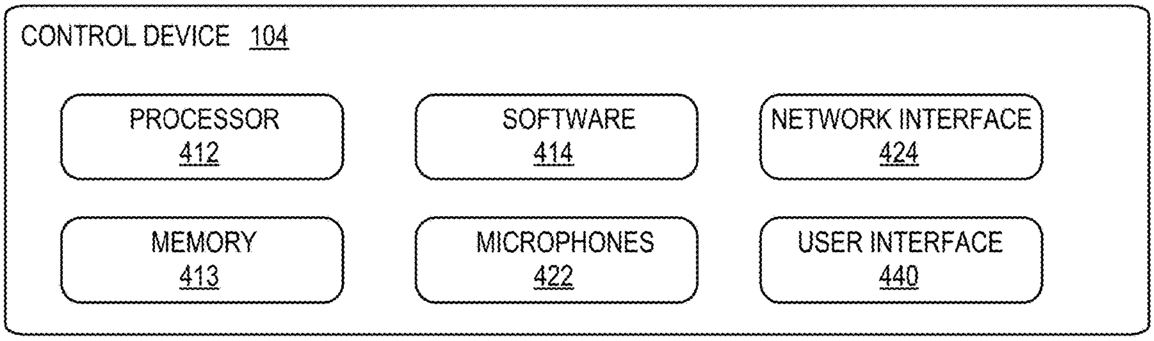

Figure 4A

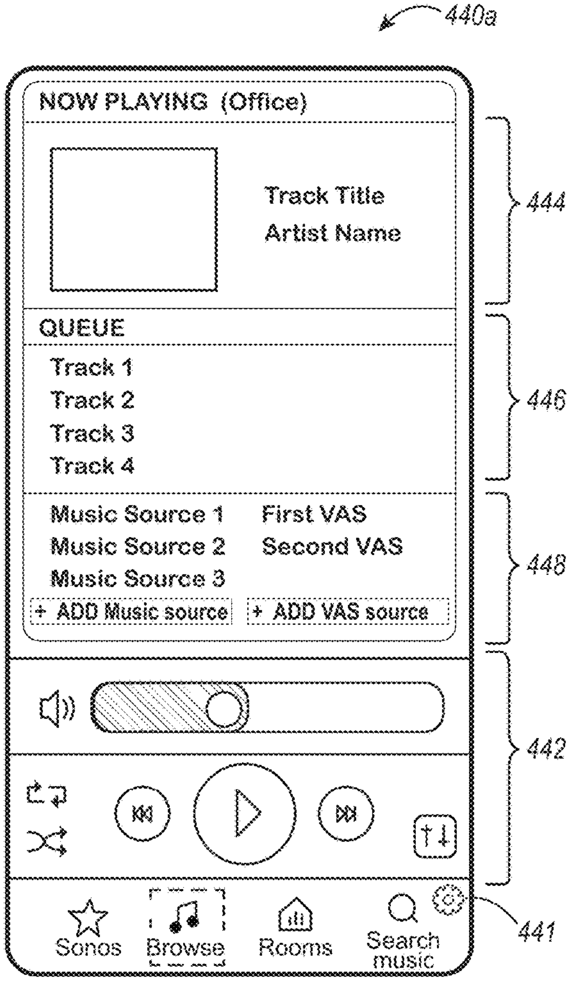

Figure 4B

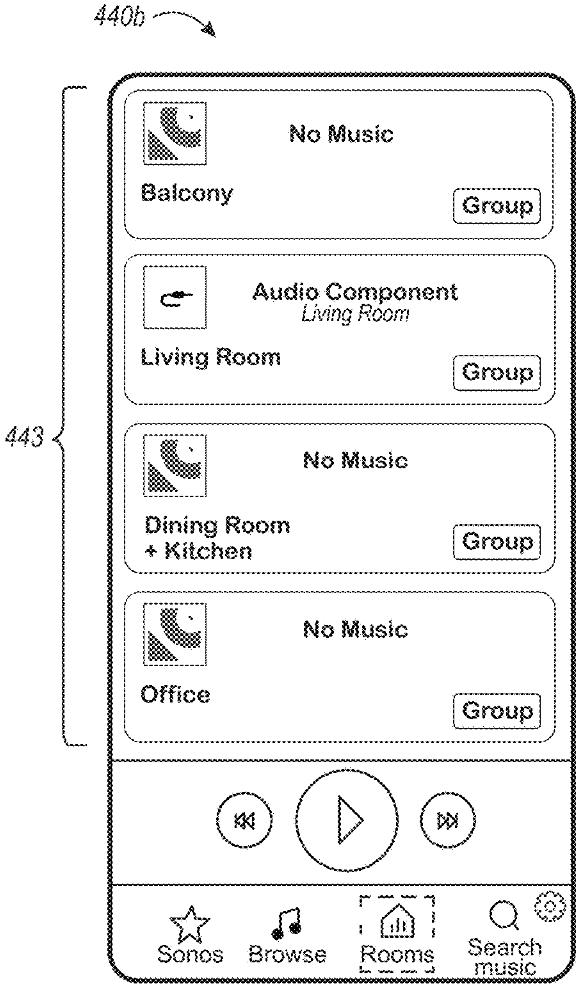

NOW PLAYING (Office)

Track Title
Artist Name

444

QUEUE

Track 1
Track 2
Track 3
Track 4

446

Music Source 1
Music Source 2
Music Source 3
First VAS
Second VAS
+ ADD Music source
+ ADD VAS source

448

442

Sonos
Browse
Rooms
Search music

441

440b

443

No Music
Balcony
Group

Audio Component
Living Room
Living Room
Group

No Music
Dining Room + Kitchen
Group

No Music
Office
Group

Sonos
Browse
Rooms
Search music

SYSTEMS AND METHODS FOR POWER-EFFICIENT KEYWORD DETECTION

CROSS-REFERENCE TO RELATED APPLICATION

This application is a continuation of U.S. patent application Ser. No. 18/060,176, filed Nov. 30, 2022, now U.S. Pat. No. 11,769,511, which is a continuation of U.S. patent application Ser. No. 17/248,427, filed Jan. 25, 2021, now U.S. Pat. No. 11,551,700, each of which is incorporated herein by reference in its entirety.

TECHNICAL FIELD

The present technology relates to consumer goods and, more particularly, to methods, systems, products, features, services, and other elements directed to voice-controllable media playback systems or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The SONOS Wireless HiFi System enables people to experience music from many sources via one or more networked playback devices. Through a software control application installed on a smartphone, tablet, or computer, one can play what he or she wants in any room that has a networked playback device. Additionally, using a controller, for example, different songs can be streamed to each room that has a playback device, rooms can be grouped together for synchronous playback, or the same song can be heard in all rooms synchronously.

Given the ever-growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

FIGS. 3A-3E are diagrams showing example playback device configurations in accordance with aspects of the disclosure;

FIG. 4A is a functional block diagram of an example controller device in accordance with aspects of the disclosure;

FIGS. 4B and 4C are controller interfaces in accordance with aspects of the disclosure;

Figure 1A:
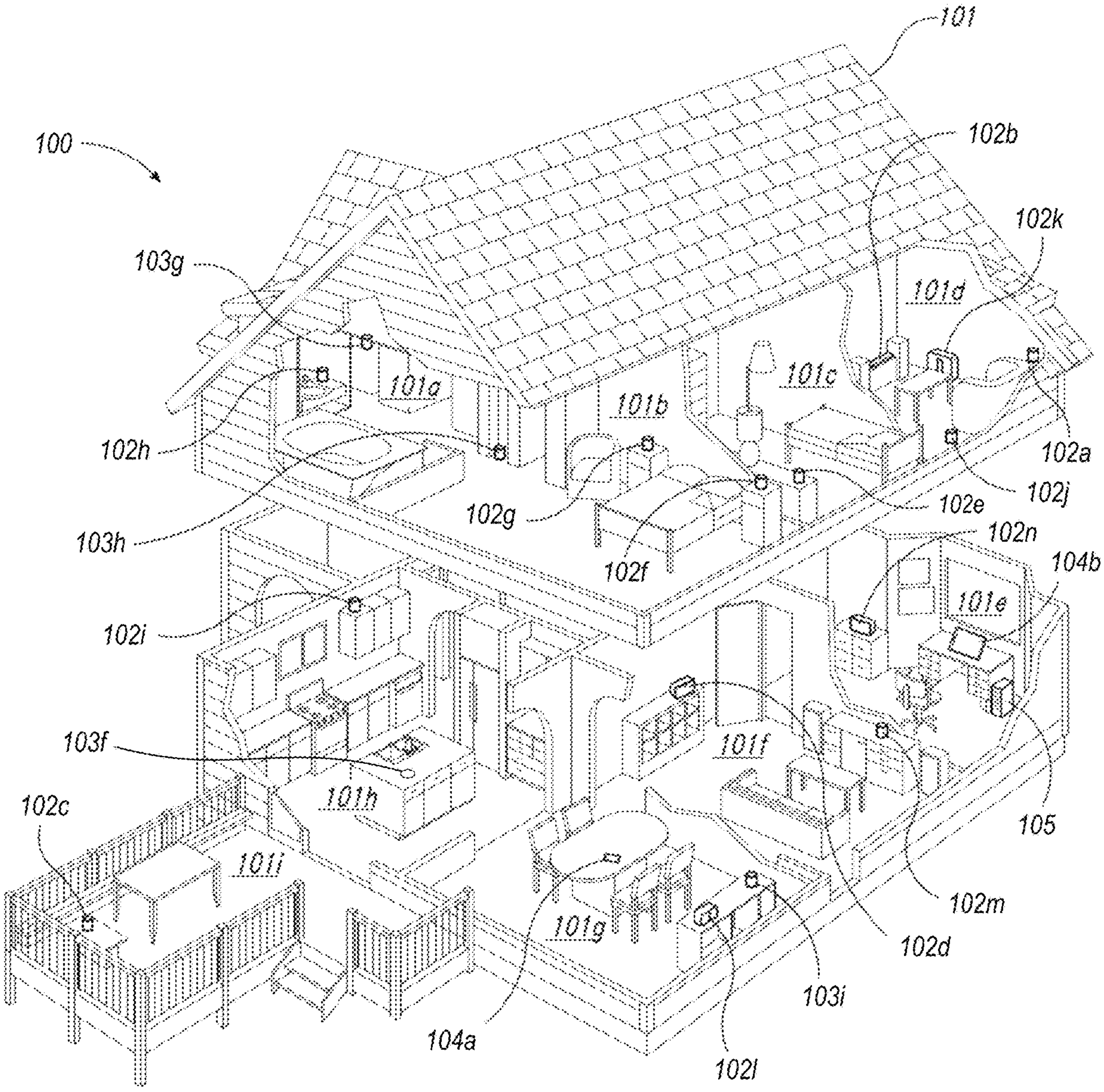
FIG. 1A is a partial cutaway view of an environment having a media playback system configured in accordance with aspects of the disclosed technology.

The drawings are for purposes of illustrating example embodiments, but it should be understood that the inventions are not limited to the arrangements and instrumentality shown in the drawings. In the drawings, identical reference numbers identify at least generally similar elements. To facilitate the discussion of any particular element, the most significant digit or digits of any reference number refers to the Figure in which that element is first introduced. For example, element 103*a* is first introduced and discussed with reference to FIG. 1A.

DETAILED DESCRIPTION

I. Overview

Voice control can be beneficial in a "smart" home that includes smart appliances and devices that are connected to a communication network, such as wireless audio playback devices, illumination devices, and home-automation devices (e.g., thermostats, door locks, etc.). In some implementations, network microphone devices may be used to control smart home devices.

A network microphone device ("NMD") is a networked computing device that typically includes an arrangement of microphones, such as a microphone array, that is configured to detect sounds present in the NMD's environment. The detected sound may include a person's speech mixed with background noise (e.g., music being output by a playback device or other ambient noise). In practice, an NMD typically filters detected sound to remove the background noise from the person's speech to facilitate identifying whether the speech contains a voice input indicative of voice control. If so, the NMD may take action based on such a voice input.

An NMD often employs a wake-word engine, which is typically onboard the NMD, to identify whether sound detected by the NMD contains a voice input that includes a particular wake word. The wake-word engine may be configured to identify (i.e., "spot") a particular wake word using one or more identification algorithms. This wake-word identification process is commonly referred to as "keyword spotting." In practice, to help facilitate keyword spotting, the NMD may buffer sound detected by a microphone of the NMD and then use the wake-word engine to process that buffered sound to determine whether a wake word is present.

When a wake-word engine spots a wake word in detected sound, the NMD may determine that a wake-word event (i.e., a "wake-word trigger") has occurred, which indicates that the NMD has detected sound that includes a potential voice input. The occurrence of the wake-word event typically causes the NMD to perform additional processes involving the detected sound. In some implementations, these additional processes may include outputting an alert (e.g., an audible chime and/or a light indicator) indicating that a wake word has been identified and extracting detected-sound data from a buffer, among other possible additional processes. Extracting the detected sound may include reading out and packaging a stream of the detected-sound according to a particular format and transmitting the packaged sound-data to an appropriate voice-assistant service (VAS) for interpretation.

In turn, the VAS corresponding to the wake word that was identified by the wake-word engine receives the transmitted sound data from the NMD over a communication network. A VAS traditionally takes the form of a remote service implemented using one or more cloud servers configured to process voice inputs (e.g., AMAZON's ALEXA, APPLE's SIRI, MICROSOFT's CORTANA, GOOGLE'S ASSISTANT, etc.). In some instances, certain components and functionality of the VAS may be distributed across local and remote devices. Additionally, or alternatively, a VAS may take the form of a local service implemented at an NMD or a media playback system comprising the NMD such that a voice input or certain types of voice input (e.g., rudimentary commands) are processed locally without intervention from a remote VAS.

In any case, when a VAS receives detected-sound data, the VAS will typically process this data, which involves identifying the voice input and determining an intent of words captured in the voice input. The VAS may then provide a response back to the NMD with some instruction according to the determined intent. Based on that instruction, the NMD may cause one or more smart devices to perform an action. For example, in accordance with an instruction from a VAS, an NMD may cause a playback device to play a particular song or an illumination device to turn on/off, among other examples. In some cases, an NMD, or a media system with NMDs (e.g., a media playback system with NMD-equipped playback devices) may be configured to interact with multiple VASes. In practice, the NMD may select one VAS over another based on the particular wake word identified in the sound detected by the NMD.

In some implementations, a playback device that is configured to be part of a networked media playback system may include components and functionality of an NMD (i.e., the playback device is "NMD-equipped"). In this respect, such a playback device may include a microphone that is configured to detect sounds present in the playback device's environment, such as people speaking, audio being output by the playback device itself or another playback device that is nearby, or other ambient noises, and may also include components for buffering detected sound to facilitate wake-word identification.

Some NMD-equipped playback devices may include an internal power source (e.g., a rechargeable battery) that allows the playback device to operate without being physically connected to a wall electrical outlet or the like. In this regard, such a playback device may be referred to herein as a "portable playback device." On the other hand, playback devices that are configured to rely on power from a wall electrical outlet or the like may be referred to herein as "stationary playback devices," although such devices may in fact be moved around a home or other environment. In practice, a person might often take a portable playback device to and from a home or other environment in which one or more stationary playback devices remain.

In some cases, multiple voice services are configured for the NMD, or a system of NMDs (e.g., a media playback system of playback devices). One or more services can be configured during a set-up procedure, and additional voice services can be configured for the system later on. As such, the NMD acts as an interface with multiple voice services, perhaps alleviating a need to have an NMD from each of the voice services to interact with the respective voice services. Yet further, the NMD can operate in concert with service-specific NMDs present in a household to process a given voice command.

Where two or more voice services are configured for the NMD, a particular voice service can be invoked by utterance of a wake word corresponding to the particular voice service. For instance, in querying AMAZON, a user might speak the wake word "Alexa" followed by a voice command. Other examples include "Ok, Google" for querying GOOGLE and "Hey, Siri" for querying APPLE.

In some cases, a generic wake word can be used to indicate a voice input to an NMD. In some cases, this is a manufacturer-specific wake word rather than a wake word tied to any particular voice service (e.g., "Hey, Sonos" where the NMD is a SONOS playback device). Given such a wake word, the NMD can identify a particular voice service to process the request. For instance, if the voice input following the wake word is related to a particular type of command (e.g., music playback), then the voice input is sent to a particular voice service associated with that type of command (e.g. a streaming music service having voice command capabilities).

Keyword spotting can be computationally demanding and power intensive, as it involves continuously processing sound data to detect whether the sound data includes one or more keywords. In particular, voice processing operations such as spatial filtering, noise cancellation, and wake-word detection can increase computational load, resulting in increased average CPU clock rate and accompanying power consumption. Increased power demands may require larger batteries in the case of portable devices, and/or may require tradeoffs among other components such as audio amplifiers, wireless transceivers, or other electronic components that also consume power. Accordingly, there remains a need to reduce the computational demands and power consumption associated with detecting keywords in voice input provided by a user.

One way to address these issues is to place at least some voice processing components of an NMD into a low-power, standby, or disabled stage for certain periods of time. However, from a user-experience perspective, it is desirable to maintain the NMD in a state that can receive voice input from a user at any time, without requiring separate intervention by the user (e.g., pressing a button or adjusting a setting on the NMD). Embodiments of the present technology solve this and other problems by providing a multi-stage NMD that can monitor sound data for voice activity while in a low-power stage and only activate downstream voice processing components once voice activity has been detected. Another potential future benefit may be helping to meet energy efficiency regulations which may be imposed on consumer electronic products, for example, if official limitations are enacted for power consumption in the idle state when the playback device is not active.

In some examples, the NMD can default to a low-power or standby stage. While in this low-power stage, the NMD captures sound data using one or more microphones and analyzes the captured sound data to detect voice activity. If no voice activity is detected, the NMD can maintain the low-power stage and continue to monitor detected sounds for voice activity. In various embodiments, the NMD can use any suitable technique for detecting voice activity in the sound data. In particular, any suitable algorithm or combination of algorithms for determining a speech presence probability may be used. For example, certain acoustic features can be extracted from the sound data, such as energy-based features (e.g., signal-to-noise ratio), periodicity (e.g., speech signals tend to be more periodic than background noises), speech signal dynamics (e.g., analyzing the variance of power envelopes), or others. One or more such acoustic features can then be analyzed using statistical models or other discriminators to detect voice activity in the sound data. Example classifiers include Gaussian mixture models, Laplacian models, or other classifiers that discriminate between voice and non-voice sound data. Various other approaches to identifying speech in captured sound data may be used.

Once voice activity is detected in the sound data, the NMD can transition to a second, high-power or fully operational stage. In this second stage, the NMD can further process the captured sound data utilizing downstream components that were previously in a disabled or standby stage or otherwise consuming less power. This further processing can include the activation and operation of relatively power-demanding components to perform additional tasks, such as spatial filtering, acoustic echo cancellation, wake-word detection, and data transmission over a network interface (e.g., streaming captured sound data to a remote VAS for processing). After voice activity is no longer detected, after a VAS interaction is determined to be concluded, and/or after a predetermined period of time has elapsed, the NMD can revert to the first, low-power or standby stage. As such, by limiting the operation of certain power-intensive components of the NMD to those instances in which voice activity is detected, overall power consumption can be reduced without deleteriously impacting the user experience.

As an example, in some embodiments an NMD detects sound via at least one of its microphones. The NMD can determine, via a voice activity detection process, whether the detected sound includes voice activity. When no voice activity is detected in the sound data, the NMD can operate in a first stage, in which the NMD forgoes spatial processing (and optionally other processing steps) of the sound data, resulting in unfiltered sound data. Once voice activity is detected in the detected sound, the NMD can transition to a second stage that is more power-intensive than the first stage. While in the second stage, the NMD can spatially process (e.g., using a multi-channel Wiener filter or other suitable spatial processing technique) at least the second portion of the captured sound data, thereby producing filtered sound data. The NMD may then detect, via a wake-word engine, a wake word in the sound data. In some examples, the wake word can be detected based on both the unfiltered sound data and the filtered sound data. After detecting the wake word, the NMD may then determine an action to be performed based on the sound data (e.g., pause audio playback, transmit data to a remote VAS, etc.). After voice activity is no longer detected, after a VAS interaction is determined to be concluded, and/or after a period of time has elapsed, the NMD may revert from the second stage to the first stage, thereby reducing power consumption.

While some embodiments described herein may refer to functions performed by given actors, such as "users" and/or other entities, it should be understood that this description is for purposes of explanation only. The claims should not be interpreted to require action by any such example actor unless explicitly required by the language of the claims themselves.

II. Example Operating Environment

Figure 1B:
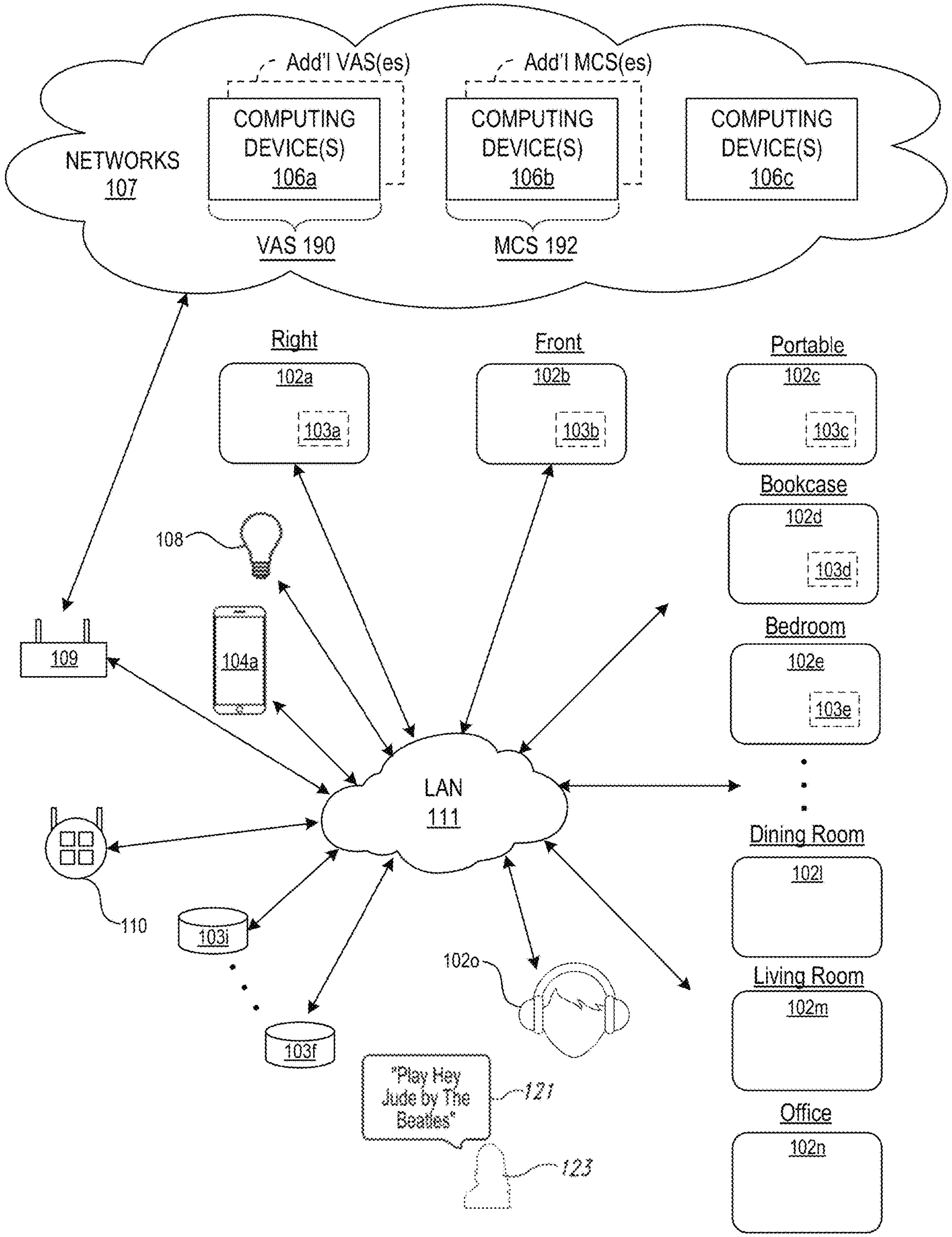
FIG. 1B is a schematic diagram of the media playback system of FIG. 1A and one or more networks.

FIGS. 1A and 1B illustrate an example configuration of a media playback system 100 (or "MPS 100") in which one or more embodiments disclosed herein may be implemented. Referring first to FIG. 1A, the MPS 100 as shown is associated with an example home environment having a plurality of rooms and spaces, which may be collectively referred to as a "home environment," "smart home," or "environment 101." The environment 101 comprises a household having several rooms, spaces, and/or playback zones, including a master bathroom 101*a*, a master bedroom 101*b* (referred to herein as "Nick's Room"), a second bedroom 101*c*, a family room or den 101*d*, an office 101*e*, a living room 101*f*, a dining room 101*g*, a kitchen 101*h*, and an outdoor patio 101*i*. While certain embodiments and examples are described below in the context of a home environment, the technologies described herein may be implemented in other types of environments. In some embodiments, for example, the MPS 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

Within these rooms and spaces, the MPS 100 includes one or more computing devices. Referring to FIGS. 1A and 1B together, such computing devices can include playback devices 102 (identified individually as playback devices 102*a*-102*o*), network microphone devices 103 (identified individually as "NMDs" 103*a*-102*i*), and controller devices 104*a* and 104*b* (collectively "controller devices 104"). Referring to FIG. 1B, the home environment may include additional and/or other computing devices, including local network devices, such as one or more smart illumination devices 108 (FIG. 1B), a smart thermostat 110, and a local computing device 105 (FIG. 1A). In embodiments described below, one or more of the various playback devices 102 may be configured as portable playback devices, while others may be configured as stationary playback devices. For example, the headphones 102*o* (FIG. 1B) are a portable playback device, while the playback device 102*d* on the bookcase may be a stationary device. As another example, the playback device 102*c* on the Patio may be a battery-powered device, which may allow it to be transported to various areas within the environment 101, and outside of the environment 101, when it is not plugged in to a wall outlet or the like.

With reference still to FIG. 1B, the various playback, network microphone, and controller devices 102-104 and/or other network devices of the MPS 100 may be coupled to one another via point-to-point connections and/or over other connections, which may be wired and/or wireless, via a LAN 111 including a network router 109. For example, the playback device 102*j* in the Den 101*d* (FIG. 1A), which may be designated as the "Left" device, may have a point-to-point connection with the playback device 102*a*, which is also in the Den 101*d* and may be designated as the "Right" device. In a related embodiment, the Left playback device 102*j* may communicate with other network devices, such as the playback device 102*b*, which may be designated as the "Front" device, via a point-to-point connection and/or other connections via the LAN 111.

As further shown in FIG. 1B, the MPS 100 may be coupled to one or more remote computing devices 106 via a wide area network ("WAN") 107. In some embodiments, each remote computing device 106 may take the form of one or more cloud servers. The remote computing devices 106 may be configured to interact with computing devices in the environment 101 in various ways. For example, the remote computing devices 106 may be configured to facilitate streaming and/or controlling playback of media content, such as audio, in the home environment 101.

In some implementations, the various playback devices, NMDs, and/or controller devices 102-104 may be communicatively coupled to at least one remote computing device associated with a VAS and at least one remote computing device associated with a media content service ("MCS"). For instance, in the illustrated example of FIG. 1B, remote computing devices **106*a* are associated with a VAS 190 and remote computing devices 106*b* are associated with an MCS 192. Although only a single VAS 190 and a single MCS 192 are shown in the example of FIG. 1B for purposes of clarity, the MPS 100** may be coupled to multiple, different VASes and/or MCSes. In some implementations, VASes may be operated by one or more of AMAZON, GOOGLE, APPLE, MICROSOFT, SONOS or other voice assistant providers. In some implementations, MCSes may be operated by one or more of SPOTIFY, PANDORA, AMAZON MUSIC, or other media content services.

As further shown in FIG. 1B, the remote computing devices 106 further include remote computing device **106*c* configured to perform certain operations, such as remotely facilitating media playback functions, managing device and system status information, directing communications between the devices of the MPS 100 and one or multiple VASes and/or MCSes, among other operations. In one example, the remote computing devices 106*c*** provide cloud servers for one or more SONOS Wireless HiFi Systems.

In various implementations, one or more of the playback devices 102 may take the form of or include an on-board (e.g., integrated) network microphone device. For example, the playback devices **102*a*—e include or are otherwise equipped with corresponding NMDs 103*a*—e, respectively. A playback device that includes or is equipped with an NMD may be referred to herein interchangeably as a playback device or an NMD unless indicated otherwise in the description. In some cases, one or more of the NMDs 103 may be a stand-alone device. For example, the NMDs 103*f* and 103*g*** may be stand-alone devices. A stand-alone NMD may omit components and/or functionality that is typically included in a playback device, such as a speaker or related electronics. For instance, in such cases, a stand-alone NMD may not produce audio output or may produce limited audio output (e.g., relatively low-quality audio output).

The various playback and network microphone devices 102 and 103 of the MPS 100 may each be associated with a unique name, which may be assigned to the respective devices by a user, such as during setup of one or more of these devices. For instance, as shown in the illustrated example of FIG. 1B, a user may assign the name "Bookcase" to playback device **102*d* because it is physically situated on a bookcase. Similarly, the NMD 103*f* may be assigned the named "Island" because it is physically situated on an island countertop in the Kitchen 101*h* (FIG. 1A). Some playback devices may be assigned names according to a zone or room, such as the playback devices 102*e*, 102*l*, 102*m*, and 102*n*, which are named "Bedroom," "Dining Room," "Living Room," and "Office," respectively. Further, certain playback devices may have functionally descriptive names. For example, the playback devices 102*a* and 102*b* are assigned the names "Right" and "Front," respectively, because these two devices are configured to provide specific audio channels during media playback in the zone of the Den 101*d* (FIG. 1A). The playback device 102*c* in the Patio may be named portable because it is battery-powered and/or readily transportable to different areas of the environment 101**. Other naming conventions are possible.

As discussed above, an NMD may detect and process sound from its environment, such as sound that includes background noise mixed with speech spoken by a person in the NMD's vicinity. For example, as sounds are detected by the NMD in the environment, the NMD may process the detected sound to determine if the sound includes speech that contains voice input intended for the NMD and ultimately a particular VAS. For example, the NMD may identify whether speech includes a wake word associated with a particular VAS.

In the illustrated example of FIG. 1B, the NMDs 103 are configured to interact with the VAS 190 over a network via the LAN 111 and the router 109. Interactions with the VAS 190 may be initiated, for example, when an NMD identifies in the detected sound a potential wake word. The identification causes a wake-word event, which in turn causes the NMD to begin transmitting detected-sound data to the VAS 190. In some implementations, the various local network devices 102-105 (FIG. 1A) and/or remote computing devices **106*c* of the MPS 100 may exchange various feedback, information, instructions, and/or related data with the remote computing devices associated with the selected VAS. Such exchanges may be related to or independent of transmitted messages containing voice inputs. In some embodiments, the remote computing device(s) and the media playback system 100** may exchange data via communication paths as described herein and/or using a metadata exchange channel as described in U.S. application Ser. No. 15/438,749 filed Feb. 21, 2017, and titled "Voice Control of a Media Playback System," which is herein incorporated by reference in its entirety.

Upon receiving the stream of sound data, the VAS 190 determines if there is voice input in the streamed data from the NMD, and if so the VAS 190 will also determine an underlying intent in the voice input. The VAS 190 may next transmit a response back to the MPS 100, which can include transmitting the response directly to the NMD that caused the wake-word event. The response is typically based on the intent that the VAS 190 determined was present in the voice input. As an example, in response to the VAS 190 receiving a voice input with an utterance to "Play Hey Jude by The Beatles," the VAS 190 may determine that the underlying intent of the voice input is to initiate playback and further determine that intent of the voice input is to play the particular song "Hey Jude." After these determinations, the VAS 190 may transmit a command to a particular MCS 192 to retrieve content (i.e., the song "Hey Jude"), and that MCS 192, in turn, provides (e.g., streams) this content directly to the MPS 100 or indirectly via the VAS 190. In some implementations, the VAS 190 may transmit to the MPS 100 a command that causes the MPS 100 itself to retrieve the content from the MCS 192.

In certain implementations, NMDs may facilitate arbitration amongst one another when voice input is identified in speech detected by two or more NMDs located within proximity of one another. For example, the NMD-equipped playback device **102*d* in the environment 101 (FIG. 1A) is in relatively close proximity to the NMD-equipped Living Room playback device 102*m*, and both devices 102*d* and 102*m*** may at least sometimes detect the same sound. In such cases, this may require arbitration as to which device is ultimately responsible for providing detected-sound data to the remote VAS. Examples of arbitrating between NMDs may be found, for example, in previously referenced U.S. application Ser. No. 15/438,749.

In certain implementations, an NMD may be assigned to, or otherwise associated with, a designated or default playback device that may not include an NMD. For example, the Island NMD **103*f* in the Kitchen 101*h* (FIG. 1A) may be assigned to the Dining Room playback device 1021, which is in relatively close proximity to the Island NMD 103*f***. In practice, an NMD may direct an assigned playback device to play audio in response to a remote VAS receiving a voice input from the NMD to play the audio, which the NMD might have sent to the VAS in response to a user speaking a command to play a certain song, album, playlist, etc. Additional details regarding assigning NMDs and playback devices as designated or default devices may be found, for example, in previously referenced U.S. patent application Ser. No. 15/438,749.

Further aspects relating to the different components of the example MPS 100 and how the different components may interact to provide a user with a media experience may be found in the following sections. While discussions herein may generally refer to the example MPS 100, technologies described herein are not limited to applications within, among other things, the home environment described above. For instance, the technologies described herein may be useful in other home environment configurations comprising more or fewer of any of the playback, network microphone, and/or controller devices 102-104. For example, the technologies herein may be utilized within an environment having a single playback device 102 and/or a single NMD 103. In some examples of such cases, the LAN 111 (FIG. 1B) may be eliminated and the single playback device 102 and/or the single NMD 103 may communicate directly with the remote computing devices **106*a*— d. In some embodiments, a telecommunication network (e.g., an LTE network, a 5G network, etc.) may communicate with the various playback, network microphone, and/or controller devices 102-104** independent of a LAN.

a. Example Playback & Network Microphone Devices

Figure 2A:
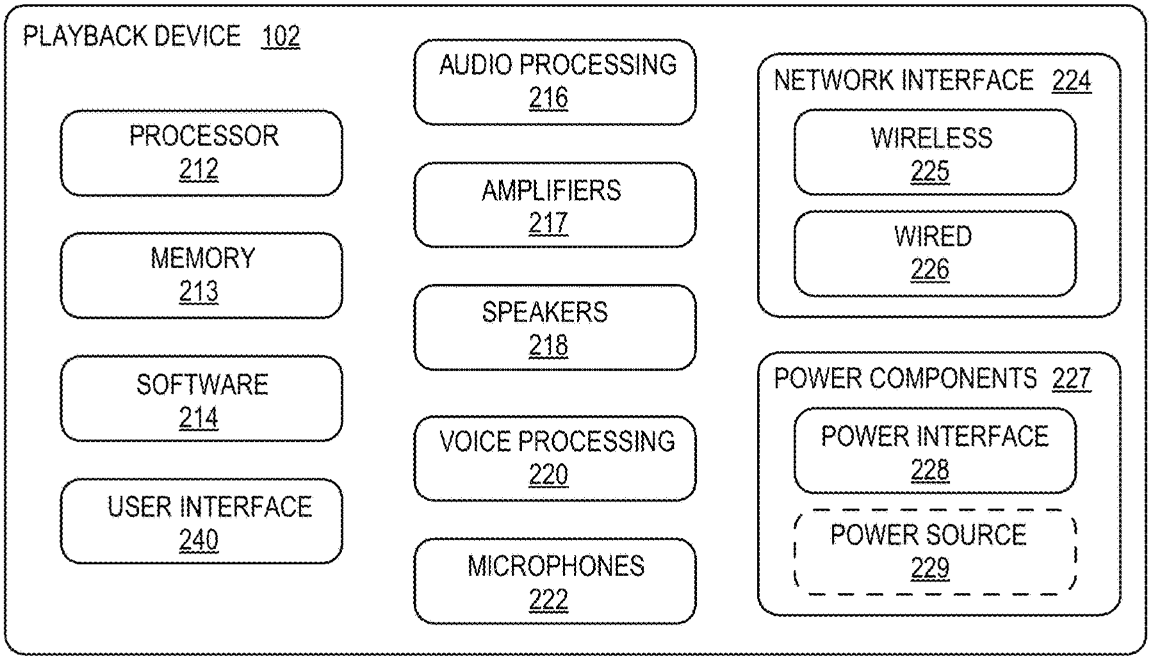
FIG. 2A is a functional block diagram of an example playback device.

FIG. 2A is a functional block diagram illustrating certain aspects of one of the playback devices 102 of the MPS 100 of FIGS. 1A and 1B. As shown, the playback device 102 includes various components, each of which is discussed in further detail below, and the various components of the playback device 102 may be operably coupled to one another via a system bus, communication network, or some other connection mechanism. In the illustrated example of FIG. 2A, the playback device 102 may be referred to as an “NMD-equipped” playback device because it includes components that support the functionality of an NMD, such as one of the NMDs 103 shown in FIG. 1A.

As shown, the playback device 102 includes at least one processor 212, which may be a clock-driven computing component configured to process input data according to instructions stored in memory 213. The memory 213 may be a tangible, non-transitory, computer-readable medium configured to store instructions that are executable by the processor 212. For example, the memory 213 may be data storage that can be loaded with software code 214 that is executable by the processor 212 to achieve certain functions.

In one example, these functions may involve the playback device 102 retrieving audio data from an audio source, which may be another playback device. In another example, the functions may involve the playback device 102 sending audio data, detected-sound data (e.g., corresponding to a voice input), and/or other information to another device on a network via at least one network interface 224. In yet another example, the functions may involve the playback device 102 causing one or more other playback devices to synchronously playback audio with the playback device 102. In yet a further example, the functions may involve the playback device 102 facilitating being paired or otherwise bonded with one or more other playback devices to create a multi-channel audio environment. Numerous other example functions are possible, some of which are discussed below.

As just mentioned, certain functions may involve the playback device 102 synchronizing playback of audio content with one or more other playback devices. During synchronous playback, a listener may not perceive time-delay differences between playback of the audio content by the synchronized playback devices. U.S. Pat. No. 8,234,395 filed on Apr. 4, 2004, and titled “System and method for synchronizing operations among a plurality of independently clocked digital data processing devices,” which is hereby incorporated by reference in its entirety, provides in more detail some examples for audio playback synchronization among playback devices.

To facilitate audio playback, the playback device 102 includes audio processing components 216 that are generally configured to process audio prior to the playback device 102 rendering the audio. In this respect, the audio processing components 216 may include one or more digital-to-analog converters (“DAC”), one or more audio preprocessing components, one or more audio enhancement components, one or more digital signal processors (“DSPs”), and so on. In some implementations, one or more of the audio processing components 216 may be a subcomponent of the processor 212. In operation, the audio processing components 216 receive analog and/or digital audio and process and/or otherwise intentionally alter the audio to produce audio signals for playback.

The produced audio signals may then be provided to one or more audio amplifiers 217 for amplification and playback through one or more speakers 218 operably coupled to the amplifiers 217. The audio amplifiers 217 may include components configured to amplify audio signals to a level for driving one or more of the speakers 218.

Each of the speakers 218 may include an individual transducer (e.g., a “driver”) or the speakers 218 may include a complete speaker system involving an enclosure with one or more drivers. A particular driver of a speaker 218 may include, for example, a subwoofer (e.g., for low frequencies), a mid-range driver (e.g., for middle frequencies), and/or a tweeter (e.g., for high frequencies). In some cases, a transducer may be driven by an individual corresponding audio amplifier of the audio amplifiers 217. In some implementations, a playback device may not include the speakers 218, but instead may include a speaker interface for connecting the playback device to external speakers. In certain embodiments, a playback device may include neither the speakers 218 nor the audio amplifiers 217, but instead may include an audio interface (not shown) for connecting the playback device to an external audio amplifier or audio-visual receiver.

In addition to producing audio signals for playback by the playback device 102, the audio processing components 216 may be configured to process audio to be sent to one or more other playback devices, via the network interface 224, for playback. In example scenarios, audio content to be processed and/or played back by the playback device 102 may be received from an external source, such as via an audio line-in interface (e.g., an auto-detecting 3.5 mm audio line-in connection) of the playback device 102 (not shown) or via the network interface 224, as described below.

As shown, the at least one network interface 224, may take the form of one or more wireless interfaces 225 and/or one or more wired interfaces 226. A wireless interface may provide network interface functions for the playback device 102 to wirelessly communicate with other devices (e.g., other playback device(s), NMD(s), and/or controller device (s)) in accordance with a communication protocol (e.g., any wireless standard including IEEE 802.11a, 802.11b, 802.11g, 802.11n, 802.11ac, 802.15, 4G mobile communication standard, and so on). A wired interface may provide network interface functions for the playback device 102 to communicate over a wired connection with other devices in accordance with a communication protocol (e.g., IEEE 802.3). While the network interface 224 shown in FIG. 2A include both wired and wireless interfaces, the playback device 102 may in some implementations include only wireless interface(s) or only wired interface(s).

In general, the network interface 224 facilitates data flow between the playback device 102 and one or more other devices on a data network. For instance, the playback device 102 may be configured to receive audio content over the data network from one or more other playback devices, network devices within a LAN, and/or audio content sources over a WAN, such as the Internet. In one example, the audio content and other signals transmitted and received by the playback device 102 may be transmitted in the form of digital packet data comprising an Internet Protocol (IP)-based source address and IP-based destination addresses. In such a case, the network interface 224 may be configured to parse the digital packet data such that the data destined for the playback device 102 is properly received and processed by the playback device 102.

As shown in FIG. 2A, the playback device 102 also includes voice processing components 220 that are operably coupled to one or more microphones 222. The microphones 222 are configured to detect sound (i.e., acoustic waves) in the environment of the playback device 102, which is then provided to the voice processing components 220. More specifically, each microphone 222 is configured to detect sound and convert the sound into a digital or analog signal representative of the detected sound, which can then cause the voice processing component 220 to perform various functions based on the detected sound, as described in greater detail below. In one implementation, the microphones 222 are arranged as an array of microphones (e.g., an array of six microphones). In some implementations, the playback device 102 includes more than six microphones (e.g., eight microphones or twelve microphones) or fewer than six microphones (e.g., four microphones, two microphones, or a single microphones).

In operation, the voice-processing components 220 are generally configured to detect and process sound received via the microphones 222, identify potential voice input in the detected sound, and extract detected-sound data to enable a VAS, such as the VAS 190 (FIG. 1B), to process voice input identified in the detected-sound data. The voice processing components 220 may include one or more analog-to-digital converters, an acoustic echo canceller ("AEC"), a spatial processor (e.g., one or more multi-channel Wiener filters, one or more other filters, and/or one or more beam former components), one or more buffers (e.g., one or more circular buffers), one or more wake-word engines, one or more voice extractors, and/or one or more speech processing components (e.g., components configured to recognize a voice of a particular user or a particular set of users associated with a household), among other example voice processing components. In example implementations, the voice processing components 220 may include or otherwise take the form of one or more DSPs or one or more modules of a DSP. In this respect, certain voice processing components 220 may be configured with particular parameters (e.g., gain and/or spectral parameters) that may be modified or otherwise tuned to achieve particular functions. In some implementations, one or more of the voice processing components 220 may be a subcomponent of the processor 212.

In some implementations, the voice-processing components 220 may detect and store a user's voice profile, which may be associated with a user account of the MPS 100. For example, voice profiles may be stored as and/or compared to variables stored in a set of command information or data table. The voice profile may include aspects of the tone or frequency of a user's voice and/or other unique aspects of the user's voice, such as those described in previously referenced U.S. patent application Ser. No. 15/438,749.

As further shown in FIG. 2A, the playback device 102 also includes power components 227. The power components 227 include at least an external power source interface 228, which may be coupled to a power source (not shown) via a power cable or the like that physically connects the playback device 102 to an electrical outlet or some other external power source. Other power components may include, for example, transformers, converters, and like components configured to format electrical power.

In some implementations, the power components 227 of the playback device 102 may additionally include an internal power source 229 (e.g., one or more batteries) configured to power the playback device 102 without a physical connection to an external power source. When equipped with the internal power source 229, the playback device 102 may operate independent of an external power source. In some such implementations, the external power source interface 228 may be configured to facilitate charging the internal power source 229. As discussed before, a playback device comprising an internal power source may be referred to herein as a "portable playback device." On the other hand, a playback device that operates using an external power source may be referred to herein as a "stationary playback device," although such a device may in fact be moved around a home or other environment.

The playback device 102 further includes a user interface 240 that may facilitate user interactions independent of or in conjunction with user interactions facilitated by one or more of the controller devices 104. In various embodiments, the user interface 240 includes one or more physical buttons and/or supports graphical interfaces provided on touch sensitive screen(s) and/or surface(s), among other possibilities, for a user to directly provide input. The user interface 240 may further include one or more of lights (e.g., LEDs) and the speakers to provide visual and/or audio feedback to a user.

Figure 2B:
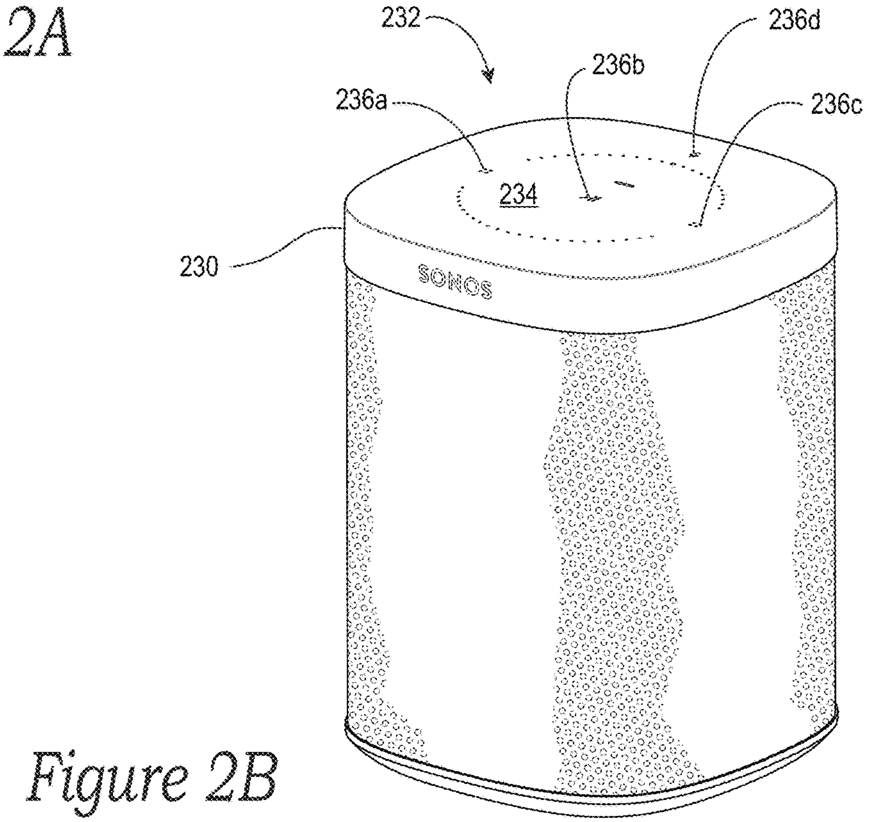
FIG. 2B is an isometric diagram of an example housing of the playback device of FIG. 2A.

As an illustrative example, FIG. 2B shows an example housing 230 of the playback device 102 that includes a user interface in the form of a control area 232 at a top portion 234 of the housing 230. The control area 232 includes buttons 236*a-c* for controlling audio playback, volume level, and other functions. The control area 232 also includes a button 236*d* for toggling the microphones 222 to either an on state or an off state.

As further shown in FIG. 2B, the control area 232 is at least partially surrounded by apertures formed in the top portion 234 of the housing 230 through which the microphones 222 (not visible in FIG. 2B) receive the sound in the environment of the playback device 102. The microphones 222 may be arranged in various positions along and/or within the top portion 234 or other areas of the housing 230 so as to detect sound from one or more directions relative to the playback device 102.

By way of illustration, SONOS, Inc. presently offers (or has offered) for sale certain playback devices that may implement certain of the embodiments disclosed herein, including a "PLAY:1," "PLAY:3," "PLAY:5," "PLAYBAR," "CONNECT:AMP," "PLAYBASE," "BEAM," "CONNECT," and "SUB." Any other past, present, and/or future playback devices may additionally or alternatively be used to implement the playback devices of example embodiments disclosed herein. Additionally, it should be understood that a playback device is not limited to the examples illustrated in FIG. 2A or 2B or to the SONOS product offerings. For example, a playback device may include, or otherwise take the form of, a wired or wireless headphone set, which may operate as a part of the media playback system 100 via a network interface or the like. In another example, a playback device may include or interact with a docking station for personal mobile media playback devices. In yet another example, a playback device may be integral to another device or component such as a television, a lighting fixture, or some other device for indoor or outdoor use.

b. Example Playback Device Configurations

FIGS. 3A-3E show example configurations of playback devices. Referring first to FIG. 3A, in some example instances, a single playback device may belong to a zone. For example, the playback device 102*c* (FIG. 1A) on the Patio may belong to Zone A. In some implementations described below, multiple playback devices may be "bonded" to form a "bonded pair," which together form a single zone. For example, the playback device 102*f* (FIG. 1A) named "Bed 1" in FIG. 3A may be bonded to the playback device 102*g* (FIG. 1A) named "Bed 2" in FIG. 3A to form Zone B. Bonded playback devices may have different playback responsibilities (e.g., channel responsibilities). In another implementation described below, multiple playback devices may be merged to form a single zone. For example, the playback device 102*d* named "Bookcase" may be merged with the playback device 102*m* named "Living Room" to form a single Zone C. The merged playback devices 102*d* and 102*m* may not be specifically assigned different playback responsibilities. That is, the merged playback devices 102*d* and 102*m* may, aside from playing audio content in synchrony, each play audio content as they would if they were not merged.

For purposes of control, each zone in the MPS 100 may be represented as a single user interface ("UI") entity. For example, as displayed by the controller devices 104, Zone A may be provided as a single entity named "Portable," Zone B may be provided as a single entity named "Stereo," and Zone C may be provided as a single entity named "Living Room."

In various embodiments, a zone may take on the name of one of the playback devices belonging to the zone. For example, Zone C may take on the name of the Living Room device 102*m* (as shown). In another example, Zone C may instead take on the name of the Bookcase device 102*d*. In a further example, Zone C may take on a name that is some combination of the Bookcase device 102*d* and Living Room device 102*m*. The name that is chosen may be selected by a user via inputs at a controller device 104. In some embodiments, a zone may be given a name that is different than the device(s) belonging to the zone. For example, Zone B in FIG. 3A is named "Stereo" but none of the devices in Zone B have this name. In one aspect, Zone B is a single UI entity representing a single device named "Stereo," composed of constituent devices "Bed 1" and "Bed 2." In one implementation, the Bed 1 device may be playback device 102*f* in the master bedroom 101*h* (FIG. 1A) and the Bed 2 device may be the playback device 102*g* also in the master bedroom 101*h* (FIG. 1A).

As noted above, playback devices that are bonded may have different playback responsibilities, such as playback responsibilities for certain audio channels. For example, as shown in FIG. 3B, the Bed 1 and Bed 2 devices 102*f* and 102*g* may be bonded so as to produce or enhance a stereo effect of audio content. In this example, the Bed 1 playback device 102*f* may be configured to play a left channel audio component, while the Bed 2 playback device 102*g* may be configured to play a right channel audio component. In some implementations, such stereo bonding may be referred to as "pairing."

Additionally, playback devices that are configured to be bonded may have additional and/or different respective speaker drivers. As shown in FIG. 3C, the playback device 102*b* named "Front" may be bonded with the playback device 102*k* named "SUB." The Front device 102*b* may render a range of mid to high frequencies, and the SUB device 102*k* may render low frequencies as, for example, a subwoofer. When unbonded, the Front device 102*b* may be configured to render a full range of frequencies. As another example, FIG. 3D shows the Front and SUB devices 102*b* and 102*k* further bonded with Right and Left playback devices 102*a* and 102*j*, respectively. In some implementations, the Right and Left devices 102*a* and 102*j* may form surround or "satellite" channels of a home theater system. The bonded playback devices 102*a*, 102*b*, 102*j*, and 102*k* may form a single Zone D (FIG. 3A).

In some implementations, playback devices may also be "merged." In contrast to certain bonded playback devices, playback devices that are merged may not have assigned playback responsibilities but may each render the full range of audio content that each respective playback device is capable of. Nevertheless, merged devices may be represented as a single UI entity (i.e., a zone, as discussed above). For instance, FIG. 3E shows the playback devices 102*d* and 102*m* in the Living Room merged, which would result in these devices being represented by the single UI entity of Zone C. In one embodiment, the playback devices 102*d* and 102*m* may playback audio in synchrony, during which each outputs the full range of audio content that each respective playback device 102*d* and 102*m* is capable of rendering.

In some embodiments, a stand-alone NMD may be in a zone by itself. For example, the NMD 103*h* from FIG. 1A is named "Closet" and forms Zone I in FIG. 3A. An NMD may also be bonded or merged with another device so as to form a zone. For example, the NMD device 103*f* named "Island" may be bonded with the playback device 102*i* Kitchen, which together form Zone F, which is also named "Kitchen." Additional details regarding assigning NMDs and playback devices as designated or default devices may be found, for example, in previously referenced U.S. patent application Ser. No. 15/438,749. In some embodiments, a stand-alone NMD may not be assigned to a zone.

Zones of individual, bonded, and/or merged devices may be arranged to form a set of playback devices that playback audio in synchrony. Such a set of playback devices may be referred to as a "group," "zone group," "synchrony group," or "playback group." In response to inputs provided via a controller device 104, playback devices may be dynamically grouped and ungrouped to form new or different groups that synchronously play back audio content. For example, referring to FIG. 3A, Zone A may be grouped with Zone B to form a zone group that includes the playback devices of the two zones. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Grouped and bonded devices are example types of associations between portable and stationary playback devices that may be caused in response to a trigger event, as discussed above and described in greater detail below.

In various implementations, the zones in an environment may be assigned a particular name, which may be the default name of a zone within a zone group or a combination of the names of the zones within a zone group, such as "Dining Room+Kitchen," as shown in FIG. 3A. In some embodiments, a zone group may be given a unique name selected by a user, such as "Nick's Room," as also shown in FIG. 3A. The name "Nick's Room" may be a name chosen by a user over a prior name for the zone group, such as the room name "Master Bedroom."

Referring back to FIG. 2A, certain data may be stored in the memory 213 as one or more state variables that are periodically updated and used to describe the state of a playback zone, the playback device(s), and/or a zone group associated therewith. The memory 213 may also include the data associated with the state of the other devices of the media playback system 100, which may be shared from time to time among the devices so that one or more of the devices have the most recent data associated with the system.

In some embodiments, the memory 213 of the playback device 102 may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, in FIG. 1A, identifiers associated with the Patio may indicate that the Patio is the only playback device of a particular zone and not in a zone group. Identifiers associated with the Living Room may indicate that the Living Room is not grouped with other zones but includes bonded playback devices 102*a*, 102*b*, 102*j*, and 102*k*. Identifiers associated with the Dining Room may indicate that the Dining Room is part of Dining Room+Kitchen group and that devices 103*f* and 102*i* are bonded. Identifiers associated with the Kitchen may indicate the same or similar information by virtue of the Kitchen being part of the Dining Room+Kitchen zone group. Other example zone variables and identifiers are described below.

In yet another example, the MPS 100 may include variables or identifiers representing other associations of zones and zone groups, such as identifiers associated with Areas, as shown in FIG. 3A. An Area may involve a cluster of zone groups and/or zones not within a zone group. For instance, FIG. 3A shows a first area named "First Area" and a second area named "Second Area." The First Area includes zones and zone groups of the Patio, Den, Dining Room, Kitchen, and Bathroom. The Second Area includes zones and zone groups of the Bathroom, Nick's Room, Bedroom, and Living Room. In one aspect, an Area may be used to invoke a cluster of zone groups and/or zones that share one or more zones and/or zone groups of another cluster. In this respect, such an Area differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the MPS 100 may not implement Areas, in which case the system may not store variables associated with Areas.

The memory 213 may be further configured to store other data. Such data may pertain to audio sources accessible by the playback device 102 or a playback queue that the playback device (or some other playback device(s)) may be associated with. In embodiments described below, the memory 213 is configured to store a set of command data for selecting a particular VAS when processing voice inputs.

During operation, one or more playback zones in the environment of FIG. 1A may each be playing different audio content. For instance, the user may be grilling in the Patio zone and listening to hip hop music being played by the playback device 102*c*, while another user may be preparing food in the Kitchen zone and listening to classical music being played by the playback device 102*i*. In another example, a playback zone may play the same audio content in synchrony with another playback zone. For instance, the user may be in the Office zone where the playback device 102*n* is playing the same hip-hop music that is being playing by playback device 102*c* in the Patio zone. In such a case, playback devices 102*c* and 102*n* may be playing the hip-hop in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the MPS 100 may be dynamically modified. As such, the MPS 100 may support numerous configurations. For example, if a user physically moves one or more playback devices to or from a zone, the MPS 100 may be reconfigured to accommodate the change(s). For instance, if the user physically moves the playback device 102*c* from the Patio zone to the Office zone, the Office zone may now include both the playback devices 102*c* and 102*n*. In some cases, the user may pair or group the moved playback device 102*c* with the Office zone and/or rename the players in the Office zone using, for example, one of the controller devices 104 and/or voice input. As another example, if one or more playback devices 102 are moved to a particular space in the home environment that is not already a playback zone, the moved playback device(s) may be renamed or associated with a playback zone for the particular space.

Further, different playback zones of the MPS 100 may be dynamically combined into zone groups or split up into individual playback zones. For example, the Dining Room zone and the Kitchen zone may be combined into a zone group for a dinner party such that playback devices 102*i* and 1021 may render audio content in synchrony. As another example, bonded playback devices in the Den zone may be split into (i) a television zone and (ii) a separate listening zone. The television zone may include the Front playback device 102*b*. The listening zone may include the Right, Left, and SUB playback devices 102*a*, 102*j*, and 102*k*, which may be grouped, paired, or merged, as described above. Splitting the Den zone in such a manner may allow one user to listen to music in the listening zone in one area of the living room space, and another user to watch the television in another area of the living room space. In a related example, a user may utilize either of the NMD 103*a* or 103*b* (FIG. 1B) to control the Den zone before it is separated into the television zone and the listening zone. Once separated, the listening zone may be controlled, for example, by a user in the vicinity of the NMD 103*a*, and the television zone may be controlled, for example, by a user in the vicinity of the NMD 103*b*. As described above, however, any of the NMDs 103 may be configured to control the various playback and other devices of the MPS 100.

c. Example Controller Devices

FIG. 4A is a functional block diagram illustrating certain aspects of a selected one of the controller devices 104 of the MPS 100 of FIG. 1A. Such controller devices may also be referred to herein as a "control device" or "controller." The controller device shown in FIG. 4A may include components that are generally similar to certain components of the network devices described above, such as a processor 412, memory 413 storing program software 414, at least one network interface 424, and one or more microphones 422. In one example, a controller device may be a dedicated controller for the MPS 100. In another example, a controller device may be a network device on which media playback system controller application software may be installed, such as for example, an iPhone™, iPad™ or any other smart phone, tablet, or network device (e.g., a networked computer such as a PC or Mac™).

The memory 413 of the controller device 104 may be configured to store controller application software and other data associated with the MPS 100 and/or a user of the system 100. The memory 413 may be loaded with instructions in software 414 that are executable by the processor 412 to achieve certain functions, such as facilitating user access, control, and/or configuration of the MPS 100. The controller device 104 is configured to communicate with other network devices via the network interface 424, which may take the form of a wireless interface, as described above.

In one example, system information (e.g., such as a state variable) may be communicated between the controller device 104 and other devices via the network interface 424. For instance, the controller device 104 may receive playback zone and zone group configurations in the MPS 100 from a playback device, an NMD, or another network device. Likewise, the controller device 104 may transmit such system information to a playback device or another network device via the network interface 424. In some cases, the other network device may be another controller device.

The controller device 104 may also communicate playback device control commands, such as volume control and audio playback control, to a playback device via the network interface 424. As suggested above, changes to configurations of the MPS 100 may also be performed by a user using the controller device 104. The configuration changes may include adding/removing one or more playback devices to/from a zone, adding/removing one or more zones to/from a zone group, forming a bonded or merged player, separating one or more playback devices from a bonded or merged player, among others.

As shown in FIG. 4A, the controller device 104 also includes a user interface 440 that is generally configured to facilitate user access and control of the MPS 100. The user interface 440 may include a touch-screen display or other physical interface configured to provide various graphical controller interfaces, such as the controller interfaces 440*a* and 440*b* shown in FIGS. 4B and 4C. Referring to FIGS. 4B and 4C together, the controller interfaces 440*a* and 440*b* includes a playback control region 442, a playback zone region 443, a playback status region 444, a playback queue region 446, and a sources region 448. The user interface as shown is just one example of an interface that may be provided on a network device, such as the controller device shown in FIG. 4A, and accessed by users to control a media playback system, such as the MPS 100. Other user interfaces of varying formats, styles, and interactive sequences may alternatively be implemented on one or more network devices to provide comparable control access to a media playback system.

The playback control region 442 (FIG. 4B) may include selectable icons (e.g., by way of touch or by using a cursor) that, when selected, cause playback devices in a selected playback zone or zone group to play or pause, fast forward, rewind, skip to next, skip to previous, enter/exit shuffle mode, enter/exit repeat mode, enter/exit cross fade mode, etc. The playback control region 442 may also include selectable icons that, when selected, modify equalization settings and/or playback volume, among other possibilities.

The playback zone region 443 (FIG. 4C) may include representations of playback zones within the MPS 100. The playback zones regions 443 may also include a representation of zone groups, such as the Dining Room+Kitchen zone group, as shown. In some embodiments, the graphical representations of playback zones may be selectable to bring up additional selectable icons to manage or configure the playback zones in the MPS 100, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the MPS 100 to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface are also possible. The representations of playback zones in the playback zone region 443 (FIG. 4C) may be dynamically updated as playback zone or zone group configurations are modified.

The playback status region 444 (FIG. 4B) may include graphical representations of audio content that is presently being played, previously played, or scheduled to play next in the selected playback zone or zone group. The selected playback zone or zone group may be visually distinguished on a controller interface, such as within the playback zone region 443 and/or the playback status region 444. The graphical representations may include track title, artist name, album name, album year, track length, and/or other relevant information that may be useful for the user to know when controlling the MPS 100 via a controller interface.

The playback queue region 446 may include graphical representations of audio content in a playback queue associated with the selected playback zone or zone group. In some embodiments, each playback zone or zone group may be associated with a playback queue comprising information corresponding to zero or more audio items for playback by the playback zone or zone group. For instance, each audio item in the playback queue may comprise a uniform resource identifier (URI), a uniform resource locator (URL), or some other identifier that may be used by a playback device in the playback zone or zone group to find and/or retrieve the audio item from a local audio content source or a networked audio content source, which may then be played back by the playback device.

In one example, a playlist may be added to a playback queue, in which ca se information corresponding to each audio item in the playlist may be added to the playback queue. In another example, audio items in a playback queue may be saved as a playlist. In a further example, a playback queue may be empty, or populated but "not in use" when the playback zone or zone group is playing continuously streamed audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue or may be associated with a new playback queue that is empty or contains audio items from the playback queue associated with the established zone group before the established zone group was ungrouped. Similarly, the resulting second playback zone may be re-associated with the previous second playback queue or may be associated with a new playback queue that is empty or contains audio items from the playback queue associated with the established zone group before the established zone group was ungrouped. Other examples are also possible.

With reference still to FIGS. 4B and 4C, the graphical representations of audio content in the playback queue region 446 (FIG. 4B) may include track titles, artist names, track lengths, and/or other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device. Playback of such a playback queue may involve one or more playback devices playing back media items of the queue, perhaps in sequential or random order.

The sources region 448 may include graphical representations of selectable audio content sources and/or selectable voice assistants associated with a corresponding VAS. The VASes may be selectively assigned. In some examples, multiple VASes, such as AMAZON's Alexa, MICROSOFT's Cortana, etc., may be invokable by the same NMD. In some embodiments, a user may assign a VAS exclusively to one or more NMDs. For example, a user may assign a first VAS to one or both of the NMDs 102*a* and 102*b* in the Living Room shown in FIG. 1A, and a second VAS to the NMD 103*f* in the Kitchen. Other examples are possible.

d. Example Audio Content Sources

The audio sources in the sources region 448 may be audio content sources from which audio content may be retrieved and played by the selected playback zone or zone group. One or more playback devices in a zone or zone group may be configured to retrieve for playback audio content (e.g., according to a corresponding URI or URL for the audio content) from a variety of available audio content sources. In one example, audio content may be retrieved by a playback device directly from a corresponding audio content source (e.g., via a line-in connection). In another example, audio content may be provided to a playback device over a network via one or more other playback devices or network devices. As described in greater detail below, in some embodiments audio content may be provided by one or more media content services.

Example audio content sources may include a memory of one or more playback devices in a media playback system such as the MPS 100 of FIG. 1, local music libraries on one or more network devices (e.g., a controller device, a network-enabled personal computer, or a networked-attached storage ("NAS")), streaming audio services providing audio content via the Internet (e.g., cloud-based music services), or audio sources connected to the media playback system via a line-in input connection on a playback device or network device, among other possibilities.

In some embodiments, audio content sources may be added or removed from a media playback system such as the MPS 100 of FIG. 1A. In one example, an indexing of audio items may be performed whenever one or more audio content sources are added, removed, or updated. Indexing of audio items may involve scanning for identifiable audio items in all folders/directories shared over a network accessible by playback devices in the media playback system and generating or updating an audio content database comprising metadata (e.g., title, artist, album, track length, among others) and other associated information, such as a URI or URL for each identifiable audio item found. Other examples for managing and maintaining audio content sources may also be possible.

e. Example Network Microphone Devices

Figure 5:
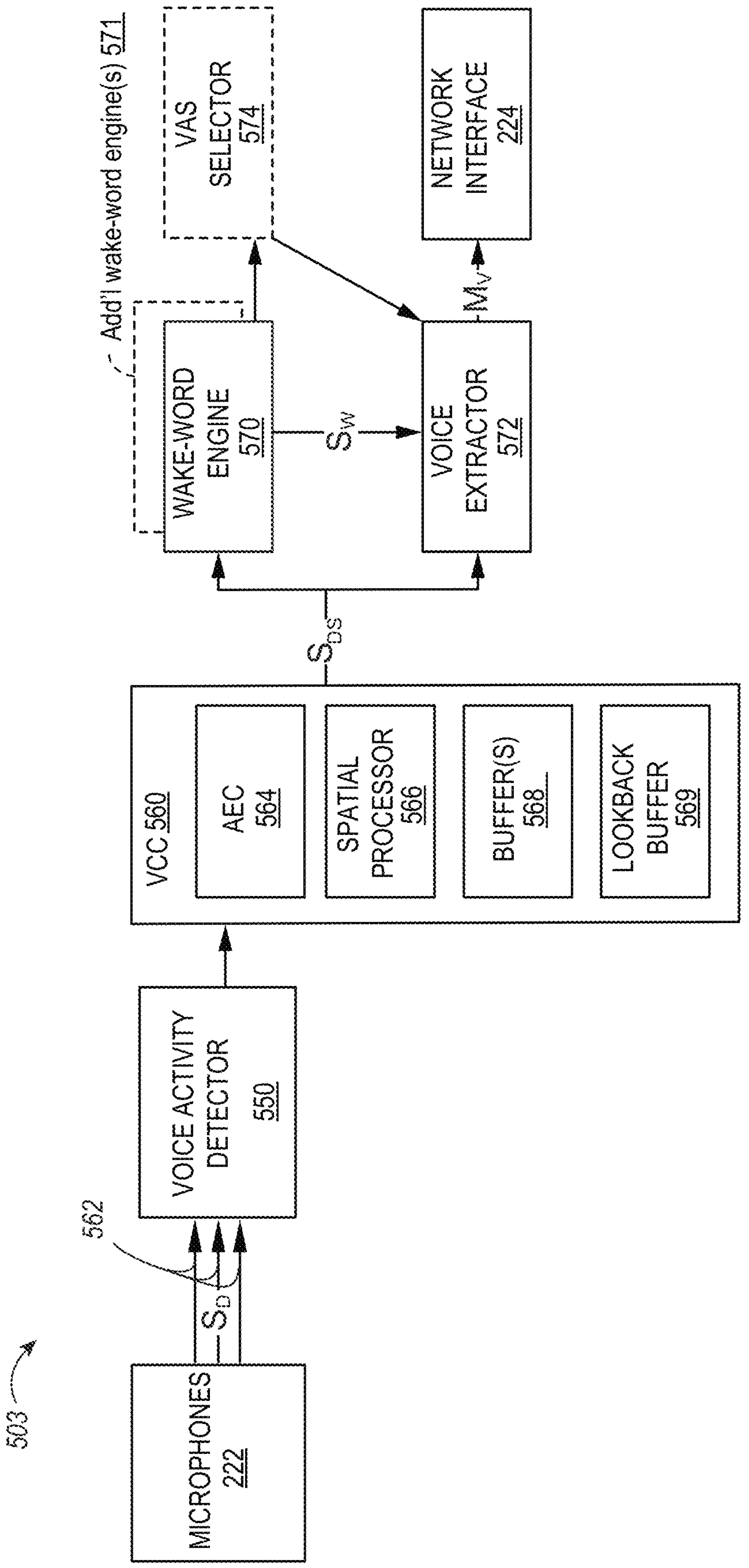
FIG. 5 is a functional block diagram of certain components of an example network microphone device in accordance with aspects of the disclosure.

FIG. 5 is a functional block diagram showing an NMD 503 configured in accordance with embodiments of the disclosure. The NMD 503 includes a voice activity detector 550, voice capture components ("VCC", or collectively "voice processor 560"), a wake-word engine 570, and at least one voice extractor 572, each of which is operably coupled to the voice processor 560. The NMD 503 further includes the microphones 222 and the at least one network interface 224 described above and may also include other components, such as audio amplifiers, interface, etc., which are not shown in FIG. 5 for purposes of clarity.

The microphones 222 of the NMD 503 are configured to provide detected sound, S D, from the environment of the NMD 503 to the voice activity detector 550. The detected sound $S_D$ may take the form of one or more analog or digital signals. In example implementations, the detected sound S D may be composed of a plurality signals associated with respective channels 562 that are fed to the voice processor 560.

Each channel 562 may correspond to a particular microphone 222. For example, an NMD having six microphones may have six corresponding channels. Each channel of the detected sound $S_D$ may bear certain similarities to the other channels but may differ in certain regards, which may be due to the position of the given channel's corresponding microphone relative to the microphones of other channels. For example, one or more of the channels of the detected sound $S_D$ may have a greater signal to noise ratio ("SNR") of speech to background noise than other channels.

In operation, the voice activity detector 550 can process the detected sound $S_D$ to determine whether speech is present. If voice activity is detected, the detected sound $S_D$ can be passed to the VCC 560 for additional downstream processing. While in some embodiments the detected sound S D is passed to the VCC 560 without any processing via the voice activity detector 550, in various embodiments the voice activity detector 550 may perform certain processing functions such that the input to the voice activity detector 550 is not identical to the output $S_D$ provided to the VCC 560. For example, the voice activity detector 550 may buffer and/or time-delay the signal, may perform channel selection, or any other suitable pre-processing steps.

If, voice activity is not identified in the detected sound $S_D$ via the voice activity detector 550, then the further processing steps may be forgone. For example, the sound data may not be passed to the VCC 560 and downstream components. Additionally or alternatively, the downstream components can be configured to forgo processing the incoming sound data $S_D$, such as by the use of bypass tags or other techniques. In some examples, the downstream components (e.g., VCC 560, wake-word engine 570, voice extractor 572, network interface 224) can remain in a standby, disabled, or low-power state until voice activity is detected via the voice activity detector 550, at which point some or all of these downstream components can transition to a higher-power or fully operational state. When transitioning from the low-power, standby, or disabled stage to a fully operational stage, any number of components may be turned on, supplied power or additional power, taken out of standby or sleep stage, or otherwise activated in such a way that the enabled component(s) are allowed to draw more power than they could when disabled. With this arrangement, the NMD 503 can assume a relatively low-power stage while monitoring for speech activity via the voice activity detector 550. Unless and until the voice activity detector 550 identifies voice activity, the NMD 503 may remain in the low-power stage. In some embodiments, after transitioning to the higher-power or fully operational stage, the NMD 503 may revert to the low-power or standby stage once voice input is no longer detected via the voice activity detector 550, after a VAS interaction is determined to be concluded, and/or once a given period of time has elapsed.

In various embodiments, the voice activity detector 550 can perform a first algorithm for identifying speech in the sound data $S_D$ detected via the microphone(s) 222. The algorithm can include any suitable algorithm for discriminating between speech and non-speech sound data. In some embodiments, the algorithm can include extracting certain acoustic features from the sound data, such as energy-based features (e.g., signal-to-noise ratio), periodicity (e.g., speech signals tend to be more periodic than background noises), speech signal dynamics (e.g., analyzing the variance of power envelopes), or others. One or more such acoustic features can then be analyzed using statistical models or other discriminators to detect voice activity in the sound data. Example classifiers include Gaussian mixture models, Laplacian models, or other classifiers that discriminate between speech and non-speech sound data. Additional examples include using neural network based approaches. As well as energy, other features including entropy, pitch, or zero-crossing rate can be used as input to the classifier. Many approaches can be implemented directly in the time-domain or alternatively in the frequency-domain by applying a filter bank to the microphone input signals. For example, a short-time Fourier transform (STFT) enables $S_D$ and the associated features to be efficiently split into multiple frequency bands each of which can be processed independently. In some embodiments, detecting speech in the sound data via the voice activity detector 550 consumes less power and/or computational resources (e.g., as measured by average CPU clock rate or millions of instructions per second (MIPS) values) than one or more of the downstream processes such as spatial processing, acoustic echo cancellation, wake-word detection, or any other downstream signal processing steps. For example, the amount of energy required to power a processing unit is directly related to the clock rate or MIPS, thus by reducing the average MIPS it is possible to also reduce average power consumption. In some embodiments, the VAD 550 process can run on a Digital Signal Processor (DSP) co-processing unit or Low Power Island (LPI), enabling the main CPU to sleep or transition to a low-power state at times when voice activity is not detected.

As further shown in FIG. 5, the voice processor 560 includes an AEC 564, a spatial processor 566, and one or more buffers 568. In operation, the AEC 564 receives the detected sound $S_D$ and filters or otherwise processes the sound to suppress echoes and/or to otherwise improve the quality of the detected sound $S_D$. That processed sound may then be passed to the spatial processor 566.

The spatial processor 566 is typically configured to analyze the detected sound $S_D$ and identify certain characteristics, such as a sound's amplitude (e.g., decibel level), frequency spectrum, directionality, etc. In one respect, the spatial processor 566 may help filter or suppress ambient noise in the detected sound $S_D$ from potential user speech based on similarities and differences in the constituent channels 562 of the detected sound $S_D$, as discussed above. As one possibility, the spatial processor 566 may monitor metrics that distinguish speech from other sounds. Such metrics can include, for example, energy within the speech band relative to background noise and entropy within the speech band—a measure of spectral structure—which is typically lower in speech than in most common background noise. In some implementations, the spatial processor 566 may be configured to determine a speech presence probability, examples of such functionality are disclosed in U.S. patent application Ser. No. 15/984,073, filed May 18, 2018, titled "Linear Filtering for Noise-Suppressed Speech Detection," and U.S. patent application Ser. No. 16/147,710, filed Sep. 29, 2018, and titled "Linear Filtering for Noise-Suppressed Speech Detection via Multiple Network Microphone Devices," each of which is incorporated herein by reference in its entirety.

The wake-word engine 570 is configured to monitor and analyze received audio to determine if any wake words are present in the audio. The wake-word engine 570 may analyze the received audio using a wake word detection algorithm. If the wake-word engine 570 detects a wake word, a network microphone device may process voice input contained in the received audio. Example wake-word detection algorithms accept audio as input and provide an indication of whether a wake word is present in the audio. Many first- and third-party wake word detection algorithms are known and commercially available. For instance, operators of a voice service may make their algorithm available for use in third-party devices. Alternatively, an algorithm may be trained to detect certain wake-words.

In some embodiments, the wake-word engine 570 runs multiple wake word detection algorithms on the received audio simultaneously (or substantially simultaneously). As noted above, different voice services (e.g. AMAZON's Alexa®, APPLE's Siri®, MICROSOFT's Cortana®, GOOGLE'S Assistant, etc.) each use a different wake word for invoking their respective voice service. To support multiple services, the wake-word engine 570 may run the received audio through the wake word detection algorithm for each supported voice service in parallel. In such embodiments, the network microphone device 103 may include VAS selector components 574 configured to pass voice input to the appropriate voice assistant service. In other embodiments, the VAS selector components 574 may be omitted. In some embodiments, individual NMDs 103 of the MPS 100 may be configured to run different wake word detection algorithms associated with particular VASes. For example, the NMDs of playback devices 102*a* and 102*b* of the Living Room may be associated with AMAZON's ALEXA®, and be configured to run a corresponding wake word detection algorithm (e.g., configured to detect the wake word "Alexa" or other associated wake word), while the NMD of playback device 102*f* in the Kitchen may be associated with GOOGLE's Assistant, and be configured to run a corresponding wake word detection algorithm (e.g., configured to detect the wake word "OK, Google" or other associated wake word).

In some embodiments, a network microphone device may include speech processing components configured to further facilitate voice processing, such as by performing voice recognition trained to recognize a particular user or a particular set of users associated with a household. Voice recognition software may implement voice-processing algorithms that are tuned to specific voice profile(s).

In operation, the one or more buffers 568—one or more of which may be part of or separate from the memory 213 (FIG. 2A)—capture data corresponding to the detected sound S D. More specifically, the one or more buffers 568 capture detected-sound data that was processed by the upstream voice activity detector 550, AEC 564, and spatial processor 566.

In general, the detected-sound data form a digital representation (i.e., sound-data stream), $S_{DS}$, of the sound detected by the microphones 222. In practice, the sound-data stream $S_{DS}$ may take a variety of forms. As one possibility, the sound-data stream $S_{DS}$ may be composed of frames, each of which may include one or more sound samples. The frames may be streamed (i.e., read out) from the one or more buffers 568 for further processing by downstream components, such as the wake-word engine 570 and the voice extractor 572 of the NMD 503.

In some implementations, at least one buffer 568 captures detected-sound data utilizing a sliding window approach in which a given amount (i.e., a given window) of the most recently captured detected-sound data is retained in the at least one buffer 568 while older detected-sound data are overwritten when they fall outside of the window. For example, at least one buffer 568 may temporarily retain 20 frames of a sound specimen at given time, discard the oldest frame after an expiration time, and then capture a new frame, which is added to the 19 prior frames of the sound specimen.

In practice, when the sound-data stream $S_{DS}$ is composed of frames, the frames may take a variety of forms having a variety of characteristics. As one possibility, the frames may take the form of audio frames that have a certain resolution (e.g., 16 bits of resolution), which may be based on a sampling rate (e.g., 44,100 Hz). Additionally, or alternatively, the frames may include information corresponding to a given sound specimen that the frames define, such as metadata that indicates frequency response, power input level, signal-to-noise ratio, microphone channel identification, and/or other information of the given sound specimen, among other examples. Thus, in some embodiments, a frame may include a portion of sound (e.g., one or more samples of a given sound specimen) and metadata regarding the portion of sound. In other embodiments, a frame may only include a portion of sound (e.g., one or more samples of a given sound specimen) or metadata regarding a portion of sound.

The voice processor 560 also includes at least one lookback buffer 569, which may be part of or separate from the memory 213 (FIG. 2A). In operation, the lookback buffer 569 can store sound metadata that is processed based on the detected-sound data $S_D$ received from the microphones 222. As noted above, the microphones 222 can include a plurality of microphones arranged in an array. The sound metadata can include, for example: (1) frequency response data for individual microphones of the array, (2) an echo return loss enhancement measure (i.e., a measure of the effectiveness of the acoustic echo canceller (AEC) for each microphone), (3) a voice direction measure; (4) arbitration statistics (e.g., signal and noise estimates for the spatial processing streams associated with different microphones); and/or (5) speech spectral data (i.e., frequency response evaluated on processed audio output after acoustic echo cancellation and spatial processing have been performed). Other sound metadata may also be used to identify and/or classify noise in the detected-sound data $S_D$. In at least some embodiments, the sound metadata may be transmitted separately from the sound-data stream $S_{DS}$, as reflected in the arrow extending from the lookback buffer 569 to the network interface 224. For example, the sound metadata may be transmitted from the lookback buffer 569 to one or more remote computing devices separate from the VAS which receives the sound-data stream $S_{DS}$.

In any case, components of the NMD 503 downstream of the voice processor 560 may process the sound-data stream $S_{DS}$. For instance, the wake-word engine 570 can be configured to apply one or more identification algorithms to the sound-data stream $S_{DS}$ (e.g., streamed sound frames) to spot potential wake words in the detected-sound $S_D$. When the wake-word engine 570 spots a potential wake word, the wake-word engine 570 can provide an indication of a "wake-word event" (also referred to as a "wake-word trigger") to the voice extractor 572 in the form of signal $S_W$.

In response to the wake-word event (e.g., in response to a signal $S_W$ from the wake-word engine 570 indicating the wake-word event), the voice extractor 572 is configured to receive and format (e.g., packetize) the sound-data stream $S_{DS}$. For instance, the voice extractor 572 packetizes the frames of the sound-data stream $S_{DS}$ into messages. The voice extractor 572 transmits or streams these messages, $M_V$, that may contain voice input in real time or near real time to a remote VAS, such as the VAS 190 (FIG. 1B), via the network interface 224.

Figure 6A:
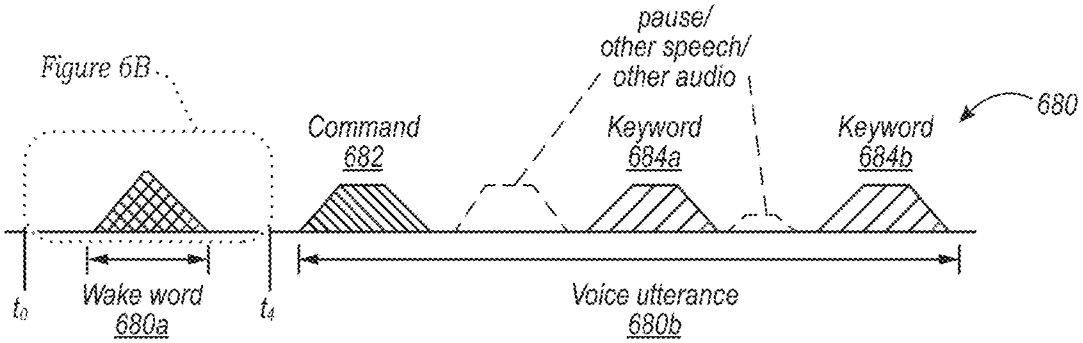
FIG. 6A is a diagram of an example voice input.

The VAS is configured to process the sound-data stream $S_{DS}$ contained in the messages $M_V$ sent from the NMD 503. More specifically, the VAS is configured to identify voice input based on the sound-data stream $S_{DS}$. Referring to FIG. 6A, a voice input 680 may include a wake-word portion 680*a* and an utterance portion 680*b*. The wake-word portion 680*a* corresponds to detected sound that caused the wake-word event. For instance, the wake-word portion 680*a* corresponds to detected sound that caused the wake-word engine 570 to provide an indication of a wake-word event to the voice extractor 572. The utterance portion 680*b* corresponds to detected sound that potentially comprises a user request following the wake-word portion 680*a*.

Figure 6B:
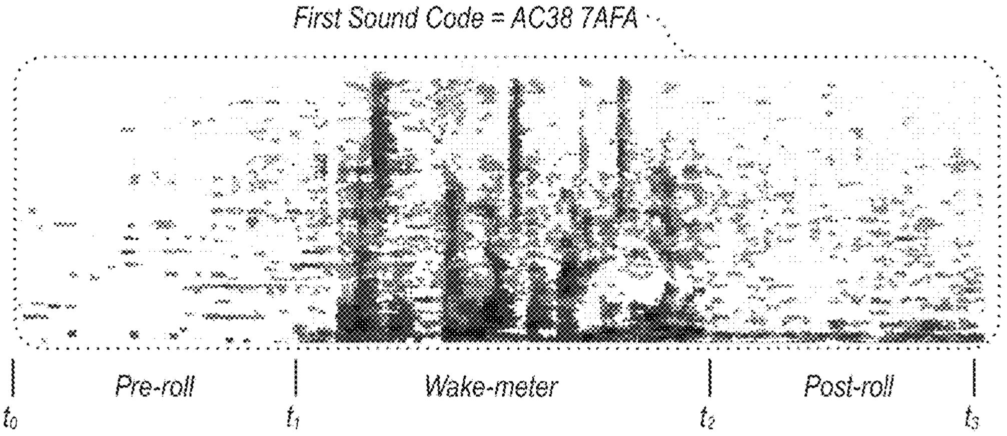
FIG. 6B is a graph depicting an example sound specimen in accordance with aspects of the disclosure.

As an illustrative example, FIG. 6B shows an example first sound specimen. In this example, the sound specimen corresponds to the sound-data stream $S_{DS}$ (e.g., one or more audio frames) associated with the spotted wake word 680*a* of FIG. 6A. As illustrated, the example first sound specimen comprises sound detected in the playback device 102*i*'s environment (i) immediately before a wake word was spoken, which may be referred to as a pre-roll portion (between times $t_0$ and $t_1$), (ii) while the wake word was spoken, which may be referred to as a wake-meter portion (between times $t_1$ and $t_2$), and/or (iii) after the wake word was spoken, which may be referred to as a post-roll portion (between times $t_2$ and $t_3$). Other sound specimens are also possible.

Typically, the VAS may first process the wake-word portion 680*a* within the sound-data stream $S_{DS}$ to verify the presence of the wake word. In some instances, the VAS may determine that the wake-word portion 680*a* comprises a false wake word (e.g., the word "Election" when the word "Alexa" is the target wake word). In such an occurrence, the VAS may send a response to the NMD 503 (FIG. 5) with an indication for the NMD 503 to cease extraction of sound data, which may cause the voice extractor 572 to cease further streaming of the detected-sound data to the VAS. The wake-word engine 570 may resume or continue monitoring sound specimens until another potential wake word, leading to another wake-word event. In some implementations, the VAS may not process or receive the wake-word portion 680*a* but instead processes only the utterance portion 680*b*.

In any case, the VAS processes the utterance portion 680*b* to identify the presence of any words in the detected-sound data and to determine an underlying intent from these words. The words may correspond to a certain command and certain keywords 684 (identified individually in FIG. 6A as a first keyword 684*a* and a second keyword 684*b*). A keyword may be, for example, a word in the voice input 680 identifying a particular device or group in the MPS 100. For instance, in the illustrated example, the keywords 684 may be one or more words identifying one or more zones in which the music is to be played, such as the Living Room and the Dining Room (FIG. 1A).

To determine the intent of the words, the VAS is typically in communication with one or more databases associated with the VAS (not shown) and/or one or more databases (not shown) of the MPS 100. Such databases may store various user data, analytics, catalogs, and other information for natural language processing and/or other processing. In some implementations, such databases may be updated for adaptive learning and feedback for a neural network based on voice-input processing. In some cases, the utterance portion 680*b* may include additional information, such as detected pauses (e.g., periods of non-speech) between words spoken by a user, as shown in FIG. 6A. The pauses may demarcate the locations of separate commands, keywords, or other information spoke by the user within the utterance portion 680*b*.

Based on certain command criteria, the VAS may take actions as a result of identifying one or more commands in the voice input, such as the command 682. Command criteria may be based on the inclusion of certain keywords within the voice input, among other possibilities. Additionally, or alternatively, command criteria for commands may involve identification of one or more control-state and/or zone-state variables in conjunction with identification of one or more particular commands. Control-state variables may include, for example, indicators identifying a level of volume, a queue associated with one or more devices, and playback state, such as whether devices are playing a queue, paused, etc. Zone-state variables may include, for example, indicators identifying which, if any, zone players are grouped.

After processing the voice input, the VAS may send a response to the MPS 100 with an instruction to perform one or more actions based on an intent it determined from the voice input. For example, based on the voice input, the VAS may direct the MPS 100 to initiate playback on one or more of the playback devices 102, control one or more of these devices (e.g., raise/lower volume, group/ungroup devices, etc.), turn on/off certain smart devices, among other actions. After receiving the response from the VAS, the wake-word engine 570 the NMD 503 may resume or continue to monitor the sound-data stream $S_{DS}$ until it spots another potential wake-word, as discussed above.

Referring back to FIG. 5, in multi-VAS implementations, the NMD 503 may include a VAS selector 574 (shown in dashed lines) that is generally configured to direct the voice extractor's extraction and transmission of the sound-data stream $S_{DS}$ to the appropriate VAS when a given wake-word is identified by a particular wake-word engine, such as the first wake-word engine 570*a*, the second wake-word engine 570*b*, or the additional wake-word engine 571. In such implementations, the NMD 503 may include multiple, different wake-word engines and/or voice extractors, each supported by a particular VAS. Similar to the discussion above, each wake-word engine may be configured to receive as input the sound-data stream $S_{DS}$ from the one or more buffers 568 and apply identification algorithms to cause a wake-word trigger for the appropriate VAS. Thus, as one example, the first wake-word engine 570*a* may be configured to identify the wake word "Alexa" and cause the NMD 503 to invoke the AMAZON VAS when "Alexa" is spotted. As another example, the second wake-word engine 570*b* may be configured to identify the wake word "Ok, Google" and cause the NMD 503 to invoke the GOOGLE VAS when "Ok, Google" is spotted. In single-VAS implementations, the VAS selector 574 may be omitted.

In additional or alternative implementations, the NMD 503 may include other voice-input identification engines 571 (shown in dashed lines) that enable the NMD 503 to operate without the assistance of a remote VAS. As an example, such an engine may identify in detected sound certain commands (e.g., "play," "pause," "turn on," etc.) and/or certain keywords or phrases, such as the unique name assigned to a given playback device (e.g., "Bookcase," "Patio," "Office," etc.). In response to identifying one or more of these commands, keywords, and/or phrases, the NMD 503 may communicate a signal (not shown in FIG. 5) that causes the audio processing components 216 (FIG. 2A) to perform one or more actions. For instance, when a user says "Hey Sonos, stop the music in the office," the NMD 503 may communicate a signal to the office playback device 102*n*, either directly, or indirectly via one or more other devices of the MPS 100, which causes the office device 102*n* to stop audio playback. Reducing or eliminating the need for assistance from a remote VAS may reduce latency that might otherwise occur when processing voice input remotely. In some cases, the identification algorithms employed may be configured to identify commands that are spoken without a preceding wake word. For instance, in the example above, the NMD 503 may employ an identification algorithm that triggers an event to stop the music in the office without the user first saying "Hey Sonos" or another wake word.

III. Example Multi-Stage NMD Operation for Power Conservation

As shown in FIG. 5, the NMD 503 can include a voice activity detector 550 upstream of the voice capture components 560 (e.g., spatial processor 566), which in turn are upstream of the wake-word engine 570. As noted previously, in operation, the sound data is passed from the microphones 222 to the voice activity detector 550 which can process the sound data $S_D$ to identify the presence of speech therein. In some embodiments, the voice activity detector 550 can utilize an associated buffer storing sufficient frames of sound data $S_D$ to evaluate the sound data for the presence of speech therein. The stored frames can be overwritten on a rolling basis (e.g., using a ring buffer) such the most recent N frames of sound data $S_D$ are stored in the buffer. While the voice activity detector 550 can analyze the sound data $S_D$ on a frame-by-frame basis, it can be useful to store a plurality of frames to compensate for time delay between onset of speech and successful detection of the voice activity. In other words, if the voice activity detector 550 takes 50 ms to detect that the user has started talking, then the signal which gets passed to VCC 560 must be delayed by at least 50 ms so that the first syllables aren't omitted. In practice, performance of noise suppression and wake word detection may both depend on receiving some noise or silence prior to the onset of speech, so the delay may need to be longer (e.g., up to 1 second or more).

In some embodiments, some or all of the downstream components of the NMD 503 can remain in a standby or low-power state unless and until voice activity is detected via the voice activity detector 550. This permits the NMD 503 to continuously monitor the sound data $S_D$ for user input without running the relatively computationally intensive and energy-demanding components that are downstream of the voice activity detector 550. Once the voice activity detector 550 identifies the presence of speech in the sound data $S_D$, some or all of the downstream components can transition to a high-power or fully operational state. This arrangement can take several forms. In some examples, the use of bypass flags or other signal processing techniques can be used such that sound data $S_D$ from the voice activity detector effectively bypasses the downstream components. Additionally or alternatively, the voice activity detector 550 may not pass the sound data $S_D$ along to the downstream components at all unless and until voice activity is detected. In some embodiments, the operation of some or all of the downstream components can be modified while in the low-power state, such that although some processing is performed, it is less energy-demanding and/or computationally intensive than it would be in the presence of voice activity. For example, the acoustic echo cancellation and/or spatial processing steps may continue to operate on the incoming sound data, but may do so in a modified fashion that consumes less power and/or computational resources than they otherwise would.

Figure 7:
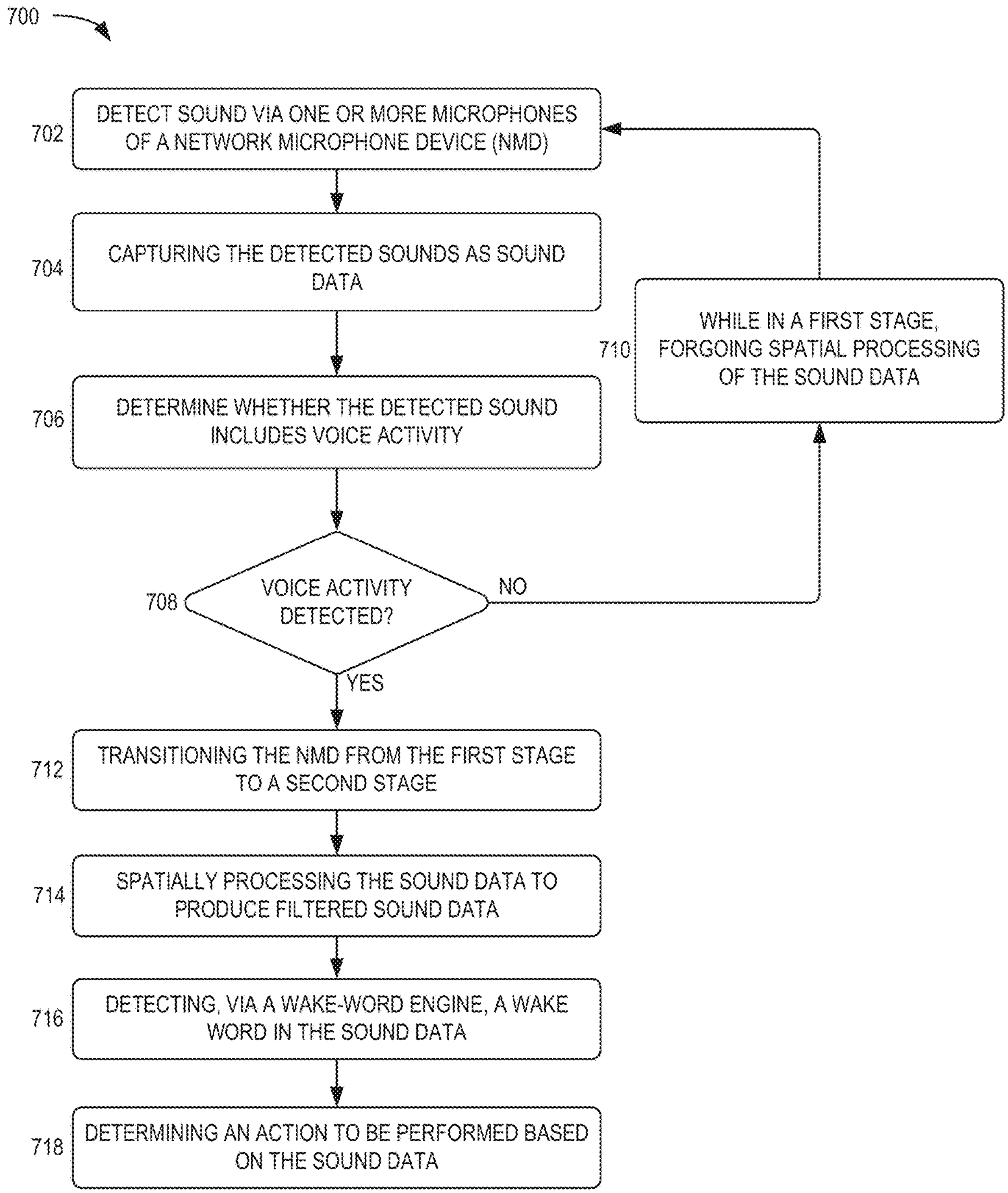
FIG. 7 is a flow chart of an example method for multi-stage voice processing in accordance with aspects of the disclosure.

As discussed above, in some examples, an NMD is configured to monitor and analyze received audio to determine if any voice activity are present in the received audio. FIG. 7 shows an example embodiment of a method 700 for an NMD to determine if any wake words are present in the received audio. The method 700 can be implemented by any of the NMDs disclosed and/or described herein, or any other NMD now known or later developed.

Various embodiments of method 700 include one or more operations, functions, and actions illustrated by blocks 702 through 718. Although the blocks are illustrated in sequential order, these blocks may also be performed in parallel, and/or in a different order than the order disclosed and described herein. Also, the various blocks may be combined into fewer blocks, divided into additional blocks, and/or removed based upon a desired implementation.

The method 700 begins at block 702, which involves the NMD detecting sound via one or more microphones and, in block 704, capturing the detected sound as sound data. The captured sound data includes sound data from an environment of the NMD and, in some embodiments, includes a voice input, such as voice input 680 depicted in FIG. 6A.

At block 706, method 700 involves the NMD determining whether the sound data includes voice activity. As noted previously, The NMD can use any suitable technique for detecting voice activity in the sound data. For example, certain acoustic features can be extracted from the sound data, such as energy-based features (e.g., signal-to-noise ratio), periodicity (e.g., speech signals tend to be more periodic than background noises), speech signal dynamics (e.g., analyzing the variance of power envelopes). One or more such acoustic features can then be analyzed using statistical models or other discriminators to detect voice activity in the sound data.

If, in decision block 708, the sound data does not include voice activity, then the NMD remains in a first low-power stage, as reflected in block 710. While in this first stage, the NMD forgoes spatial processing (and optionally also forgoes additional processing operations) of the sound data, resulting in unfiltered sound data. In some embodiments, this unfiltered sound data can be stored in a buffer and overwritten on a rolling basis. The process then returns to block 702 with continuing detection of additional sound via the one or more microphones.

If, in decision block 708, voice activity is detected, the method 700 continues to block 712, which includes transitioning the NMD from the first stage to a second stage. In some embodiments, the first stage is a low-power or standby stage, and the second stage is a higher-power or fully operational stage, in which some or all components that were in a standby or low-power condition in the first stage are instead in a fully operational stage. As a result, the NMD may consume more power and/or computational resources while in the second stage.

The method 700 continues in block 714 with spatially processing the sound data to produce filtered sound data. This can include, for example using the spatial processor 566 of FIG. 5 to analyze the detected sound $S_D$ and identify certain characteristics, such as a sound's amplitude (e.g., decibel level), frequency spectrum, directionality, etc. In one respect, the spatial processor 566 may help filter or suppress ambient noise in the detected sound $S_D$ from potential user speech based on similarities and differences in the constituent channels 562 of the detected sound $S_D$, as discussed above. As one possibility, the spatial processor 566 may monitor metrics that distinguish speech from other sounds. Such metrics can include, for example, energy within the speech band relative to background noise and entropy within the speech band—a measure of spectral structure—which is may be lower in speech than in most common background noise. In some embodiments, the spatial processor can utilize a multi-channel Wiener filter algorithm or other suitable technique for spatially processing the sound data to produce the filtered sound data.

Because the spatial processor does not initiate processing of sound data until voice activity has been detected in block 706, it can be useful to utilize a spatial processor configuration that does not require significant time for convergence. For example, certain direction of arrival (DOA) tracking techniques may require several seconds of sound data before the spatial processing converges to produce suitable outputs. Accordingly, initiating a DOA tracking spatial processor in response to detection of voice activity via the voice activity detector may result in poor spatial processing of the first frames of sound data. This may hinder the ability of the downstream wake-word engine to detect a wake word and/or may interfere with other downstream processes. Accordingly, it can be beneficial to utilize spatial processing techniques that converge relatively quickly (e.g., within less than about 1 second) upon initiation to produce useful outputs. In some embodiments, a spatial processor utilizing multi-channel Wiener filters can satisfy this condition.

In block 716, the method includes detecting, via a wake-word engine, a wake word in the sound data. In some embodiments, this involves the NMD causing the wake-word engine 570 described above in connection with FIG. 5 to utilize a wake-word detection algorithm to detect the wake word. As noted above, in some embodiments the sound data that is not identified as containing voice activity is not spatially processed. In contrast, the sound data that is identified as including voice activity is spatially processed and can be stored as filtered sound data. The filtered sound data can then be used for wake-word detection. In various embodiments, the voice activity detector 550 can be configured to store data to a fixed length circular buffer when it is running. The buffer length can correspond to the time duration of past data which will be passed to downstream components (e.g., the VCC 560). After detecting voice activity, the buffered data will first be passed to all the downstream components (including the spatial processor) followed by new incoming data from the microphone array. This provides the computational advantage that most non-speech microphone data will be overwritten in the ring buffer and never passed downstream for further processing.

Examples of wake words include (i) the wake word "Alexa" corresponding to AMAZON voice services, (ii) the wake word "Ok, Google" corresponding to GOOGLE voice services, or (iii) the wake word "Hey, Siri" corresponding to APPLE voice services. The algorithm(s) used in connection with wake-word engines can include various keyword spotting algorithms now known or later developed, or variations thereof. Examples of keyword detection algorithms include, but are not limited to, (i) the sliding window model, in which features within a sliding time-interval of the captured audio are compared to keyword models, (ii) a Hidden Markov Model (HMM), which can be constructed for each keyword as well as for non-keywords, such that the non-keyword models are used to help distinguish non-keyword speech from keyword speech, (iii) the use of Large Vocabulary Continuous Speech Recognition (LVCSR), in which input speech is decoded into lattices that are searched for predefined keywords, and (iv) the use of neural networks, such as deep neural networks (DNNs), convolutional neural networks (CNNs), or recurrent neural networks (RNNs) to model the keywords based on large amounts of keyword-specific training data.

The method 700 continues in block 718 with determining an action to be performed based on the sound data. For example, if the wake word detected in block 716 is associated with a VAS, the action may involve transmitting, via a network interface, the sound data to one or more remote computing devices associated with the VAS for further processing. For example, this can include the NMD transmitting, via a network interface to one or more servers of the respective voice service, data representing the sound data and a command or query to process the data representing the sound data. The command or query may cause the respective voice service to process the voice command and may vary according to the respective voice service so as to conform the command or query to the respective voice service (e.g., to an API of the voice service).

As noted above, in some examples, the captured audio includes voice input 680, which in turn includes a first portion representing the wake word 680*a* and a second portion representing a voice utterance 680*b*, which can include one or more commands such as command 682. In some cases, the NMD may transmit only the data representing at least the second portion of the voice input (e.g., the portion representing the voice utterance 680*b*). By excluding the first portion, the NMD may reduce bandwidth needed to transmit the voice input 680 and avoid possible misprocessing of the voice input 680 due to the wake word 680*a*, among other possible benefits. Alternatively, the NMD may transmit data representing both portions of the voice input 680, or some other portion of the voice input 680.

In some embodiments, causing the respective voice service to process the captured sound data involves the NMD querying a wake-word-detection algorithm corresponding to the respective voice service. As noted above, queries to the voice services may involve invoking respective APIs of the voice services, either locally on the NMD or remotely using a network interface. In response to a query to a wake-word-detection algorithm of the respective voice service, the NMD receives a response indicating whether or not the captured sound data submitted in the query included the wake word corresponding to that voice service. When a wake-word-detection algorithm of a specific voice service detects that the captured sound data includes the particular wake word corresponding to the specific voice service, the NMD may cause that specific voice service to further process the sound data, for instance, to identify voice commands in the captured sound data.

After causing the respective voice service to process the captured audio, the NMD receives results of the processing. For instance, if the detected sound data represents a search query, the NMD may receive search results. As another example, if the detected sound data represents a command to a device (e.g., a media playback command to a playback device), the NMD may receive the command and perhaps additional data associated with the command (e.g., a source of media associated with the command). The NMD may output these results as appropriate based on the type of command and the received results.

Alternatively, if the detected sound data includes a voice command directed to another device other than the NMD, the results might be directed to that device rather than to the NMD. For instance, referring to FIG. 1A, NMD 103*f* in the kitchen 101*h* may receive a voice input that was directed to playback device 1021 of the dining room 101*g* (e.g., to adjust media playback by playback device 1021). In such an embodiment, although NMD 103*f* facilitates processing of the voice input, the results of the processing (e.g., a command to adjust media playback) may be sent to playback device 1021). Alternatively, the voice service may send the results to NMD 103*f*, which may relay the command to playback device 1021 or otherwise cause playback device 1021 to carry out the command.

After the action determined in block 718 has been performed, or prior to this time, the NMD can transition back to the first stage (e.g., a low-power or standby stage). In some embodiments, this transition can occur once speech is no longer detected in newly received sound data at the voice activity detector. Additionally or alternatively, this transition can occur after a predetermined period of time has elapsed, for example a given time period (e.g., 1 minutes) since the wake-word was detected. In some embodiments, this transition can occur once the voice interaction is completed, including multi-turn interactions, as indicated by the VAS state, or after a predetermined period of time has elapsed.

Figure 8A:
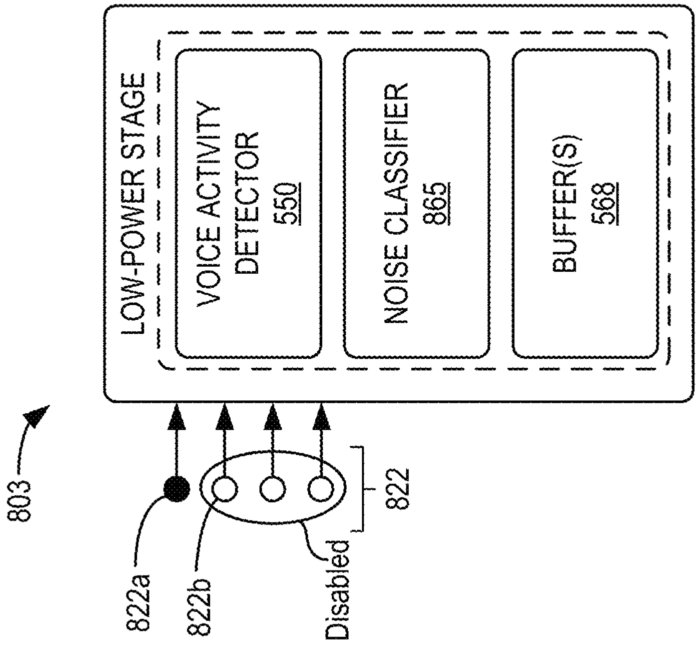
FIGS. 8A and 8B are schematic diagrams showing a network microphone device in various stages of operation in accordance with aspects of the disclosure.
Figure 8B:
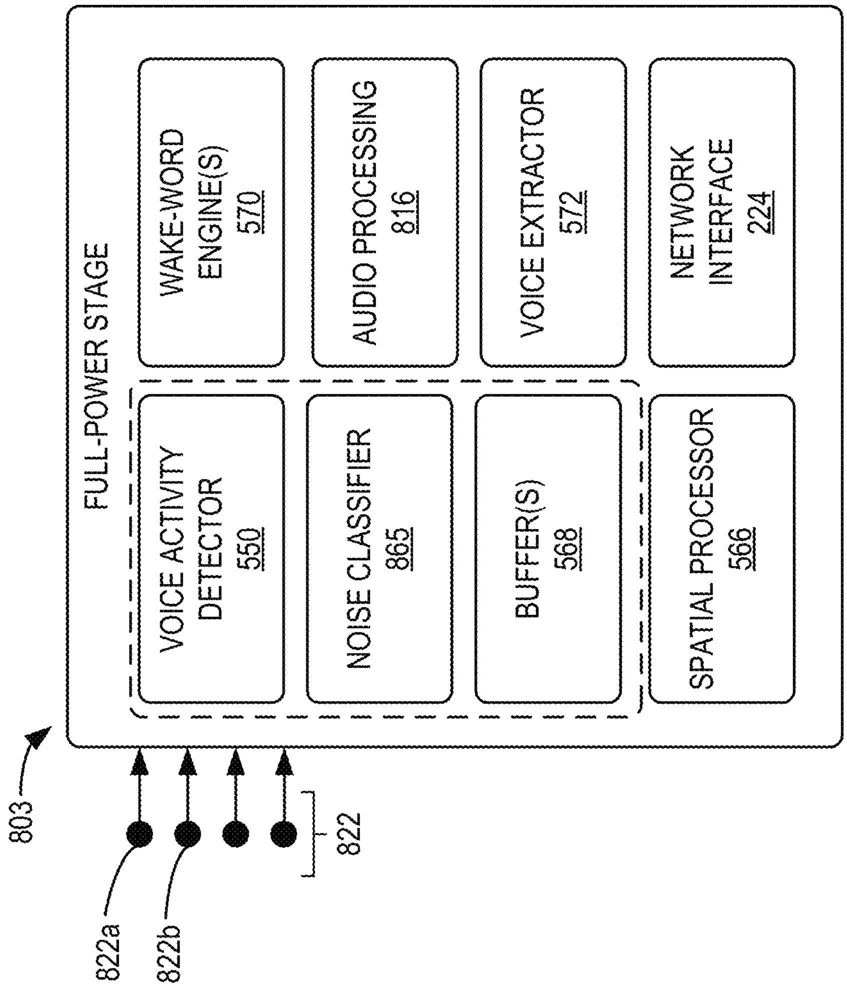

As noted above, keyword detection can be energy-intensive, and in the case of portable devices, draw additional power from the device's battery, which reduces the amount of time that a portable device can operate before it needs to be recharged. In addition to components used for keyword detection, other components that may draw additional power include microphones, voice capture components, network communication components (e.g., wireless transceivers configured to communicate over a network interface), and audio processing components, among other components. FIGS. 8A and 8B are schematic diagrams illustrating an NMD 803 in certain configurations, or stages, in which such components are enabled/disabled to conserve power during operation. A component that is enabled from a disabled state may be turned on, supplied power or additional power, taken out of standby or sleep stage, or otherwise activated in such a way that the enabled component is allowed to draw more power than it could when disabled. Although described in the context of a portable NMD, it will be appreciated that a stationary playback device may be configured in a similar manner to reduce processing load and power consumption.

Referring first to FIG. 8A, the NMD 803 is in a first stage, or low-power stage, in which a limited number of components have been enabled. For instance, in FIG. 8A, a single microphone 822*a* is enabled while other microphones 822 are disabled. In some embodiments, one or more additional microphone(s) 822*b*, but fewer than all of the microphones may be enabled. Also during the first stage, other components of the NMD 803 (not shown in FIG. 8A) may be disabled, such as DSP and application processors, among other components. In various embodiments, the low power mode shown in 8A does necessarily require any microphones to be powered down, for instance when the primary goal is to reduce power usage by the processer, rather than the microphone bias. While powering down the microphones may slightly reduce overall power usage, one problem is that it might take more than 100 ms for the microphones to begin producing a good signal after the bias voltage is applied. Disabled microphones will not produce a buffered signal which can be used for spatial processing when the NMD wakes up.

In addition to enabling certain microphone(s) during the first stage, the NMD 803 enables a voice-activity detector 550, a noise classifier 865, and one or more buffers 568. In operation, the voice-activity detector 550 can determine if a sound is detected by the enabled microphone(s) 822 (using, e.g., a voice-activity detection algorithm, such as a voice activity detection algorithm that is less computationally intensive than a wake-word engine), and the noise classifier 865 may classify the detected sound as being a detected sound of interest. Captured sound data can be stored in a rolling basis in one or more buffers 568. In one example, the noise classifier may detect if there is a spike in a signal-to-noise ratio in ambient sound detected by an enabled microphone. In any event, if there is a detected sound of interest, this causes the NMD 803 to proceed to a second stage, or low-power stage, to enable/disable additional components.

Additionally or alternatively, the NMD 803 can determine whether to proceed from the first stage to the second stage based on whether a user is in proximity to the NMD 803, as the detected presence of a user may correlate with an increased likelihood of the NMD 803 receiving voice input and the absence of a user may likewise correlate with a decreased likelihood of the NMD 803 receiving voice input. To facilitate determining whether a user is in proximity to the NMD 803, the NMD 803 may include a proximity sensor or presence detector. For instance, the NMD 803 may include an optical or radio frequency proximity sensor that emits a signal into an environment of the NMD 803 and determines the presence of a user based on changes in the reflected signal. In some examples, the NMD 803 detects the presence of a user based on detecting network interference via a wireless network interface of the NMD 803, such as by detecting interference with a Wi-Fi signal of the NMD 803. In any case, responsive to detecting the presence of a user, the NMD 803 can proceed from the first stage to a second stage.

Referring to FIG. 8B, in a second stage or full-power stage, the NMD 803 enables a number of additional components for processing of captured sound data. These components can include the spatial processor 566, audio processing components 816, and all the microphones 822 to process detected sound. The NMD 803 also enables a wake-word engine 570 (and/or other appropriate voice-input identification engine(s)). During the second stage, the NMD 803 also enables a voice extractor 572 and network communication components associated with the network interface 224 for transmitting potential voice input to a remote VAS (not shown). In some embodiments, the NMD may enable audio processing components during the third stage, such as readying one or more amplifiers, for outputting audio or other content. In other embodiments, the NMD 803 may wait until a subsequent full-performance stage to enable certain audio processing components, such as after confirming that a wake word was positively identified. Further, during the second stage or a subsequent full-performance stage, the NMD 803 may fully enable DSP and application processors.

If a wake word is not spotted during the second stage, the NMD 803 may return to the first stage shown in FIG. 8A to conserve power. The NMD 803 may also return to the first stage if the device has been idle for a certain amount of time and/or in response to an instruction to enter a lower-power mode.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A network microphone device (NMD) comprising:
- a plurality of microphones;
- a network interface;
- one or more processors; and
- a tangible, non-transitory, computer-readable medium storing instructions that, when executed by the one or more processors, cause the NMD to perform operations comprising:
  - while operating in a first, low-power stage:
    - capturing first sound data via only a first subset of the microphones, the first subset comprising fewer than all of the plurality of microphones;
    - determining, via a voice activity detection process, that the first sound data includes voice activity; and
    - in response to determining that the first sound data includes voice activity, transitioning from the first, low-power stage to a second, high-power stage;
  - while operating in the second, high-power stage:
    - capturing second sound data via each of the plurality of microphones, the second sound data including a voice input;
    - performing further voice processing of the second sound data to produce filtered sound data;
    - detecting, via a keyword engine, a keyword based on the filtered sound data; and
    - after detecting the keyword, performing an action based at least in part on the voice input.

2. The NMD of claim 1, wherein performing further processing of the second sound data to produce filtered sound data comprises spatially processing the second sound data via a spatial processor.

3. The NMD of claim 1, wherein performing further processing of the second sound data to produce filtered sound data comprises performing acoustic echo cancellation on the second sound data.

4. The NMD of claim 1, wherein operations further comprise:
- transmitting, via the network interface, at least a portion of the second sound data to one or more remote computing devices associated with a voice assistant service; and
- receiving, via the network interface, a determined intent based on the at least a portion of the second sound data.

5. The NMD of claim 1, wherein the action comprises controlling playback of audio content.

6. The NMD of claim 1, wherein, in the first stage, the one or more processors operate at a lower average clock speed than in the second stage.

7. The NMD of claim 1, wherein the operations further comprise, after performing the action, transitioning the NMD from the second stage to the first stage.

8. A method comprising:
- while operating in a first, low-power stage:
  - capturing first sound data via only a first subset of microphones of a network microphone device (NMD), the first subset comprising fewer than all of the microphones of the NMD;
  - determining, via a voice activity detection process of the NMD, that the first sound data includes voice activity; and
  - in response to determining that the first sound data includes voice activity, transitioning from the first, low-power stage to a second, high-power stage;
- while operating in the second, high-power stage:
  - capturing second sound data via each of the microphones of the NMD, the second sound data including a voice input;
  - performing further voice processing of the second sound data to produce filtered sound data;
  - detecting, via a keyword engine of the NMD, a keyword based on filtered sound data; and
  - after detecting the keyword, performing an action based at least in part on the voice input.

9. The method of claim 8, wherein performing further processing of the second sound data to produce filtered sound data comprises spatially processing the second sound data via a spatial processor.

10. The method of claim 8, wherein performing further processing of the second sound data to produce filtered sound data comprises performing acoustic echo cancellation on the second sound data.

11. The method of claim 9, further comprising:
- transmitting, via a network interface of the NMD, at least a portion of the second sound data to one or more remote computing devices associated with a voice assistant service; and
- receiving, via the network interface, a determined intent based on the at least a portion of the second sound data.

12. The method of claim 8, wherein the action comprises controlling playback of audio content.

13. The method of claim 8, wherein, in the first stage, one or more processors of the NMD operates at a lower average clock speed than in the second stage.

14. The method of claim 8, further comprising, after performing the action, transitioning the NMD from the second stage to the first stage.

15. One or more tangible, non-transitory computer-readable media storing instructions that, when executed by one or more processors of a network microphone device (NMD), cause the NMD to perform operations comprising:

while operating in a first, low-power stage:

capturing first sound data via only a first subset of microphones of the NMD, the first subset comprising fewer than all of the microphones of the NMD;

determining, via a voice activity detection process of the NMD, that the first sound data includes voice activity; and in response to determining that the first sound data includes voice activity, transitioning from the first, low-power stage to a second, high-power stage;

while operating in the second, high-power stage:

capturing second sound data via each of the microphones of the NMD, the second sound data including a voice input;

performing further voice processing of the second sound data to produce filtered sound data;

detecting, via a keyword engine, a keyword based on the filtered sound data; and after detecting the keyword, performing an action based at least in part on the voice input.

16. The one or more computer-readable media of claim 15, wherein performing further processing of the second sound data to produce filtered sound data comprises spatially processing the second sound data via a spatial processor.

17. The one or more computer-readable media of claim 15, wherein performing further processing of the second sound data to produce filtered sound data comprises performing acoustic echo cancellation on the second sound data.

18. The one or more computer-readable media of claim 15, wherein the operations further comprise:

transmitting, via a network interface of the NMD, at least a portion of the second sound data to one or more remote computing devices associated with a voice assistant service; and receiving, via the network interface, a determined intent based on the at least a portion of the second sound data.

19. The one or more computer-readable media of claim 15, wherein the action comprises controlling playback of audio content.

20. The one or more computer-readable media of claim 15, wherein the operations further comprise:

after performing the action, transitioning the NMD from the second stage to the first stage.

* * * * *